US011160106B2

(12) United States Patent
Lee et al.

(10) Patent No.: US 11,160,106 B2
(45) Date of Patent: *Oct. 26, 2021

(54) METHOD FOR TRANSCEIVING DATA BASED ON HARQ ENABLEMENT IN WIRELESS COMMUNICATION SYSTEM AND APPARATUS FOR SAME

(71) Applicant: LG ELECTRONICS INC., Seoul (KR)

(72) Inventors: Eunjong Lee, Seoul (KR); Heejeong Cho, Seoul (KR); Genebeck Hahn, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/590,132

(22) Filed: Oct. 1, 2019

(65) Prior Publication Data
US 2020/0037353 A1    Jan. 30, 2020

Related U.S. Application Data

(63) Continuation of application No. 15/761,033, filed as application No. PCT/KR2015/014352 on Dec. 28, 2015, now Pat. No. 10,455,611.
(Continued)

(51) Int. Cl.
*H04W 72/14* (2009.01)
*H04L 5/00* (2006.01)
(Continued)

(52) U.S. Cl.
CPC .............. *H04W 72/14* (2013.01); *H04L 1/00* (2013.01); *H04L 1/18* (2013.01); *H04L 1/1812* (2013.01);
(Continued)

(58) Field of Classification Search
CPC . H04L 1/18–1867; H04L 1/00; H04L 1/1812; H04L 1/1861; H04L 1/1896;
(Continued)

(56) References Cited

U.S. PATENT DOCUMENTS 5,596,604 A * 1/1997 Cioffi .................... H04L 1/0065
375/260
6,493,343 B1 * 12/2002 Garcia ................ G06F 12/0292
370/394
(Continued)

FOREIGN PATENT DOCUMENTS

WO    WO-2014092497 A1 *    6/2014    ........... H04L 1/1812

OTHER PUBLICATIONS

United States Patent and Trademark Office U.S. Appl. No. No. 15/761,033, Notice of Allowance dated Jun. 5, 2019, 8 pages.
(Continued)

*Primary Examiner* — Dung B Huynh
(74) *Attorney, Agent, or Firm* — Lee, Hong, Degerman, Kang & Waimey

(57) ABSTRACT

The present specification relates to a method for transceiving uplink data (UL data) in a wireless communication system, the method performed by a user equipment (UE) comprising: receiving a first uplink grant (UL grant) from a base station; transmitting a first item of uplink data (UL data) to the base station on the basis of the first uplink grant; receiving, from the base station, a HARQ response to the first item of uplink data; and transmitting a second item of uplink data (UL data) to the base station, wherein the method further comprises a step of transceiving, with the base station, indication information indicating whether the second item of uplink data is HARQ data or non-HARQ data.

11 Claims, 36 Drawing Sheets

Related U.S. Application Data

(60) Provisional application No. 62/219,622, filed on Sep. 16, 2015.

(51) Int. Cl.
  *H04L 1/18* (2006.01)
  *H04W 72/04* (2009.01)
  *H04L 1/00* (2006.01)
  *H04W 72/12* (2009.01)
  *H04W 88/02* (2009.01)
  *H04W 88/08* (2009.01)

(52) U.S. Cl.
  CPC .......... *H04L 1/1896* (2013.01); *H04L 5/0044* (2013.01); *H04L 5/0055* (2013.01); *H04W 72/042* (2013.01); *H04W 72/0446* (2013.01); *H04W 72/1284* (2013.01); *H04L 1/1861* (2013.01); *H04L 5/0007* (2013.01); *H04W 88/02* (2013.01); *H04W 88/08* (2013.01)

(58) Field of Classification Search
  CPC ... H04L 5/0007; H04L 5/0044; H04L 5/0055; H04W 72/042; H04W 72/0446; H04W 72/1284; H04W 72/14; H04W 88/02; H04W 88/08
  See application file for complete search history.

(56) References Cited

U.S. PATENT DOCUMENTS

| | | | | |
|---|---|---|---|---|
| 6,819,679 | B1* | 11/2004 | Kerns | H04J 3/0608 370/474 |
| 7,051,358 | B2* | 5/2006 | Hakenberg | H04N 19/61 725/114 |
| 7,912,005 | B2 | 3/2011 | Lee et al. | |
| 9,876,614 | B1 | 1/2018 | Sun et al. | |
| 2003/0110271 | A1* | 6/2003 | Jayam | H04L 47/10 709/228 |
| 2003/0118031 | A1 | 6/2003 | Classon et al. | |
| 2003/0135640 | A1* | 7/2003 | Ho | H04L 1/1621 709/237 |
| 2006/0104242 | A1 | 5/2006 | Kim et al. | |
| 2006/0195629 | A1* | 8/2006 | Sharma | H04L 1/1685 710/30 |
| 2006/0215560 | A1* | 9/2006 | Sebire | H04L 1/1812 370/235 |
| 2007/0047675 | A1 | 3/2007 | Pietraski | |
| 2007/0060146 | A1 | 3/2007 | Won et al. | |
| 2007/0155337 | A1* | 7/2007 | Park | H04B 17/24 455/69 |
| 2007/0189282 | A1* | 8/2007 | Lohr | H04L 1/1845 370/370 |
| 2007/0218907 | A1* | 9/2007 | Jiang | H04L 1/1822 455/436 |
| 2007/0237167 | A1 | 10/2007 | Kaneko et al. | |
| 2007/0248099 | A1* | 10/2007 | Liljestrom | H04L 1/1887 370/395.4 |
| 2008/0051028 | A1 | 2/2008 | Jung et al. | |
| 2008/0108379 | A1 | 5/2008 | Cho et al. | |
| 2008/0125155 | A1 | 5/2008 | Saito | |
| 2008/0181175 | A1* | 7/2008 | Lee | H04L 5/0046 370/329 |
| 2008/0219204 | A1 | 9/2008 | Lee et al. | |
| 2008/0220788 | A1* | 9/2008 | Stanwood | H04W 76/15 455/450 |
| 2008/0225822 | A1 | 9/2008 | Zhang et al. | |
| 2008/0250293 | A1* | 10/2008 | Taori | H04B 7/155 714/748 |
| 2008/0310395 | A1 | 12/2008 | Kashima | |
| 2009/0097426 | A1 | 4/2009 | Yin | |
| 2009/0141673 | A1 | 6/2009 | Hwang et al. | |
| 2009/0147734 | A1* | 6/2009 | Naka | H04L 1/1685 370/329 |
| 2009/0161621 | A1* | 6/2009 | Suga | H04W 72/085 370/329 |
| 2009/0177937 | A1* | 7/2009 | Lee | H04L 1/1812 714/748 |
| 2009/0186644 | A1* | 7/2009 | Suga | H04L 5/0091 455/500 |
| 2009/0204863 | A1 | 8/2009 | Kim et al. | |
| 2009/0213803 | A1 | 8/2009 | Lee et al. | |
| 2009/0219870 | A1* | 9/2009 | Wengerter | H04L 1/0026 370/329 |
| 2009/0228755 | A1 | 9/2009 | Franovici | |
| 2009/0257357 | A1 | 10/2009 | Marsh | |
| 2009/0300453 | A1* | 12/2009 | Sahara | H04L 1/0003 714/748 |
| 2009/0305711 | A1* | 12/2009 | Rinne | H04L 47/70 455/450 |
| 2010/0002630 | A1 | 1/2010 | Park et al. | |
| 2010/0046460 | A1 | 2/2010 | Kwak et al. | |
| 2010/0054203 | A1 | 3/2010 | Damnjanovic et al. | |
| 2010/0110878 | A1 | 5/2010 | Frederiksen et al. | |
| 2010/0202395 | A1 | 8/2010 | Lee et al. | |
| 2010/0235705 | A1 | 9/2010 | Kim et al. | |
| 2010/0275086 | A1 | 10/2010 | Bergquist et al. | |
| 2010/0322086 | A1 | 12/2010 | Harris et al. | |
| 2010/0322144 | A1 | 12/2010 | Lee et al. | |
| 2011/0004800 | A1* | 1/2011 | Agiwal | H04L 1/188 714/749 |
| 2011/0038329 | A1* | 2/2011 | Luo | H04L 5/0053 370/329 |
| 2011/0053625 | A1* | 3/2011 | Ishii | H04L 1/1887 455/507 |
| 2011/0150219 | A1* | 6/2011 | Newberg | H04L 9/12 380/255 |
| 2011/0164515 | A1* | 7/2011 | Park | H04W 72/1278 370/252 |
| 2011/0200028 | A1* | 8/2011 | Suzuki | H04L 5/0048 370/338 |
| 2011/0294491 | A1* | 12/2011 | Fong | H04L 5/0053 455/422.1 |
| 2011/0305197 | A1 | 12/2011 | Park et al. | |
| 2012/0057560 | A1 | 3/2012 | Park et al. | |
| 2012/0069793 | A1 | 3/2012 | Chung et al. | |
| 2012/0099587 | A1* | 4/2012 | Fan | H04W 40/16 370/389 |
| 2012/0140724 | A1* | 6/2012 | Sipola | H04L 1/1607 370/329 |
| 2012/0155299 | A1* | 6/2012 | Reams | H04L 1/1825 370/252 |
| 2012/0294204 | A1* | 11/2012 | Chen | H04L 1/1812 370/280 |
| 2012/0327821 | A1 | 12/2012 | Lin et al. | |
| 2013/0028154 | A1* | 1/2013 | Matsuo | H04L 1/1685 370/310 |
| 2013/0051269 | A1* | 2/2013 | Suzuki | H04L 1/1877 370/252 |
| 2013/0111192 | A1* | 5/2013 | Reams | G08C 17/02 712/225 |
| 2013/0121274 | A1 | 5/2013 | Chen et al. | |
| 2013/0163536 | A1 | 6/2013 | Anderson et al. | |
| 2013/0176950 | A1* | 7/2013 | Hakola | H04L 5/0055 370/329 |
| 2013/0203372 | A1 | 8/2013 | Sigle et al. | |
| 2013/0215858 | A1 | 8/2013 | Jang et al. | |
| 2013/0246552 | A1* | 9/2013 | Underwood | H04L 1/12 709/212 |
| 2013/0272261 | A1* | 10/2013 | Seo | H04L 5/001 370/329 |
| 2014/0078941 | A1 | 3/2014 | Seo et al. | |
| 2014/0112194 | A1* | 4/2014 | Novlan | H04W 8/005 370/254 |
| 2014/0119257 | A1* | 5/2014 | Cho | H04W 72/1242 370/311 |
| 2014/0140273 | A1 | 5/2014 | Kim et al. | |
| 2014/0213237 | A1 | 7/2014 | Yang et al. | |
| 2014/0233478 | A1* | 8/2014 | Wentink | H04L 1/1854 370/329 |

(56) References Cited

U.S. PATENT DOCUMENTS

| | | | | |
|---|---|---|---|---|
| 2014/0321293 | A1* | 10/2014 | Hwang | H04L 1/18 370/242 |
| 2014/0328333 | A1* | 11/2014 | Seo | H04L 1/1664 370/336 |
| 2014/0355522 | A1* | 12/2014 | Diab | H04W 76/16 370/328 |
| 2015/0043414 | A1* | 2/2015 | Han | H04L 1/1628 370/312 |
| 2015/0071183 | A1 | 3/2015 | Bontu et al. | |
| 2015/0103705 | A1* | 4/2015 | Yang | H04L 1/1861 370/280 |
| 2015/0103749 | A1 | 4/2015 | Kela et al. | |
| 2015/0215909 | A1* | 7/2015 | Takeda | H04L 5/0096 370/329 |
| 2015/0222395 | A1* | 8/2015 | Suzuki | H04W 72/042 370/329 |
| 2015/0236822 | A1 | 8/2015 | Pirskanen et al. | |
| 2015/0282209 | A1* | 10/2015 | Shao | H04W 72/121 370/329 |
| 2015/0296490 | A1* | 10/2015 | Yi | H04W 52/281 370/329 |
| 2015/0349929 | A1* | 12/2015 | Bhorkar | H04L 1/201 370/329 |
| 2016/0119105 | A1* | 4/2016 | Jiang | H04L 1/1887 370/329 |
| 2016/0127090 | A1* | 5/2016 | Takeda | H04W 16/32 370/329 |
| 2016/0127997 | A1* | 5/2016 | Ang | H04W 76/28 370/311 |
| 2016/0128045 | A1* | 5/2016 | Azarian Yazdi | H04W 72/0406 370/330 |
| 2016/0128060 | A1* | 5/2016 | Azarian Yazdi | H04L 5/0055 370/336 |
| 2016/0128090 | A1* | 5/2016 | Azarian Yazdi | H04L 1/189 370/329 |
| 2016/0150560 | A1* | 5/2016 | Ji | H04L 1/1887 370/330 |
| 2016/0174155 | A1* | 6/2016 | Nagata | H04W 52/02 370/311 |
| 2016/0219627 | A1* | 7/2016 | Au | H04W 74/0841 |
| 2016/0242144 | A1* | 8/2016 | Adachi | H04W 4/06 |
| 2016/0255532 | A1* | 9/2016 | Huang | H04W 4/38 370/235 |
| 2016/0261383 | A1* | 9/2016 | Bergstrom | H04W 72/042 |
| 2016/0269150 | A1* | 9/2016 | Jiang | H04L 1/1861 |
| 2016/0278051 | A1* | 9/2016 | Liu | H04L 1/1812 |
| 2016/0337088 | A1 | 11/2016 | Quan et al. | |
| 2017/0005758 | A1* | 1/2017 | Baldemair | H04L 1/1825 |
| 2017/0161968 | A1* | 6/2017 | Xie | H04L 1/1671 |
| 2017/0207895 | A1* | 7/2017 | Yang | H04L 1/1822 |
| 2017/0230149 | A1* | 8/2017 | Wang | H04L 1/1819 |
| 2017/0237529 | A1 | 8/2017 | Eriksson et al. | |
| 2017/0238314 | A1 | 8/2017 | Zhang et al. | |
| 2017/0311304 | A1* | 10/2017 | Lu | H04N 21/4131 |
| 2017/0332358 | A1 | 11/2017 | Park et al. | |
| 2018/0020467 | A1* | 1/2018 | Nouah | H04L 5/0064 |
| 2018/0049185 | A1 | 2/2018 | Lee et al. | |
| 2018/0152266 | A1* | 5/2018 | Quan | H04L 1/04 |
| 2018/0227958 | A1* | 8/2018 | Xiong | H04W 74/0833 |
| 2018/0270854 | A1 | 9/2018 | Lee et al. | |
| 2018/0294927 | A1 | 10/2018 | Takeda et al. | |

OTHER PUBLICATIONS

United States Patent and Trademark Office U.S. Appl. No. 15/761,033, Office Action dated Jan. 2, 2019, 29 pages.
PCT International Application No. PCT/KR2015/014352, International Search Report dated Jul. 11, 2016, 12 pages.

* cited by examiner

FIG. 2
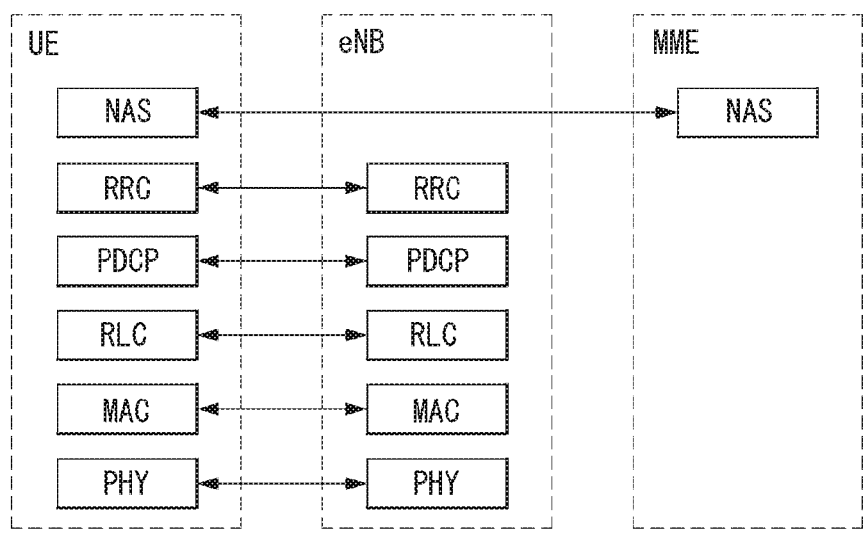
(a) Control plane protocol stack
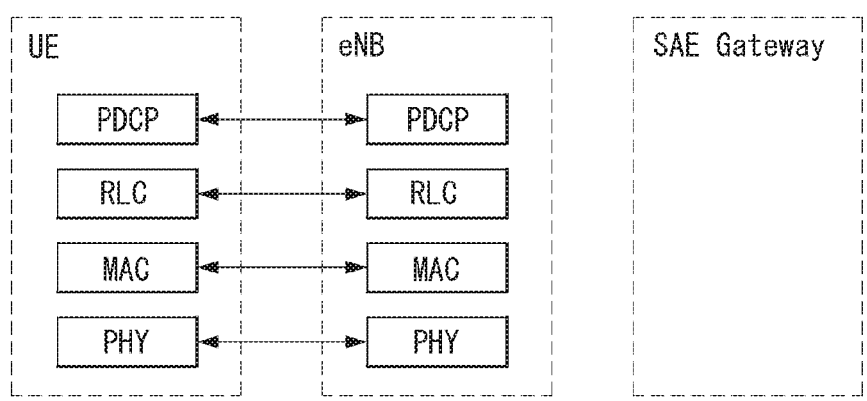
(b) User plane protocol stack FIG. 12
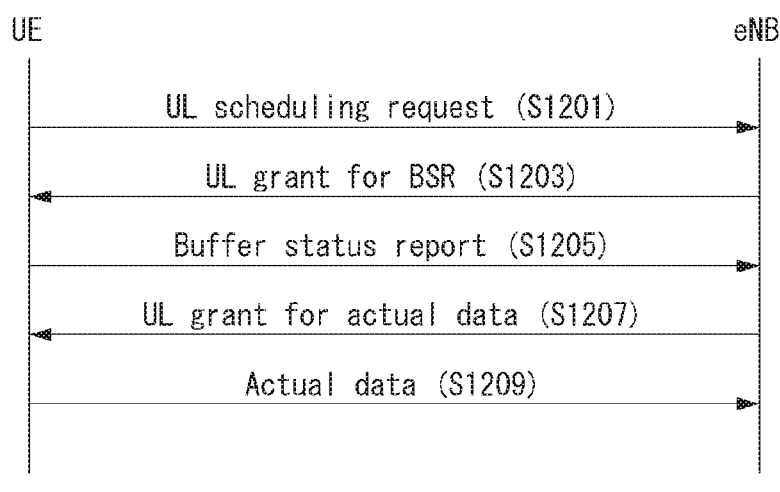
(a)
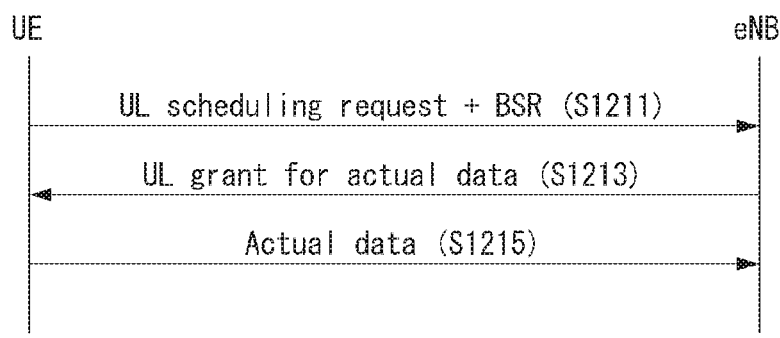
(b)

FIG. 13
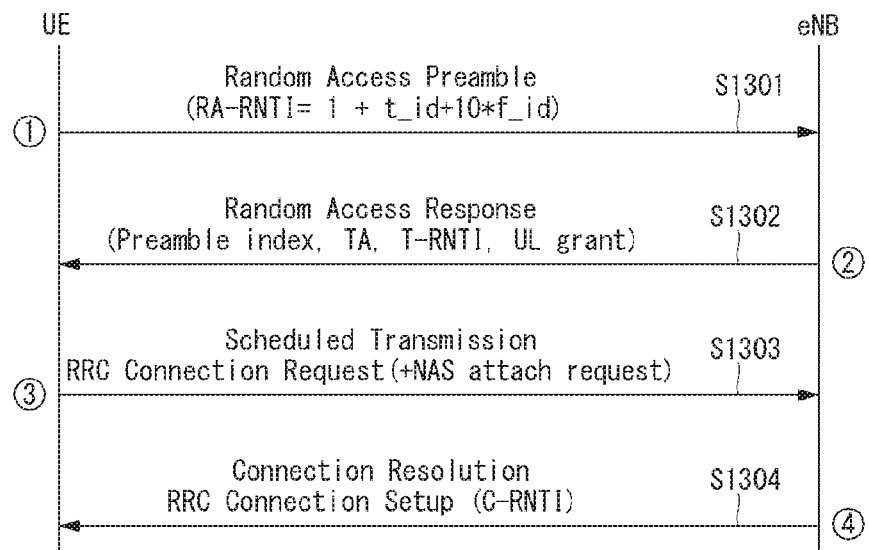
(a)
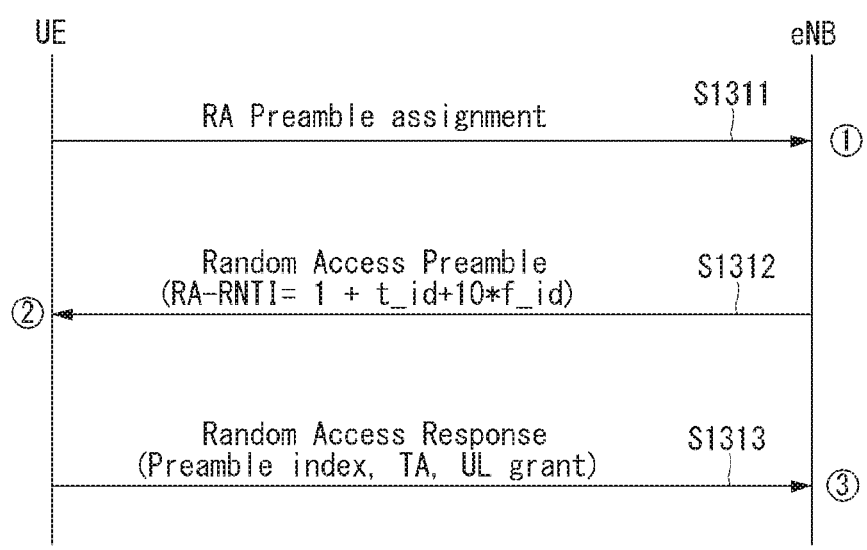
(b)

| 0/1A | FH | Resource block assignment | MCS/RV(5) | NDI | TPC (2) | DMRS CS(3) | UI (2) | DAI (2) | CQI req. |

FIG. 25
(a) 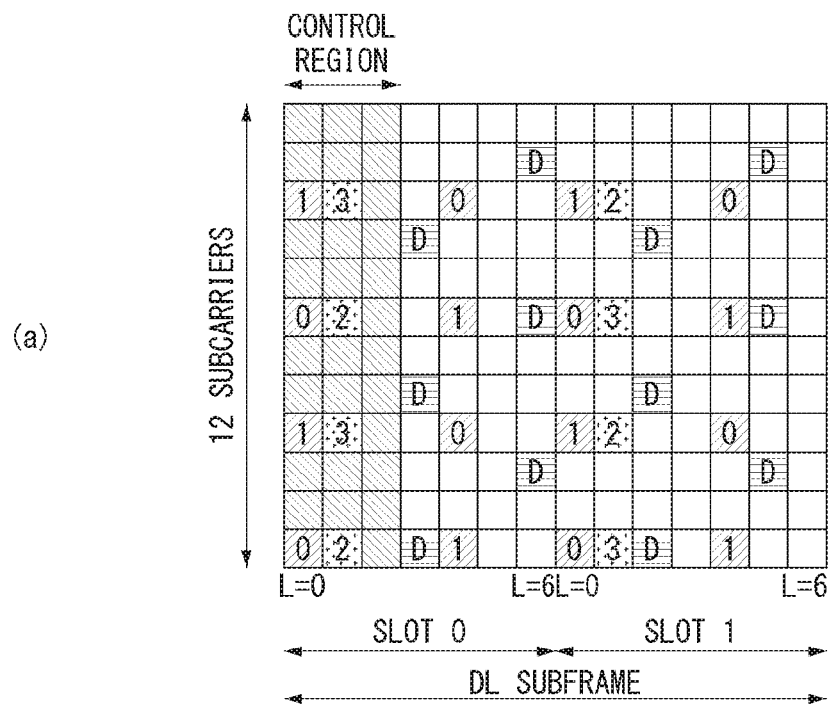
(b) 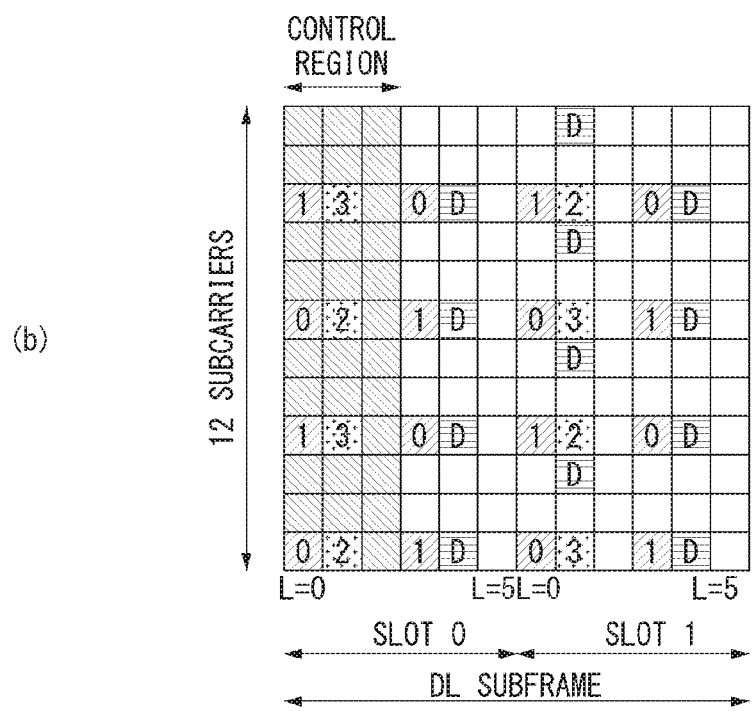

FIG. 32

| RA hrd | Resource Block assignment | MCS (5) | NHI | NDI | HARQ (3) | RV (2) | TPC (2) |

FIG. 33

| 0/1A | FH | Resource Block assignment | MCS/RV(5) | NDI | NHI | TPC(2) | DMRS CS(3) | UI(2) | DAI(2) | CQI |

| Resource Block assignment | MCS (5) | NDI | HARQ (3) | RV (2) | Resource Block assignment | MCS (5) | TPC (2) |

Resource information for HARQ data — 3710

N-1 number of Resource information for No HARQ data — 3720

FIG. 38

| FH | Resource Block assignment | MCS/RV(5) | NDI | Resource Block assignment | MCS(5) | TPC(2) | DMRS CS(3) | UI(2) | DAI(2) | CQI |

Resource information for HARQ data — 3810

N-1 number of Resource information for No HARQ data — 3820

METHOD FOR TRANSCEIVING DATA BASED ON HARQ ENABLEMENT IN WIRELESS COMMUNICATION SYSTEM AND APPARATUS FOR SAME

CROSS-REFERENCE TO RELATED APPLICATIONS

This application is a continuation of U.S. patent application Ser. No. 15/761,033, filed on Mar. 16, 2018, now U.S. Pat. No. 10,455,611, which is the National Stage filing under 35 U.S.C. 371 of International Application No. PCT/KR2015/014352, filed on Dec. 28, 2015, which claims the benefit of U.S. Provisional Application No. 62/219,622, filed on Sep. 16, 2015, the contents of which are all hereby incorporated by reference herein in their entirety.

TECHNICAL FIELD

The present invention relates to a wireless communication system, and, more specifically, to a method for transceiving uplink/downlink data and an apparatus supporting the same.

BACKGROUND ART

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking.

DISCLOSURE

Technical Problem

An embodiment of the present invention provides a method for transmitting emergency data without latency and with high reliability by applying a HARQ process to the emergency data or the like.

In addition, an embodiment of the present invention provides a method for newly defining a Non-HARQ indicator to distinguish HARQ data and Non-HARQ data and for receiving the Non-HARQ indicator.

Furthermore, an invention of the present invention provides a method for newly setting a Non-HARQ soft buffer to process HARQ data and Non-HARQ data at a receiver distinguishably.

Furthermore, an invention of the present invention provides a method for exchanging Non-HARQ capability information between a transmitter and a receiver.

Objects of the present invention should not be limited to the aforementioned objects and other unmentioned objects will be clearly understood by those skilled in the art from the following description.

Technical Solution

In this specification, there is provided a method for transceiving UL data in a wireless communication system, the method which is performed by a user equipment (UE) and includes: receiving a first UL grant from a base station; transmitting first UL data to the base station based on the first UL grant; transmitting a HARQ response to the first UL data from the base station; and transmitting second UL data to the base station, wherein the method further comprises indication information indicating whether the second UL data is HARQ data or Non-HARQ data.

In addition, in this specification, the method may further includes transmitting, to the base station, a first message for requesting resource allocation for transmission of an emergency message, wherein, when the first message is transmitted, the indication information is received from the base station.

Furthermore, in this specification, the method may further include receiving a second UL grant from the base station, wherein the indication information is included in the second UL grant.

Furthermore, in this specification, the second UL data may be Non-HARQ data, and the second UL data may be transmitted to the base station based on the second UL grant.

Furthermore, in this specification, the method may further includes, when the HARQ response is a HARQ NACK, transmitting retransmission data of the first UL data to the base station, wherein the retransmission data and the second UL data are simultaneously transmitted to the base station.

Furthermore, in this specification, the indication information may be determined depending on a position of resource allocation information included in the second UL grant, a first resource allocation part of the second UL grant may indicate resource allocation information for HARQ data, and a second resource allocation part of the second UL grant may indicate resource allocation information for Non-HARQ data.

Furthermore, in this specification, the method may further include receiving a second message including Non-HARQ capability information from the base station.

Furthermore, in this specification, the second message may be a master information block (MIB) or a system information block (SIB).

Furthermore, in this specification, the method may further include: receiving a UE Capability Enquiry message from the base station; and transmitting a UE Capability Information message including Non-HARQ capability information to the base station.

Furthermore, in this specification, the Non-HARQ capability information may include a Non-HARQ support field that indicates whether Non-HARQ is supported.

Furthermore, in this specification, the Non-HARQ capability information may include at least one of a simultaneous Non-HARQ data number field, which indicates a number of Non-HARQ data capable of being supported in a specific Transport Time Interval (TTI), or a Non-HARQ buffer number field, which indicates a number of Non-HARQ buffers required when one Non-HARQ data is transmitted in a specific TTI.

Furthermore, in this specification, a number and a size of Non-HARQ soft buffers may be determined based on the Non-HARQ capability information.

Furthermore, in this specification, the indication information may be transmitted to the base station through a physical uplink shared channel (PUSCH) resource.

Furthermore, in this specification, the second UL data and the indication information may be multiplexed.

Furthermore, in this specification, the indication information may be mapped to a specific Resource Element (RE) of the PUSCH resource.

Furthermore, in this specification, a transport resource of the second UL data and a transport resource of the indication information may not overlap with each other.

Furthermore, in this specification, the indication information may be mapped to at least one symbol of a lowest subcarrier index of the PUSCH resource, or to at least one symbol of a center subcarrier index of the PUSCH resource.

Furthermore, in this specification, the method may further include: receiving DL data from the base station; and transmitting a HARQ response to the received DL data to the base station, wherein the indication information is multiplexed with the HARQ response to the received DL data and transmitted to the base station.

Furthermore, in this specification, the indication information and the HARQ response to the received DL data may be distinguished by an orthogonal sequence Furthermore, in this specification, there is provided A method for transceiving DL data in a wireless communication system, the method which is performed by a user equipment (UE) and includes: receiving a first DL grant from a base station; receiving first DL data from the base station based on the first DL grant;

transmitting a HARQ response to the first DL data to the base station; and receiving second DL data to the base station, wherein the method further comprises receiving indication information indicates whether the second DL data is HARQ data or Non-HARQ data.

Furthermore, in this specification, the method may further include receiving a second DL grant from the base station, and the indication information may be included in the second DL grant.

Furthermore, in this specification, the second DL data may be Non-HARQ data, and the second DL data may be received from the base station based on the second DL grant.

Furthermore, in this specification, the method may further include, when the HARQ response is a HARQ NACK, receiving retransmission data of the first DL data, and the retransmission data and the second DL data are simultaneously received from the base station.

Furthermore, in this specification, there is a method for transceiving UL data in a wireless communication system, the method which is performed by a base station and includes: transmitting a first UL grant to a user equipment (UE); receiving a first UL data to the UE; transmitting a HARQ response to the first UL data; and receiving second UL data to the UE, wherein the method further comprises transceiving indication information, which indicates whether the second UL data is HARQ data or Non-HARQ data, with respect to the UE.

Furthermore, in this specification, the method may further include: processing the second UL data in a HARQ soft buffer or a Non-HARQ soft buffer based on the indication information.

Furthermore, in this specification, there is a user equipment (UE) for transceiving UL data in a wireless communication system, the UE including: a radio frequency (RF) unit configured to transceiver a radio signal; and a processor functionally connected to the RF unit and configured to: receive a first UL grant from a base station, transmit first UL data to the base station based on the first UL grant, receive a HARQ response to the first UL data from the base station, and control second UL data to the base station while controlling indication information, which indicates whether the second UL data is HARQ data or Non-HARQ data, to be transceived with respect to the base station.

Furthermore, in this specification, there is a base station for transceiving UL data in a wireless communication system, the base station including: a radio frequency (RF) unit configured to transceiver a radio signal; and a processor functionally connected to the RF unit and configured to: transmit a first UL grant to a user equipment (UE); receive first UL data from the UE; transmit a HARQ response to the first UL data to the UE; and control second UL data to be received from the UE, wherein the base station controls indication information, which indicates whether the second UL data is HARQ data or Non-HARQ data, to be transceived with the UE.

Furthermore, in this specification, the processor of the base station may control the second UL data based on the indication information to be processed in a HARQ soft buffer or Non-HARQ soft buffer.

Advantageous Effects

This specification newly define a Non-HARQ indicator and a Non-HARQ soft buffer to allow so that HARQ data and Non-HARQ data are simultaneously transmitted without affecting a conventional HARQ process, thereby improving performance of the whole system.

In addition, this specification allows transmission of emergency data or the like with high reliability and without latency.

Effects of the present invention should not be limited to the aforementioned effects and other unmentioned effects will be clearly understood by those skilled in the art from the following description.

DESCRIPTION OF DRAWINGS

The accompanying drawings included as part of the detailed description in order to help understanding of the present invention provide embodiments of the present invention and describe the technical characteristics of the present invention along with the detailed description.

FIG. 2 illustrates a radio interface protocol structure between a UE and an E-UTRAN in the wireless communication system to which the present invention can be applied.

FIG. 12 illustrates a UL resource allocation procedure of a UE in the wireless communication system to which the present application can be applied.

FIG. 13 illustrates an example of a random access procedure to which present application can be applied.

FIG. 25 illustrates a reference signal pattern mapped to a downlink resource block pair in the wireless communication system to which the present invention may be applied.

FIG. 32 illustrates an example of a DL grant format including a Non-HARQ indicator proposed in this specification.

FIG. 33 illustrates an example of a UL grant format including a Non-HARQ indicator proposed in this specification.

FIG. 37 illustrates an example of a new DL grant format proposed in this specification.

FIG. 38 illustrates an example of a new UL grant format proposed in this specification.

MODE FOR INVENTION

Figure 1:
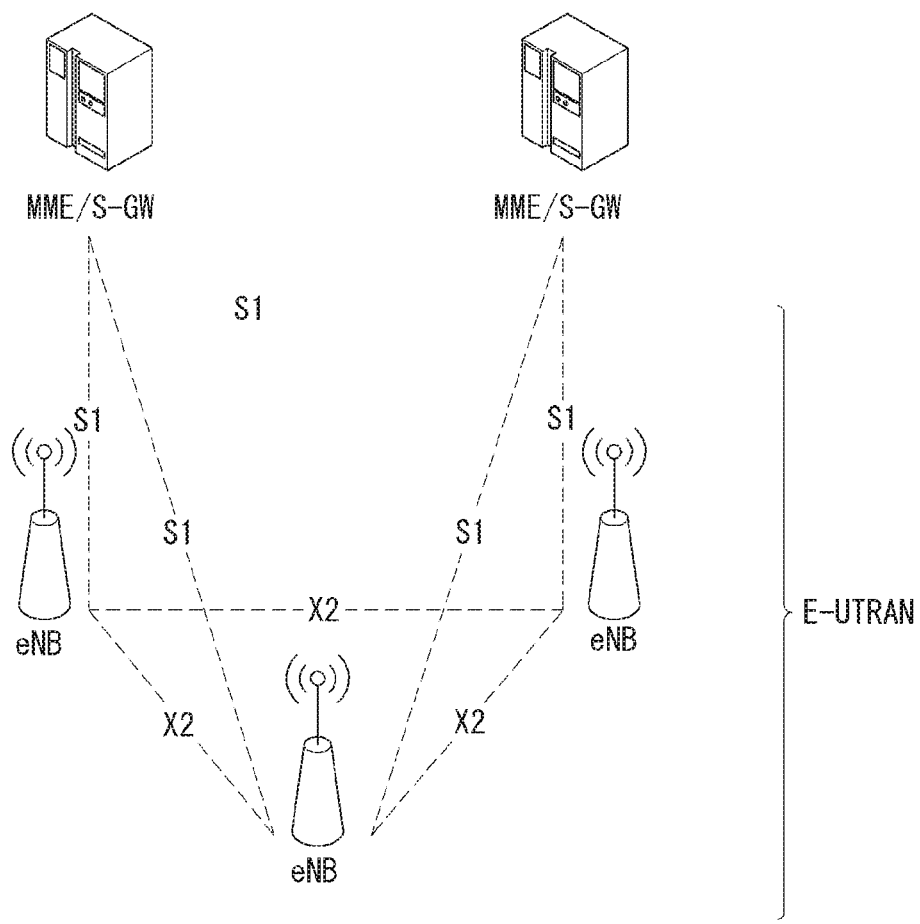
FIG. 1 illustrates an example of a network structure of an evolved universal terrestrial radio access network (E-UTRAN) to which the present invention can be applied.

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA(Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a schematic structure a network structure of an evolved universal mobile telecommunication system (E-UTRAN) to which the present invention can be applied.

An E-UTRAN system is an evolved version of the UTRAN system. For example, the E-UTRAN may be also referred to as an LTE/LTE-A system. The E-UTRAN consists of eNBs, providing the E-UTRA user plane and control plane protocol terminations towards the UE. The eNBs are interconnected with each other by means of the X2 interface. The X2 user plane interface (X2-U) is defined between eNBs. The X2-U interface provides non guaranteed delivery of user plane packet data units (PDUs). The X2 control plane interface (X2-CP) is defined between two neighbour eNBs. The X2-CP performs following functions: context transfer between eNBs, control of user plane tunnels between source eNB and target eNB, transfer of handover related messages, uplink load management and the like. Each eNB is connected to User Equipments (UEs) through a radio interface and is connected to an Evolved Packet Core (EPC) through an S1 interface. The S1 user plane interface (S1-U) is defined between the eNB and the serving gateway (S-GW). The S1-U interface provides non guaranteed delivery of user plane PDUs between the eNB and the S-GW. The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like. The S1 interface supports a many-to-many relation between MMES/S-GWs and eNBs.

FIG. 2 illustrates a radio interface protocol structure defined between a UE and an E-UTRAN in a wireless communication system to which the present invention can be applied. FIG. 2(a) illustrates a radio protocol structure of a control plane, and FIG. 2(b) illustrates a radio protocol structure of a user plane.

With reference to FIG. 2, layers of a radio interface protocol between the UE and the E-UTRAN can be classified into a first layer (L1), a second layer (L2), and a third layer (L3) based on the lower three layers of the open system interconnection (OSI) model that is well-known in the communication system technology field. The radio interface protocol between the UE and the E-UTRAN is divided horizontally into a physical layer, a data link layer, and a network layer; and divided vertically into a user plane which is a protocol stack for data information transmission and a control plane which is a protocol stack for transmission of a control signal.

The control plane refers to a path along which control messages for the UE and the network to manage calls are transmitted. The user plane refers to a path along which data created in the application layer, for example, voice data or Internet packet data are transmitted. In what follows, the control plane and the user plane of the radio protocol will be described.

The physical (PHY) layer belonging to the first layer provides an information transfer service to an upper layer by using a physical channel. The PHY layer is connected to the medium access control (MAC) layer belonging to the upper layer through a transport channel, and data are transferred between the MAC layer and the PHY layer through the transport channel. The transport channel is classified according to how and with what characteristics data are transferred through a radio interface. And a physical channel is employed to transfer data between disparate physical layers and between a physical layer of a transmitter end and a physical layer of a receiver end. The physical layer is modulated by OFDM scheme and uses time and frequency as radio resources.

There are a few physical control channels used in the physical layer. A physical downlink control channel (PDCCCH) informs the UE of a paging channel (PCH), resource allocation of a downlink shard channel (DL-SCH), and hybrid automatic repeat request (HARQ) information related to an uplink shared channel (UL-SCH). Also, the PDCCH can carry an uplink grant which informs the UE of resource allocation for uplink transmission. A physical control format indicator channel (PDFICH) informs the UE of the number of OFDM symbols used for the PDCCHs and is transmitted for each subframe. A physical HARQ indicator channel (PHICH) carries a HARQ acknowledge (ACK)/non-acknowledge (NACK) signal in response to the uplink transmission. A physical uplink control channel (PUCCH) carries requests scheduling of the HARQ ACK/NACK signal for downlink transmission and carries uplink control information such as a channel quality indicator (CQI). A physical uplink shared channel (PUSCH) carries an UL-SCH.

The MAC layer of the second layer (L2) provides a service to its upper layer, radio link control (RLC) layer, through a logical channel. Functions of the MAC layer includes mapping between a logical channel and a transport channel; and multiplexing/demultiplexing of transport blocks provided to a physical channel on a transport channel of a MAC service data unit (SDU) belonging to the logical channel.

The RLC layer of the second layer (L2) supports reliable transmission of data. Functions of the RLC layer include concatenation, segmentation, and reassembly of the RLC SDU. To ensure various levels of quality of service (QoS)

that a radio bearer (RB) requests, the RLC layer provides three operating modes: transparent mode (TM), unacknowledged mode (UM), and acknowledge mode (AM). The AM RLC provides error correction through an automatic repeat request (ARQ). Meanwhile, in case the MAC layer carries the RLC function, the RLC layer can be included as a functional block of the MAC layer.

A packet data convergence protocol (PDCP) layer of the second layer (L2) carries functions of transfer of user data in the user plane, header compression, and ciphering. The header compression refers to the function of reducing the size of the IP packet header which carries relatively large and unnecessary control information so that Internet protocol (IP) packets such as the Internet protocol version 4 (IPv4) or the Internet protocol version 6 (IPv6) can be transmitted efficiently through a radio interface with narrow bandwidth. Functions of the PDCP layer in the control plane include transfer of plane data and ciphering/integrity protection.

The radio resource control (RRC) layer located in the lowest part of the third layer (L3) is defined only in the control plane. The RRC layer controls radio resources between the UE and a network. To this end, the UE and the network exchanges RRC messages through the RRC layer. The RRC layer controls a logical channel, a transport channel, and a physical channel related to configuration, re-configuration, and release of radio bearers. A radio bearer refers to a logical path that the second layer (L2) provides for data transmission between the UE and the network. Configuring a radio bearer indicates that a radio protocol layer and channel characteristics are defined for providing a particular service and specific parameters and an operating method thereof are set up. A radio bearer is again divided into a signaling RB (SRB) and a data RB (DRB). The SRB is used as a path for transmitting RRC messages in the control plan, and the DRB is used as a path for transmitting user data in the user plane.

The non-access stratum (NAS) layer located in the upper hierarchy of the RRC layer performs the function of session management, mobility management, and so on.

A cell constituting an eNB has bandwidth chosen from among 1.25, 2.5, 5, 10, 2 MHz and provides a downlink or an uplink transmission service to UEs. Bandwidth configuration can be carried out so that different cells have bandwidth different from each other.

Downlink transport channels for transporting data from a network to a UE include a broadcast channel (BCH) which transmits system information, a PCH which transmits a paging message, a DL-SCH which transmits user traffic or a control message. Downlink multicast or broadcast service traffic or a control message may be transmitted through the DL-SCH or through a separate multicast channel (MCH). Meanwhile, uplink transport channels for transporting data from the UE to the network include a random access channel (RACH) which transmits the initial control message and an uplink shared channel which transmits user traffic or a control message.

A logical channel lies in the upper hierarchy of a transport channel and is mapped to the transport channel. A logical channel is divided into a control channel for transmission of control area information and a traffic channel for transmission of user area information. Logical channels include a broadcast control channel (BCCH), a paging control channel (PCCH), a common control channel (CCCH), a dedicated control channel (DCCH), a multicast control channel (MCCH), a dedicated traffic channel (DTCH), and a multicast traffic channel (MTCH).

To manage a UE and mobility of the UE in the NAS layer located in the control plane, an EPS mobility management (EMM) registered state and an EMM-deregistered state can be defined. The EMM registered state and the EMM deregistered state can be applied to the UE and the MME. As in the case when the UE is powered on for the first time, the UE at its initial stage is in the EMM-deregistered state and carries out a process of registering for a network through an initial attach procedure to connect to the corresponding network. If the connection procedure is carried out successfully, the UE and the MME then make a transition to the EMM-registered state.

Also, to manage signaling connection between the UE and the network, an EPS connection management (ECM) connected state and an ECM-IDLE state can be defined. The ECM-CONNECTED state and the ECM-IDLE state can also be applied to the UE and the MME. The ECM connection includes an RRC connection established between the UE and an eNB and an S1 signaling connection established between the eNB and the MME. The RRC state indicates whether the RRC layer of the UE and the RRC layer of the eNB are connected logically to each other. In other words, if the RRC layer of the UE is connected to the RRC layer of the eNB, the UE stays in an RRC_CONNECTED state. If the RRC layer of the UE and the RRC layer of the eNB are not connected to each other, the UE stays in an RRC_IDLE state.

A network is capable of perceiving existence of a UE in the ECM-CONNECTED state at the cell level and controlling the UE in an effective manner. On the other hand, the network is unable to perceive the existence of a UE in the ECM-IDLE state, and a core network (CN) manages the UE on the basis of a tracking area which is a regional unit larger than the cell. If the UE is in the ECM-IDLE state, the UE carries out discontinuous reception (DRX) that the NAS configures by using the ID assigned uniquely in the tracking area. In other words, the UE can receive broadcast data of system information and paging information by monitoring a paging signal in a particular paging opportunity at each UE-particular paging DRX cycle. When the UE is in the ECM-IDLE state, the network does not hold context information of the UE. Therefore, the UE in the ECM-IDLE state can carry out a mobility-related procedure based on the UE such as cell selection or cell reselection without having to take an order of the network. In case the position of the UE in the ECM-IDLE state changes from the position known to the network, the UE can inform the network about its position through a tracking area update (TAU) procedure. On the other hand, if the UE is in the ECM-CONNECTED state, mobility of the UE is managed by the command of the network. While the UE is in the ECM-CONNECTED state, the network is informed of the cell to which the UE belongs to. Therefore, the network transmits and receives data to and from the UE, controls mobility such as the UE's handover, and carries out cell measurement of neighboring cells.

As described above, in order for the UE to receive a conventional mobile communication service such as voice or data communication, the UE needs to make a transition to the ECM-CONNECTED state. When the UE is powered on for the first time, the UE at its initial stage stays in the ECM-IDLE state similarly as done for the EMM state; if the UE is registered successfully to the corresponding network through the initial attach procedure, the UE and the MME make a transition to the ECM-CONNECTED state. Also, if the UE is registered in the network but radio resources are not assigned as traffic is deactivated, the UE stays in the ECM-IDLE state; if new uplink or downlink traffic is generated for the corresponding UE, the UE and the MME make a transition to the ECM-CONNECTED state through a service request procedure.

Figure 3:
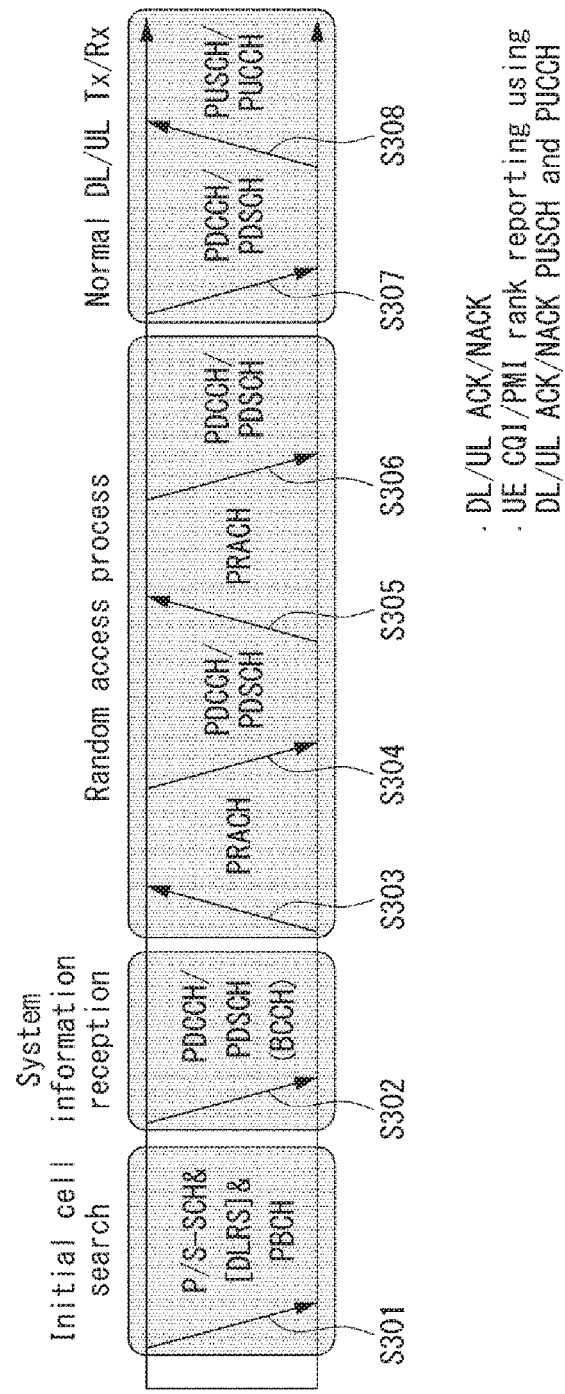
FIG. 3 is a diagram for describing physical channels and a general signal transmission method using them used in the 3GPP LTE/LTE-A system to which the present invention can be applied.

FIG. 3 illustrates physical channels used for the 3GPP LTE/LTE-A system to which the present invention can be applied and a general signal transmission method using the physical channels.

A UE, which may have been powered on again from the power-off state or may have newly entered a cell, carries out the initial cell search task such as synchronizing itself with an eNB in the S301 step. To this purpose, the UE synchronizes with the eNB by receiving a primary synchronization channel (P-SCH) and a secondary synchronization channel (S-SCH) from the eNB and obtains information such as a cell ID (identifier).

Afterwards, the UE receives a physical broadcast channel (PBCH) signal from the eNB and obtains broadcast signal within the eNB. Meanwhile, the UE receives a downlink reference signal (DL RS) in the initial cell search step to check the downlink channel status.

The UE which has finished the initial cell search receives a PDSCH according to the PDCCH and PDCCH information in the S302 step to obtain more specific system information.

Next, the UE may carry out a random access procedure such as the steps of S303 to S306 to complete a connection process to the eNB. To this purpose, the UE transmits a preamble S303 through a physical random access channel (PRACH) and receives a response message in response to the preamble through a PDSCH corresponding to the PRACH S304. In the case of contention-based random access, the UE may carry out a contention resolution procedure including transmission of an additional PRACH signal S305 and reception of a PDCCH signal and the PDSCH signal corresponding to the PDCCH signal S306.

Afterwards, the UE which has carried out the procedure above may carry out reception S307 of the PDCCH signal and/or PDSCH signal and transmission S308 of a PUSCH signal and/or a PUCCH signal as a conventional uplink/downlink signal transmission procedure.

The control information that the UE transmits to the eNB is called collectively uplink control information (UCI). The UCI includes HARQ-ACK/NACK, a scheduling request (SR), a channel quality indicator (CQI), a precoding matrix indicator (PMI), and rank indication (RI) information.

In the LTE/LTE-A system, the UCI is transmitted periodically through the PUCCH; the UCI can be transmitted through the PUSCH if control information and traffic data have to be transmitted at the same time. Also, the UCI can be transmitted non-periodically through the PUSCH according to a request or a command from the network.

Figure 4:
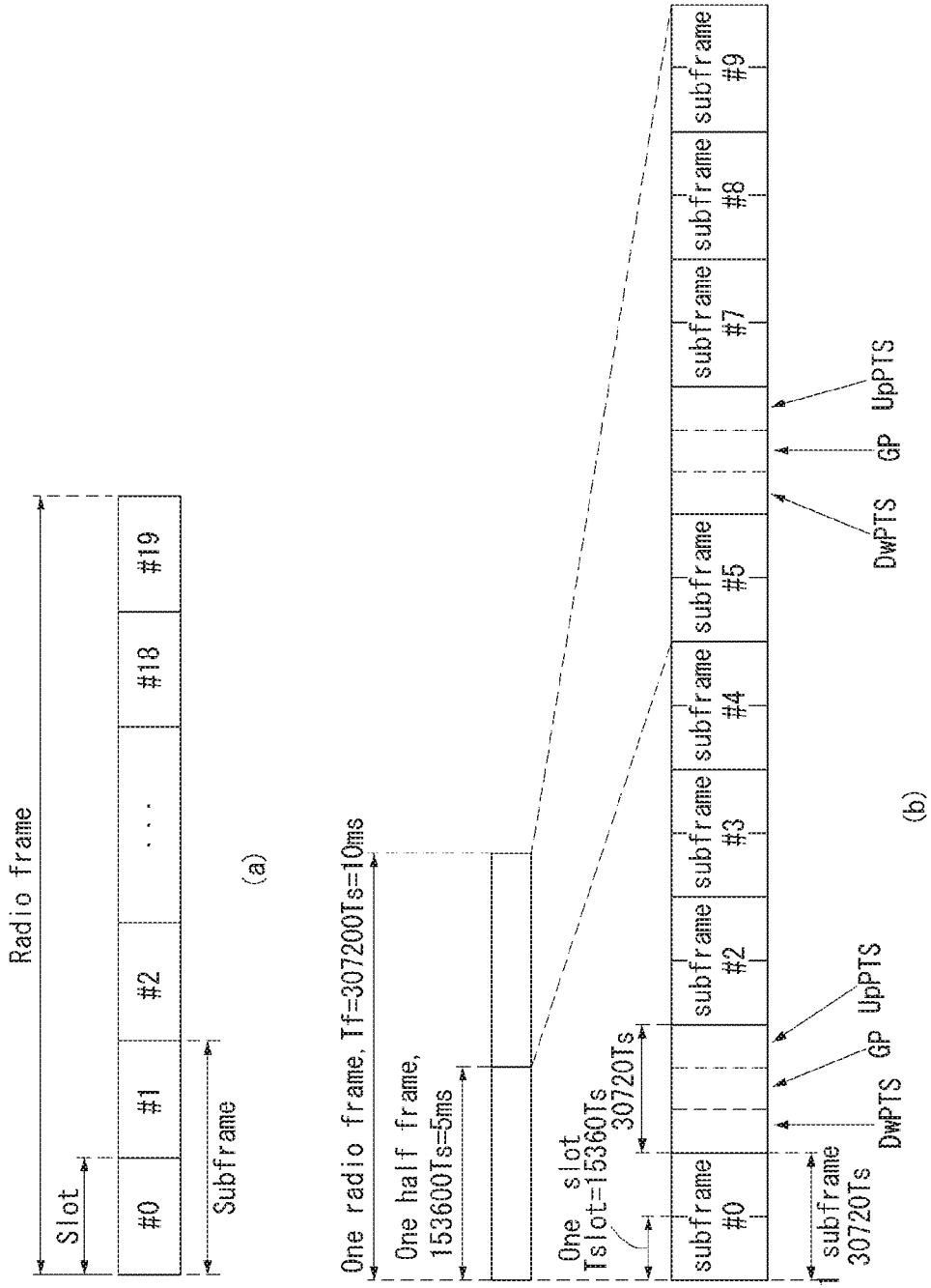
FIG. 4 is a diagram showing the structure of a radio frame used in a 3GPP LTE/LTE-A system to which the present invention can be applied.

FIG. 4 is a diagram showing the structure of a radio frame used in a 3GPP LTE system to which the present invention can be applied.

In a cellular OFDM radio packet communication system, uplink/downlink data packet transmission is performed in subframe units and one subframe is defined as a predetermined duration including a plurality of OFDM symbols. The 3GPP LTE standard supports a type-1 radio frame structure applicable to frequency division duplex (FDD) and a type-2 radio frame structure applicable to time division duplex (TDD). According to the FDD scheme, the UL transmission and the DL transmission are performed by occupying different frequency bandwidths. According to the TDD scheme, the UL transmission and the DL transmission are performed on respective times different from each other while occupying the same frequency bandwidth. The channel response in the TDD scheme is substantially reciprocal. This signifies that the DL channel response and the UL channel response are about the same in a given frequency domain. Accordingly, there is a merit that the DL channel response can be obtained from the UL channel response in wireless communication systems based on the TDD. In the TDD scheme, since entire frequency bandwidth is timely divided in the UL transmission and the DL transmission, the DL transmission by an eNB and the UL transmission by a UE may not be performed simultaneously. In the TDD system in which the UL transmission and the DL transmission are distinguished by a unit of subframe, the UL transmission and the DL transmission are performed in different subframes.

FIG. 4(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the 3GPP LTE system, since OFDMA is used in the downlink, an OFDM symbol indicates one symbol period. The OFDM symbol may be referred to as an SC-FDMA symbol or symbol period. A RB as a resource allocation unit may include a plurality of consecutive subcarriers in one slot.

The number of OFDM symbols included in one slot may be changed according to the configuration of cyclic prefix (CP). CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

In case of using the normal CP, since one slot includes seven OFDM symbols, one subframe includes 14 OFDM symbols. At this time, a maximum of three first OFDM symbols of each subframe may be allocated to a physical downlink control channel (PDCCH) and the remaining OFDM symbols may be allocated to a physical downlink shared channel (PD SCH).

FIG. 4(b) shows the structure of the type-2 radio frame. The type-2 radio frame includes two half frames and each half frame includes five subframes, a downlink pilot time slot (DwPTS), a guard period (GP) and an uplink pilot time slot (UpPTS). From among these, one subframe includes two slots. The DwPTS is used for initial cell search, synchronization or channel estimation of a UE. The UpPTS is used for channel estimation of a BS and uplink transmission synchronization of a UE. The GP is used to eliminate interference generated in the uplink due to multi-path latency of a downlink signal between the uplink and the downlink.

The structure of the radio frame is only exemplary and the number of subframes included in the radio frame, the number of slots included in the subframe, or the number of symbols included in the slot may be variously changed.

Figure 5:
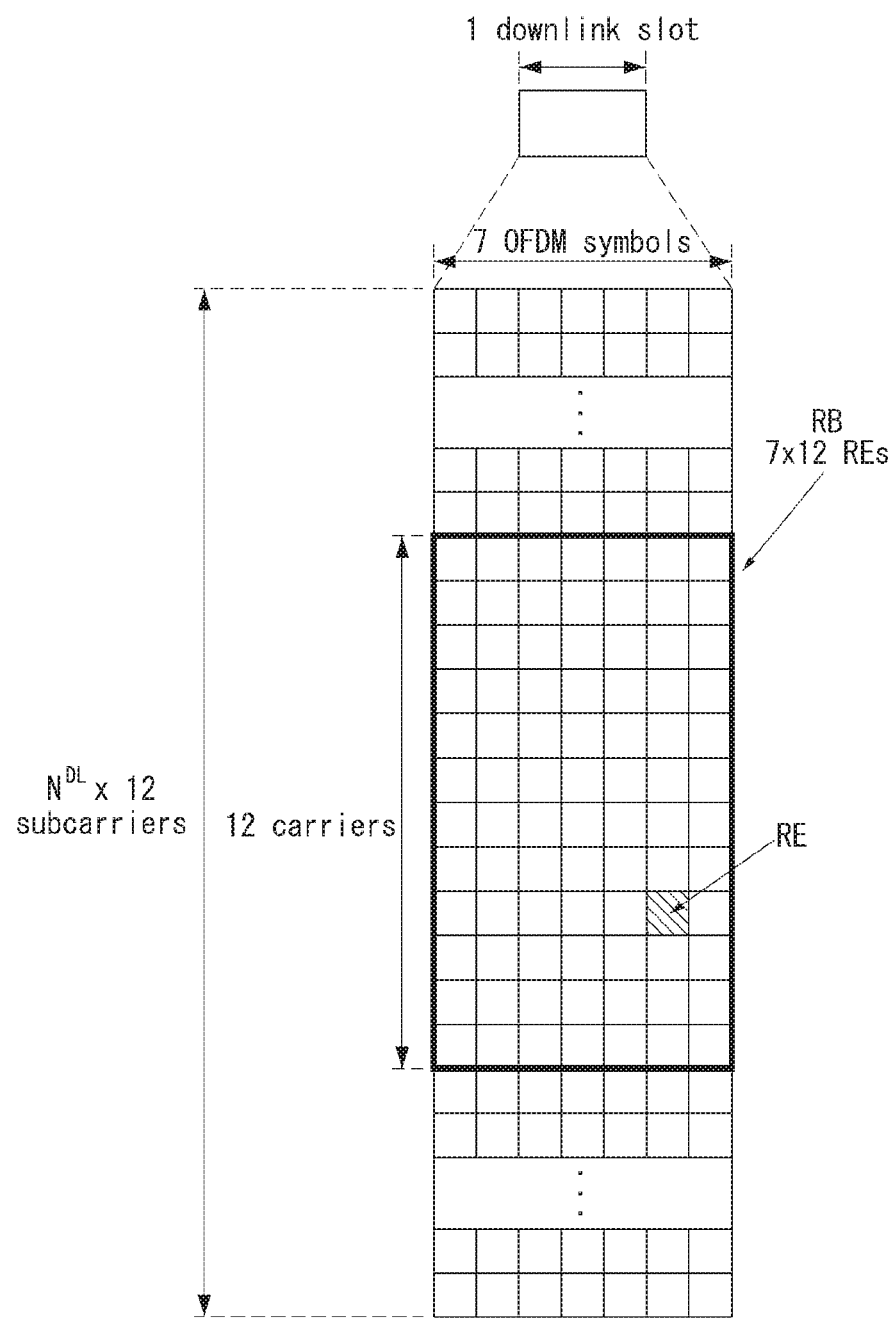
FIG. 5 shows an example of a resource grid for one downlink slot in the wireless communication system to which the present invention can be applied.

FIG. 5 shows an example of a resource grid for one downlink slot in the wireless communication system to which the present invention can be applied.

Referring to the FIG. 5, the downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block includes 12×7 resource elements. The resource element on the resource grid may be identified by an index pair (k, l) in the slot. Here, k (k=0, NRB×12−1) denotes an index of subcarrier in the frequency domain, and l (l=0, . . . , 6) denotes an index of symbol in the time domain. The number NDL of resource blocks included in the downlink slot depends on a downlink transmission bandwidth determined in a cell.

Figure 6:
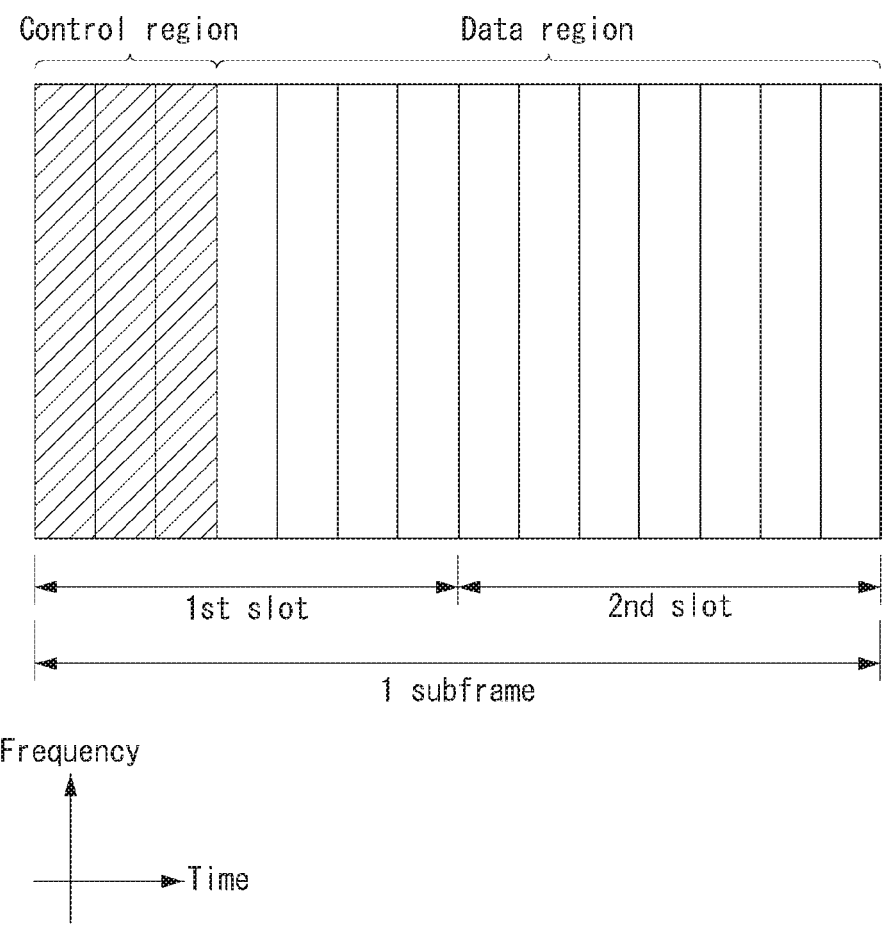
FIG. 6 shows a structure of a downlink subframe in the wireless communication system to which the present invention can be applied.

FIG. 6 shows a structure of a downlink subframe in the wireless communication system to which the present invention can be applied.

Referring to the FIG. 6, a maximum of three OFDM symbols located in a front portion of a first slot in a subframe correspond to a control region to be assigned with control channels. The remaining OFDM symbols correspond to a data region to be assigned with physical downlink shared channels (PDSCHs).

Examples of downlink control channels used in the 3GPP LTE include a physical control format indicator channel (PCFICH), a physical downlink control channel (PDCCH), a physical hybrid-ARQ indicator channel (PHICH), etc. The PCFICH transmitted in a 1st OFDM symbol of a subframe carries information regarding the number of OFDM symbols (i.e., a size of a control region) used for transmission of control channels in the subframe. Control information transmitted over the PDCCH is referred to as downlink control information (DCI). The DCI transmits uplink resource assignment information, downlink resource assignment information, an uplink transmit power control (TPC) command for any UE groups, etc. The PHICH carries an acknowledgement (ACK)/not-acknowledgement (NACK) signal for an uplink hybrid automatic repeat request (HARD). That is, the ACK/NACK signal for uplink data transmitted by a UE is transmitted over the PHICH.

A BS determines a PDCCH format according to DCI to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC.

Figure 7:
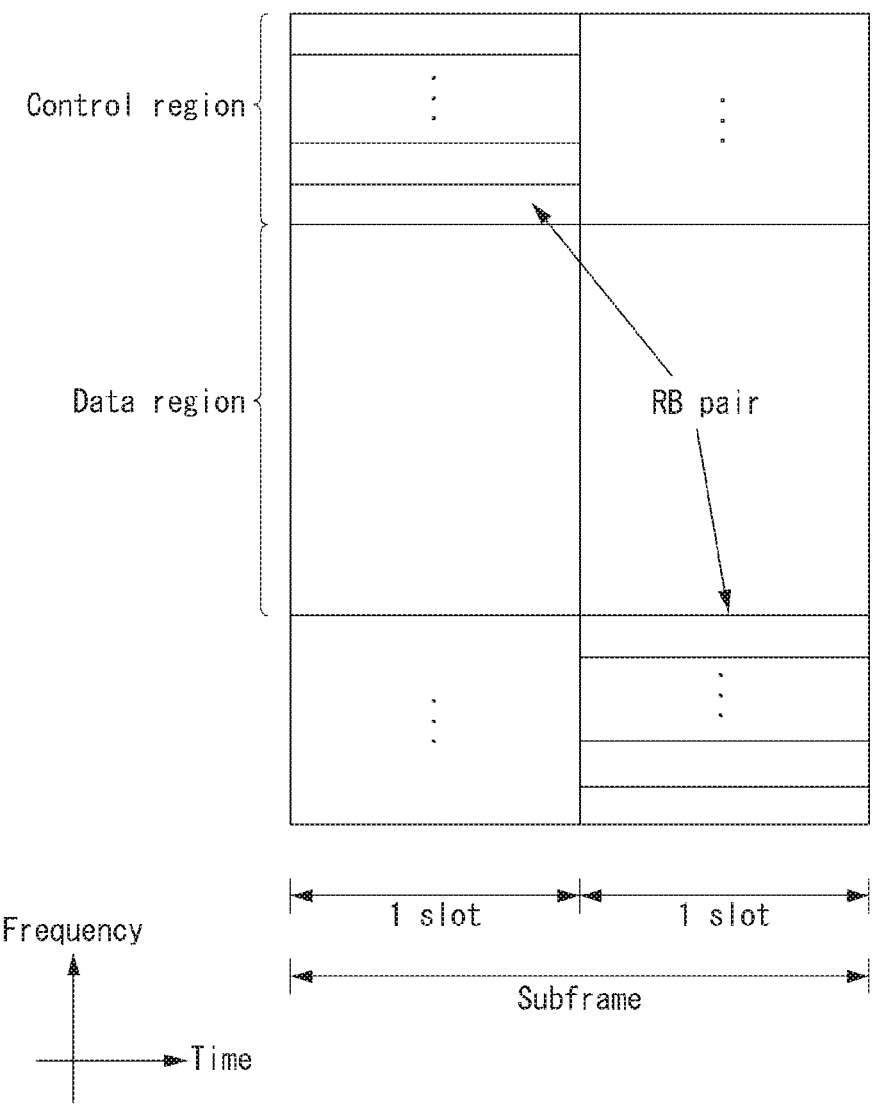
FIG. 7 shows a structure of an uplink subframe in the wireless communication system to which the present invention can be applied.

FIG. 7 shows a structure of an uplink subframe in the wireless communication system to which the present invention can be applied.

Referring to the FIG. 7, the uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. In case of being indicated from higher layer, UE can simultaneously transmit the PUCCH and the PUSCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Physical Downlink Control Channel (PDCCH)

The control information transmitted through the PDCCH is referred to as a downlink control indicator (DCI). In the PDCCH, a size and use of the control information are different according to a DCI format. In addition, a size of the control information may be changed according to a coding rate.

Table 1 represents the DCI according to the DCI format.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, the DCI format includes format 0 for the PUSCH scheduling, format 1 for scheduling of one PDSCH codeword, format 1A for compact scheduling of one PDSCH codeword, format 1C for very compact scheduling of the DL-SCH, format 2 for PDSCH scheduling in a closed-loop spatial multiplexing mode, format 2A for PDSCH scheduling in an open-loop spatial multiplexing mode, formats 3 and 3A for transmitting a transmission power control (TPC) command for a UL channel, and format 4 for PUSCH scheduling within one UL cell in a multiple antenna port transmission mode.

The DCI format 1A may be used for PDSCH scheduling whichever transmission mode is configured to a UE.

Such DCI formats may be independently applied to each UE, and the PDCCHs of several UEs may be simultaneously multiplexed in one subframe. The PDCCH is comprised of an aggregation of one or a few continuous control channel elements (CCEs). The CCE is a logical allocation unit used for providing a coding rate according to a state of radio channel to the PDCCH. The CCE is referred to as a unit that corresponds to nine sets of resource element group (REG) which is comprised of four resource elements. An eNB may use {1, 2, 4, 8} CCEs for constructing one PDCCH signal, and this {1, 2, 4, 8} is called a CCE aggregation level. The number of CCE used for transmitting a specific PDCCH is determined by the eNB according to the channel state. The PDCCH configured according to each UE is mapped with being interleaved to a control channel region of each subframe by a CCE-to-RE mapping rule. A location of the PDCCH may be changed according to the number of OFDM symbols for the control channel, the number of PHICH group, a transmission antenna, a frequency shift, etc.

As described above, a channel coding is independently performed for the PDCCH of each multiplexed UE, and the cyclic redundancy check (CRC) is applied. By masking each UE ID to CRC, the UE may receive its PDCCH. However, in the control region allocated in a subframe, the eNB does not provide information on where the PDCCH that corresponds to the UE is. Since the UE is unable to know on which position its PDCCH is transmitted with which CCE aggregation level and DCI format in order to receive the control channel transmitted from the eNB, the UE finds its own PDCCH by monitoring a set of PDCCH candidates in a subframe. This is called a blind decoding (BD). The blind decoding may also be called a blind detection or a blind search. The blind decoding signifies a method of verifying whether the corresponding PDCCH is its control channel by checking CRC errors, after the UE de-masks its UE ID in CRC part.

Buffer Status Reporting (BSR)

Figure 8:
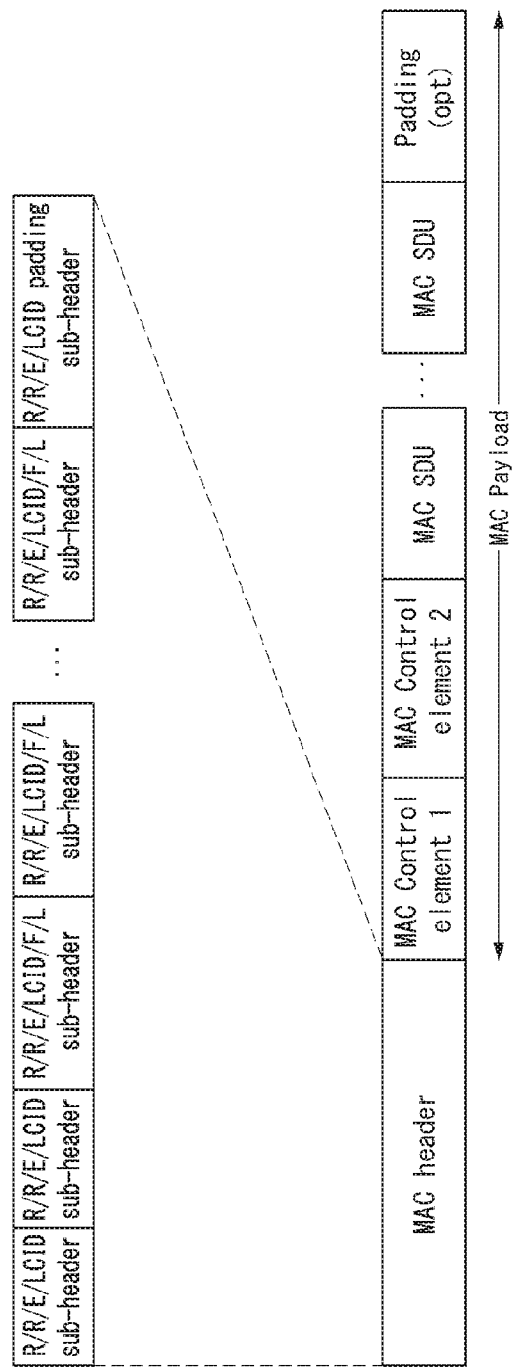
FIG. 8 illustrates the MAC PDU used in the MAC entity in the wireless communication system to which the present invention can be applied.

FIG. 8 illustrates the MAC PDU used in the MAC entity in the wireless communication system to which the present invention can be applied.

Referring to FIG. 8, the MAC PDU includes a MAC header, at least one MAC service data unit (SDU) and at least one control element, additionally may include padding. In some cases, at least one of the MAC SDUs and the MAC control elements may not be included in the MAC PDU.

As an example of FIG. 8, it is common that the MAC control elements are located ahead of the MAC SDUs. And the size of MAC control elements may be fixed or changeable. In case that the size of MAC control elements is changeable, it may be determined through an extended bit whether the size of MAC control elements is extended. The size of MAC SDU may be also variable.

The MAC header may include at least one sub-header. In this time, at least one sub-header that is included in the MAC header is respectively corresponding to the MAC SDUs, the MAC control elements and the padding, and the order of the sub-header is same as the arrangement order of the corresponding elements. For example, as an example of FIG. 8, if there are included MAC control element 1, MAC control element 2, a plurality of MAC SDUs and padding in the MAC PDU, in the MAC header, the following may be arranged in order as a sub-header corresponding to the MAC control element 1, a sub-header corresponding to the MAC control element 2, a plurality of sub-headers corresponding to a plurality of MAC SDUs respectively and a sub-header corresponding to the padding.

Sub-headers included in the MAC header, as an example of FIG. 8, six header fields may be included. Particularly, the sub-header may include six header fields of R/R/E/LCID/F/L.

For the sub-header corresponding to the very last one among the sub-header corresponding to the MAC control element of fixed size and data fields included in the MAC PDU, as an example illustrated in FIG. 8, the sub-header that is included four header fields may be used. In case that the sub-header includes four fields like this, the four fields may be R/R/E/LCID.

Figure 9:
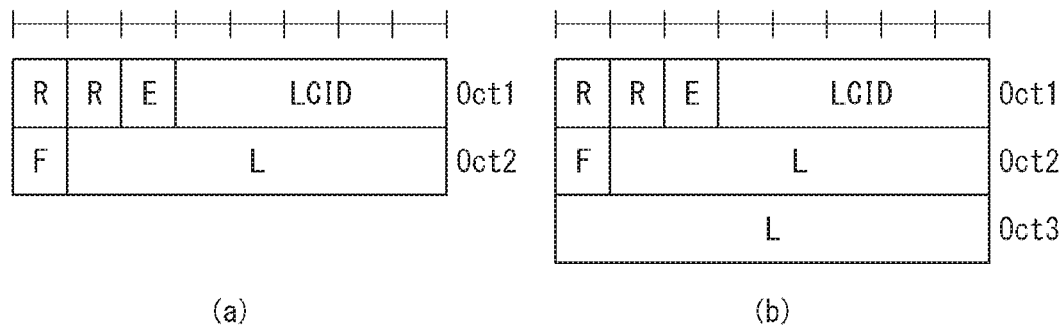
FIG. 9 and FIG. 10 illustrate the sub-header of the MAC PDU in the wireless communication system to which the present invention can be applied.
Figure 10:
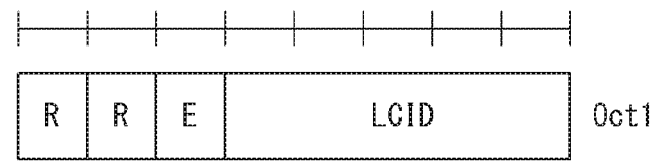

FIG. 9 and FIG. 10 illustrate the sub-header of the MAC PDU in the wireless communication system to which the present invention can be applied.

Each field is described as below with reference to FIG. 9 and FIG. 10.

1) R: Reserved bit, which is not used.

2) E: Extended field, which represents whether the elements corresponding to the sub-header are extended. For example, in case that E field is '0', the element corresponding to the sub-header is terminated without any repeat, and in case that E field is '1', the element corresponding to the sub-header is repeated once more and may be extended by twice in the length.

LCD: Logical channel identification field identifies a logical channel corresponding to the relevant MAC SDU or identifies a type of the relevant MAC control element and padding. If the MAC SDU is associated with the sub-header, it may show which logical channel the MAC SDU is corresponding to, and if the MAC control element is associated with the sub-header, it may show what the MAC control element is.

Table 2 represents the value of LCID for the DL-SCH

TABLE 2

| Index | LCD values |
|---|---|
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

Table 3 represents the value of LCID for the UL-SCH

TABLE 3

| Index | LCD values |
|---|---|
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In LTE/LTE-A system, the UE may report the buffer state of its own to the network by configuring one of the index value among truncated BSR, short BSR, and long BSR in the LCID field.

The relationship of mapping between the index and the LCID value illustrated in Table 2 and Table 3 is exemplified for the convenience of the descriptions, but the present invention is not limited thereto.

4) F: Format field, which represents the size of L field.

5) L: Length field, which represents the size of MAC SDU and MAC control element corresponding to the sub-header. If the size of MAC SDU or MAC control element corresponding to the sub-header is equal to or less than 127 bits, the 7-bit L field is used (FIG. 9 (a)), otherwise, the 15-bit L field may be used (FIG. 9 (b)). In case that the size of MAC control element is changeable, the size of MAC control element may be defined by the L field. In case that the size of MAC control element is fixed, the size of MAC control element may be determined without the size of MAC control element being defined by the L field, accordingly the F and L field may be omitted as shown in FIG. 10.

Figure 11:
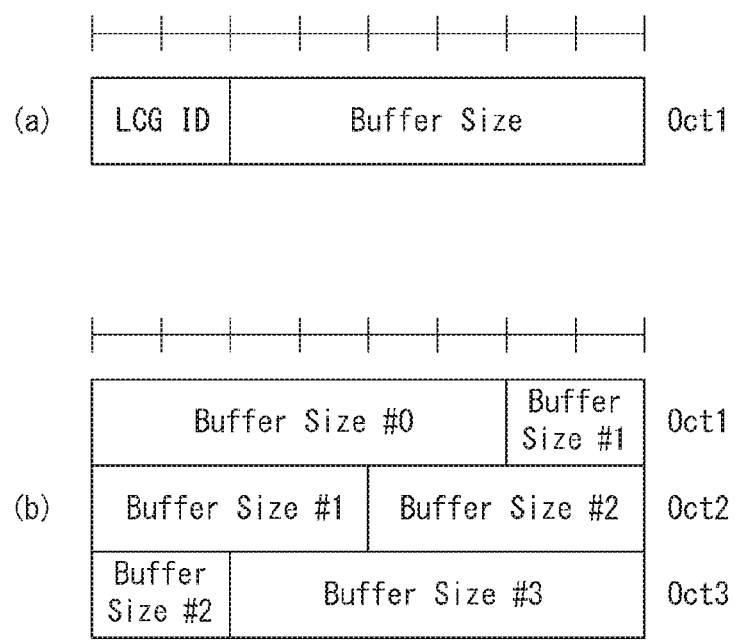
FIG. 11 illustrates formats of the MAC control elements in order to report the buffer state in the wireless communication system to which the present invention can be applied.

FIG. 11 illustrates formats of the MAC control elements in order to report the buffer state in the wireless communication system to which the present invention can be applied.

In case of the truncated BSR and short BSR being defined in the LCID field of sub-header, the MAC control element corresponding to the sub-header, as shown in FIG. 11 (a), may be configured to include one logical channel group identification (LCG ID) field and one buffer size field indicating the buffer state of the LCG. The LCG ID field is for identifying the logical channel group that is required to report the buffer state, which may have the size of 2 bits.

The buffer size field is used for identifying the total amount of available data from the all logical channels that are included in the LCG. The available data includes all the data that are going to be transmitted from the RLC layer and the PDCP layer, and the amount of data is represented in byte. In this time, the size of RLC header and MAC header may be excluded when calculating the amount of data. The buffer size field may be 6 bits.

In case of the extended BSR being defined in the LCD field of sub-header, the MAC control element corresponding to the sub-header, as shown in FIG. 11 (b), may include four buffer size fields indicating the buffer state of four groups having 0 to 3 LCG IDs. Each of the buffer size fields may be used for identifying the total amount of available data from different logical channel groups.

Uplink Resource Allocation Procedure

In 3GPP LTE/LTE-A system, in order to maximize resource utilization, the data transmission and reception method based on scheduling of an eNB is used. This signifies that if there are data to transmit by a UE, the UL resource allocation is preferentially requested to the eNB, and the data may be transmitted using only UL resources allocated by the eNB.

FIG. 12 illustrates a UL resource allocation procedure of a UE in the wireless communication system to which the present application can be applied.

For effective utilization of the UL radio resources, an eNB should know which sorts and what amount of data to be transmitted to the UL for each UE. Accordingly, the UE itself may forward the information of UL data to transmit, and the eNB may allocate the UL resources to the corresponding UE based on this. In this case, the information of the UL data that the UE forwards to the eNB is the quality of UL data stored in its buffer, and this is referred to as a buffer status report (BSR). The BSR is transmitted using a MAC control element in case that the resources on the PUSCH in current TTI are allocated to the UE and the reporting event is triggered.

FIG. 12(a) exemplifies a UL resource allocation procedure for actual data in case that the UL radio resources for the buffer status reporting (BSR) are not allocated to a UE. That is, for a UE that switches a state of active mode in the DRX mode, since there is no data resource allocated beforehand, the resource for UL data should be requested starting from the SR transmission through the PUCCH, in this case, the UL resource allocation procedure of 5 steps is used.

Referring to FIG. 12(a), the case that the PUSCH resource for transmitting the BSR is not allocated to a UE is illustrated, and the UE transmits the scheduling request (SR) to an eNB first in order to be allocated with the PUSCH resources (step, S1201).

The scheduling request (SR) is used to request in order for the UE to be allocated with the PUSCH resource for UL transmission in case that the reporting event is occurred but the radio resource is not scheduled on the PUSCH in current TTI. That is, the UE transmits the SR on the PUCCH when the regular BSR is triggered but does not have the UL radio resource for transmitting the BSR to the eNB. The UE transmits the SR through the PUCCH or starts the random access procedure according to whether the PUCCH resources for the SR are configured. In particular, the PUCCH resources in which the SR can be transmitted may be determined as a combination of the PRB through which the SR is transmitted, the cyclic shift (CS) applied to a basic sequence (e.g., ZC sequence) for spread in frequency domain of the SR and an orthogonal code (OC) for spread in time domain of the SR. Additionally, the SR periodicity and the SR subframe offset information may be included. The PUCCH resources through which the SR can be transmitted may be configured by a higher layer (e.g., the RRC layer) in UE-specific manner.

When a UE receives the UL grant for the PUSCH resources for BSR transmission from an eNB (step, S1203), the UE transmits the triggered BSR through the PUSCH resources which are allocated by the UL grant (step, S1205).

The eNB verifies the quality of data that the UE actually transmit to the UL through the BSR, and transmits the UL grant for the PUSCH resources for actual data transmission to the UE (step, S1207). The UE that receives the UL grant for actual data transmission transmits the actual UL data to the eNB through the PUSCH resources (step, S1209).

FIG. 12(b) exemplifies the UL resource allocation procedure for actual data in case that the UL radio resources for the BSR are allocated to a UE.

Referring to FIG. 12(b), the case that the PUSCH resources for BRS transmission are already allocated to a UE is illustrated. In the case, the UE transmits the BSR through the allocated PUSCH resources, and transmits a scheduling request to an eNB (step, S1211). Subsequently, the eNB verifies the quality of data to be transmitted to the UL by the UE through the BSR, and transmits the UL grant for the PUSCH resources for actual data transmission to the UE (step, S1213). The UE that receives the UL grant for actual data transmission transmits the actual UL data to the eNB through the allocated PUSCH resources (step, S1215).

Random Access Channel (RACH) Procedure

FIGS. 13a and 13b illustrate one example of a random access procedure in the LTE system.

The random access procedure is carried out during initial connection in the RRC_IDLE state, initial connection after radio link failure, handover which requires the random access procedure, and upon occurrence of uplink or downlink data requiring the random access procedure while in the RRC_CONNECTED state. Part of the RRC message such as the RRC connection request message, cell update message, and UTRAN registration area (URA) update message is also transmitted through the random access procedure. Logical channels such as a common control channel (CCCH), dedicated control channel (DCCH), and dedicated traffic channel (DTCH) can be mapped to a physical channel, random access channel (RACH). The RACH is mapped to a physical channel, physical random access channel (PRACH).

If the MAC layer of the UE commands the UE's physical layer to perform PRACH transmission, the UE's physical layer first selects one access slot and one signature and transmits a PRACH preamble through uplink transmission. The random access procedure is divided into a contention-based random access procedure and a non-contention based random access procedure.

FIG. 13a illustrates one example of a contention-based random access procedure, and FIG. 13b illustrates one example of a non-contention based random access procedure.

First, the contention-based random access procedure will be described with reference to FIG. 13a.

The UE receives information about random access from the eNB through system information and stores the received information. Afterwards, in case random access is needed, the UE transmits a random access preamble (which is also called a message 1) to the eNB S1301.

If the eNB receives a random access preamble from the UE, the eNB transmits a random access response message (which is also called a message 2) to the UE S1302. More specifically, downlink scheduling information about the random access response message, being CRC-masked with a random access-ratio network temporary identifier (RA-RNTI), can be transmitted on an L1 or L2 control channel (PDCCH). The UE, which has received a downlink scheduling signal masked with an RA-RNTI, can receive the random access response message from a physical downlink shared channel (PDSCH) and decode the received message. Afterwards, the UE checks the random access response message as to whether random access response information for the UE exists.

The UE can determine existence of random access response information by checking existence of a random access preamble ID (RAID) with respect to the preamble that the UE has transmitted.

The random access response information includes timing alignment (TA) indicating timing offset information for synchronization, radio resource allocation information used for uplink transmission, and a temporary C-RNTI for identifying UEs.

If receiving random access response information, the UE carries out uplink transmission (which is also called a message 3) to an uplink shared channel (UL-SCH) according to radio resource allocation information included in the response information S1303. At this time, uplink transmission may be described as scheduled transmission.

After receiving the uplink transmission from the UE, the eNB transmits a message for contention resolution (which is also called a message 4) to the UE through a downlink shared channel (DL-SCH) S1304.

Next, a non-contention based random access procedure will be described with reference to FIG. 13b.

Before the UE transmits a random access preamble, the eNB allocates a non-contention random access preamble to the UE S1311.

The non-contention random access preamble can be allocated through a handover command or dedicated signaling such as signaling through the PDCCH. In case non-contention random access preamble is allocated to the UE, the UE transmits the allocated non-contention random access preamble to the eNB S1312.

Afterwards, similarly to the S1302 step of the contention-based random access procedure, the UE can transmit a random access response (which is also called a message 2) to the UE S1313.

Although the HARQ is not applied for a random access response during the random access procedure described above, the HARQ can be applied for uplink transmission with respect to a random access response or a message for contention resolution. Therefore, the UE doesn't have to transmit ACK or NACK signal for the case of the random access response.

Physical Uplink Control Channel (PUCCH)

Uplink control information (UCI) transmitted through a PUCCH may include a scheduling request (SR), HARQ ACK/NACK information and downlink channel measurement information.

The HARQ ACK/NACK information may be generated depending on whether a downlink data packet on a PDSCH has been successfully decoded or not. In an existing wireless communication system, 1 bit is transmitted as ACK/NACK information with respect to the transmission of downlink single codeword, and 2 bits are transmitted as ACK/NACK information with respect to the transmission of downlink 2 codewords.

The channel measurement information refers to feedback information related to a multiple input multiple output (MIMO) scheme, and may include a channel quality indicator (CQI), a precoding matrix index (PMI) and a rank indicator (RI). Pieces of these channel measurement information may be collectively expressed as a CQI.

For the transmission of a CQI, 20 bits may be used per subframe.

A PUCCH may be modulated using binary phase shift keying (BPSK) scheme and a quadrature phase shift keying (QPSK) scheme. Control information of a plurality of UEs may be transmitted through a PUCCH. If code division multiplexing (CDM) is performed to distinguish the signals of UEs, a constant amplitude zero autocorrelation (CAZAC) sequence of a length 12 is chiefly used. The CAZAC sequence has a characteristic in that it maintains constant amplitude in a time domain and a frequency domain, and thus has a property suitable for increasing coverage by lowering the peak-to-average power ratio (PAPR) or cubic metric (CM) of a UE. Furthermore, ACK/NACK information for downlink data transmission transmitted through a PUCCH is covered using orthogonal sequence or orthogonal cover (OC).

Furthermore, control information transmitted on a PUCCH may be distinguished using a cyclically shifted sequence having a different cyclic shift (CS) value. The cyclically shifted sequence may be generated by cyclically shifting a base sequence by a specific CS amount. The specific CS amount is indicated by a CS index. The number of available cyclic shifts may be different depending on the latency spread of a channel. A variety of types of sequences may be used as the base sequence, and the aforementioned CAZAC sequence is an example thereof.

Furthermore, the amount of control information which may be transmitted by a UE in one subframe may be determined depending on the number of SC-FDMA symbols which may be used to send control information (i.e., SC-FDMA symbols other than an SC-FDMA symbol used in the transmission of a reference signal (RS) for the coherent detection of a PUCCH.

In the 3GPP LTE system, a PUCCH is defined as a total of different formats depending on transmitted control information, a modulation scheme and the amount of control information. The attributes of uplink control information (UCI) transmitted may be summarized as in Table 4 below depending on each PUCCH format.

TABLE 4

| PUCCH format | Modulation scheme | # of bits per subframe | Usage |
| --- | --- | --- | --- |
| 1(x) | N/A | N/A | Scheduling Request |
| 1a | BPSK | 1 | 1-bit A/N + SR |
| 1b | QPSK | 2 | 2-bits A/N + SR |
| 2x | QPSK | 20 | CQI or CQI + A/N |
| 2a | QPSK + BPSK | 20 + 1 | CQI + 1-bit A/N |
| 2b | QPSK + BPSK | 20 + 2 | CQI + 2-bits A/N |
| 3 | QPSK | 48 | A/N + SR |

PUCCH format 1(x) is used for SR-only transmission. In the case of SR-only transmission, a waveform which is not modulated is applied.

The PUCCH format 1a or 1b is used to transmit HARQ ACK/NACK. In the case that HARQ ACK/NACK is solely transmitted in a specific subframe, PUCCH format 1a or 1b may be used. Alternatively, HARQ ACK/NACK and an SR may be transmitted in the same subframe using PUCCH format 1a or 1b.

As described above, PUCCH format 1a or 1b may be used for the case that an SR is transmitted together with HARQ ACK/NACK. A PUCCH index for HARQ ACK/NACK is implicitly determined from a lower CCE index which is mapped for the related PDCCH.

Multiplexing Negative SR with A/N
: A UE transmits A/N to A/N PUCCH resource which is mapped to the lowest CCE index used in a PDCCH.

Multiplexing Positive SR with A/N
: A UE transmits A/N using the SR PUCCH resource allocated from an eNB.

PUCCH format 2 is used for the transmission of a CQI, and PUCCH format 2a or 2b is used for the transmission of a CQI and HARQ ACK/NACK.

In the case of the extended CP, PUCCH format 2 may also be used for the transmission of a CQI and HARQ ACK/NACK.

An SR resource of a UE is setup/released through an RRC Connection Reconfig. (Radio Resource Config. Dedicated (Physical config. Dedicated (SR config))).

Here, SR resource for maximum 2048 UEs is available to be allocated in one subframe. This means that 2048 logical indexes are defined for PUCCH, and the physical resource for PUCCH formats 1 to 3 may be mapped up to 2048 logically.

It is designed that an SR periodicity may be set to 1 ms to 80 ms according to an SR configuration index in the configuration of SR resource per UE, and an SR subframe offset is also configured according to an index.

An SR signaling of a UE is defined to use simple On-Off Keying (O.O.K) scheme, and defined to mean that D(0)=1: Request a PUSCH resource (positive SR), Transmitting nothing: not request to be scheduled (negative SR).

In addition, an SR is designed to use the CAZAC sequence having the length of 12 and the OC sequences having the length of 3 such that the SR for maximum 36 UEs is able to be allocated through PUCCH 1 RB (in the case of the Normal CP).

A DMRS position of PUCCH format 1/1a/1b(A/N, SR) will be described in detail below in FIG. 14.

Figure 14:
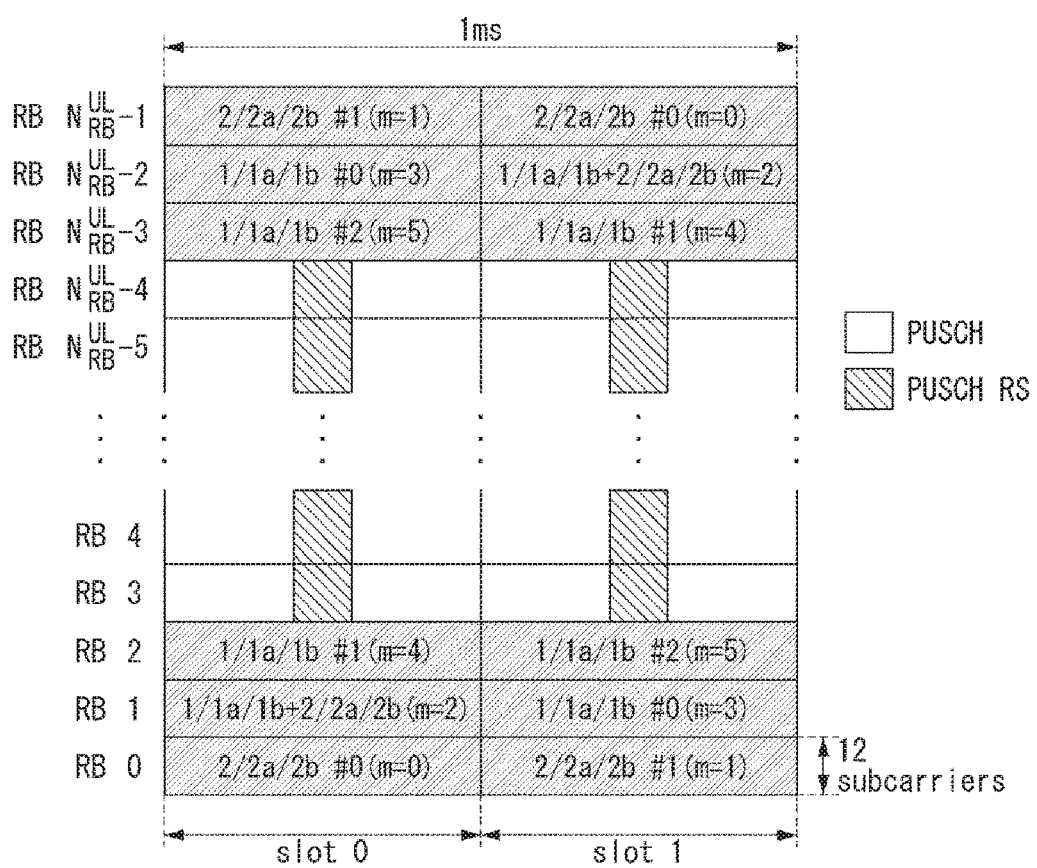
FIG. 14 illustrates an example of a type in which PUCCH formats are mapped to a PUCCH region of an uplink physical resource block in the wireless communication system to which the present invention may be applied.

FIG. 14 illustrates an example of a type in which PUCCH formats are mapped to a PUCCH region of an uplink physical resource block in the wireless communication system to which the present invention may be applied.

In FIG. 14, NRBUL represents the number of resource blocks in the uplink, and 0, 1, ..., NRBUL−1 mean the numbers of physical resource blocks. Basically, the PUCCH is mapped to both edges of an uplink frequency block. As illustrated in FIG. 14, PUCCH format 2/2a/2b is mapped to a PUCCH region expressed as m=0, 1 and this may be expressed in such a manner that PUCCH format 2/2a/2b is mapped to resource blocks positioned at a band edge. Furthermore, both PUCCH format 2/2a/2b and PUCCH format 1/1a/1b may be mixedly mapped to a PUCCH region expressed as m=2.

Next, PUCCH format 1/1a/1b may be mapped to a PUCCH region expressed as m=3, 4, and 5. The number (NRB(2)) of PUCCH RBs which are usable by PUCCH format 2/2a/2b may be indicated to UEs in a cell by broadcasting signaling.

PUCCH format 2/2a/2b is described. PUCCH format 2/2a/2b is a control channel for transmitting channel measurement feedback (CQI, PMI, and RI).

A reporting period of the channel measurement feedbacks (hereinafter, collectively expressed as CQI information) and a frequency unit (or a frequency resolution) to be measured may be controlled by an eNB. In the time domain, periodic and aperiodic CQI reporting may be supported. PUCCH format 2 may be used for only the periodic reporting and the PUSCH may be used for aperiodic reporting. In the case of the aperiodic reporting, an eNB may instruct a UE to transmit a scheduling resource on which an individual CQI reporting is carried for the uplink data transmission.

PUCCH Channel Structure

The PUCCH formats 1a and 1b are described.

In the PUCCH formats 1a/1b, a symbol modulated using the BPSK or QPSK modulation scheme is multiplied by a CAZAC sequence of a length 12. For example, the results of the multiplication of a modulation symbol d(0) by a CAZAC sequence r(n) (n=0, 1, 2, ..., N−1) of a length N are y(0), y(1), y(2), ..., y(N−1). y(0), ..., y(N−1) symbols may be called a block of symbols. After a modulation symbol is multiplied by a CAZAC sequence, block-wise spreading using an orthogonal sequence is applied.

A Hadamard sequence of a length 4 is used for common ACK/NACK information, and a discrete Fourier transform (DFT) sequence of a length 3 is used for shortened ACK/NACK information and a reference signal.

A Hadamard sequence of a length 2 is used for a reference signal in the case of an extended CP.

Figure 15:
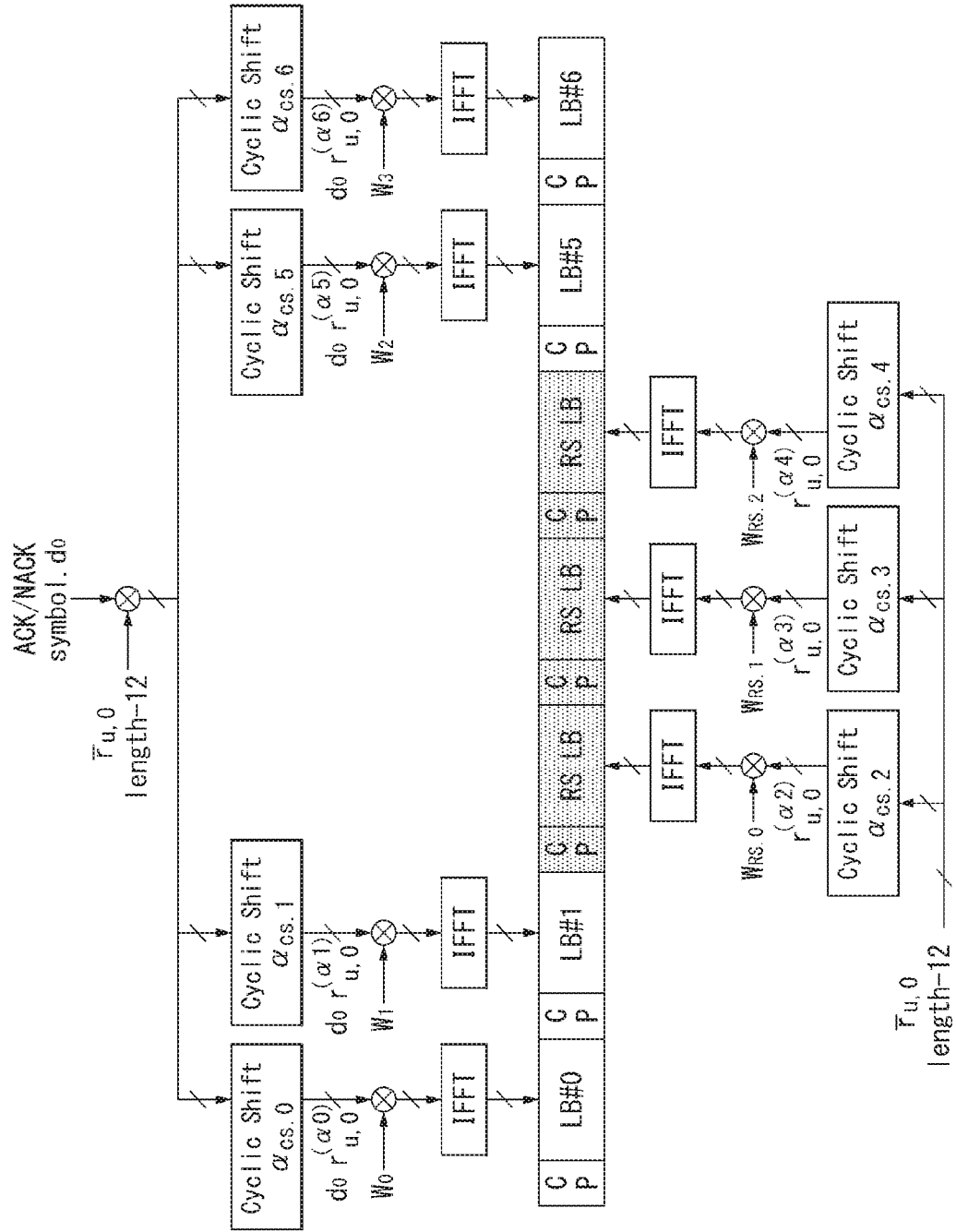
FIG. 15 shows the structure of an ACK/NACK channel in the case of a common CP in a wireless communication system to which an embodiment of the present invention may be applied.

FIG. 15 shows the structure of an ACK/NACK channel in the case of a common CP in a wireless communication system to which an embodiment of the present invention may be applied.

FIG. 15 illustrates the structure of a PUCCH channel for the transmission of HARQ ACK/NACK without a CQI.

A reference signal (RS) is carried on three contiguous SC-FDMA symbols that belong to seven SC-FDMA symbols included in one slot and that are located in the middle part, and an ACK/NACK signal is carried on the remaining four SC-FDMA symbols.

In the case of an extended CP, an RS may be carried on two contiguous symbols in the middle. The number and location of symbols used for an RS may be different depending on a control channel. The number and location of symbols used for an ACK/NACK signal associated with the RS may also be changed depending on the RS.

Pieces of acknowledgement information (an unscrambled state) of 1 bit and 2 bits may be expressed as one HARQ ACK/NACK modulation symbol using the BPSK and QPSK modulation schemes, respectively. Positive acknowledgement (ACK) may be encoded into "1", and negative acknowledgement (NACK) may be encoded into "0."

2-dimensional spreading is applied in order to improve a multiplexing capacity when a control signal is transmitted within an allocated band. That is, in order to increase the number of UEs or the number of control channels that may be multiplexed, frequency domain spreads and time domain spreads are applied at the same time.

In order to spread an ACK/NACK signal in the frequency domain, a frequency domain sequence is used as a base sequence. A Zadoff-Chu (ZC) sequence, that is, one of CAZAC sequences, may be used as a frequency domain sequence. For example, the multiplexing of different UEs or different control channels may be applied by applying a different cyclic shift (CS) to a ZC sequence, that is, a base sequence. The number of CS resources supported in an SC-FDMA symbol for PUCCH RBs for the transmission of HARQ ACK/NACK is set by a cell-specific higher layer signaling parameter $\Delta_{shift}^{PUCCH}$.

An ACK/NACK signal on which frequency domain spreading has been performed is spread in the time domain using orthogonal spreading code. A Walsh-Hadamard sequence or DFT sequence may be used as the orthogonal spreading code. For example, an ACK/NACK signal may be spread using orthogonal sequences w0, w1, w2 and w3 of a length 4 with respect to four symbols. Furthermore, an RS is also spread through an orthogonal sequence of a length 3 or a length 2. This is called orthogonal covering (OC).

A plurality of UEs may be multiplexed according to a code division multiplexing (CDM) method using the aforementioned CS resources in the frequency domain and the aforementioned OC resources in the time domain. That is, the ACK/NACK information and RSs of a large number of UEs on the same PUCCH RB may be multiplexed.

With respect to such time domain spreading CDM, the number of spreading codes supported with respect to ACK/NACK information is limited by the number of RS symbols. That is, since the number of RS transmission SC-FDMA symbols is smaller than that of ACK/NACK information transmission SC-FDMA symbols, the multiplexing capacity of an RS is smaller than that of ACK/NACK information.

For example, in the case of a common CP, ACK/NACK information may be transmitted in four symbols. Three orthogonal spreading codes not four orthogonal spreading codes are used for ACK/NACK information. The reason for this is that since the number of RS transmission symbols is limited to three, only the three orthogonal spreading codes may be used for an RS.

In the case where three symbols are used to send an RS and four symbols are used to send ACK/NACK information in one slot of a subframe of a common CP, for example, if six CSs can be used in the frequency domain and three orthogonal cover (OC) resources can be used in the time domain, HARQ acknowledgement from a total of 18 different UEs may be multiplexed within one PUCCH RB. In the case where two symbols are used to send an RS and four symbols are used to send ACK/NACK information in one slot of a subframe of an extended CP, for example, if six CSs can be used in the frequency domain and two orthogonal cover (OC) resources can be used in the time domain, HARQ acknowledgement from a total of 12 different UEs may be multiplexed within one PUCCH RB.

The PUCCH format 1 is described below. A scheduling request (SR) is transmitted in such a manner that a UE requests scheduling or does not scheduling. An SR channel reuses the ACK/NACK channel structure in the PUCCH formats 1a/1b and is configured according to an on-off keying (OOK) method based on the ACK/NACK channel design. A reference signal is not transmitted in the SR channel. Accordingly, a sequence of a length 7 is used in the case of a common CP, and a sequence of a length 6 is used in the case of an extended CP. Different cyclic shifts or orthogonal covers may be allocated to an SR and ACK/NACK. That is, for positive SR transmission, a UE transmits HARQ ACK/NACK through resources allocated for the SR. For negative SR transmission, a UE transmits HARQ ACK/NACK through resources allocated for ACK/NACK.

An enhanced-PUCCH (e-PUCCH) format is described below. The e-PUCCH may correspond to the PUCCH format 3 of the LTE-A system. A block spreading scheme may be applied to ACK/NACK transmission using the PUCCH format 3.

The block spreading scheme is a method of modulating the transmission of a control signal using the SC-FDMA method unlike the existing PUCCH format 1 series or 2 series. As shown in FIG. 8, a symbol sequence may be spread on the time domain using orthogonal cover code (OCC) and transmitted. The control signals of a plurality of UEs may be multiplexed on the same RB using the OCC. In the case of the aforementioned PUCCH format 2, one symbol sequence is transmitted in the time domain and the control signals of a plurality of UEs are multiplexed using the cyclic shift (CS) of a CAZAC sequence. In contrast, in the case of a block spreading-based PUCCH format (e.g., the PUCCH format 3), one symbol sequence is transmitted in the frequency domain and the control signals of a plurality of UEs are multiplexed using time domain spreading using the OCC.

HARQ Process in LTE/LTE-A System

In the current LTE, 8 HARQ process is used for withdrawing error of data, and two types of HARQ are defined according to retransmission timing of data as follows.

Figure 16:
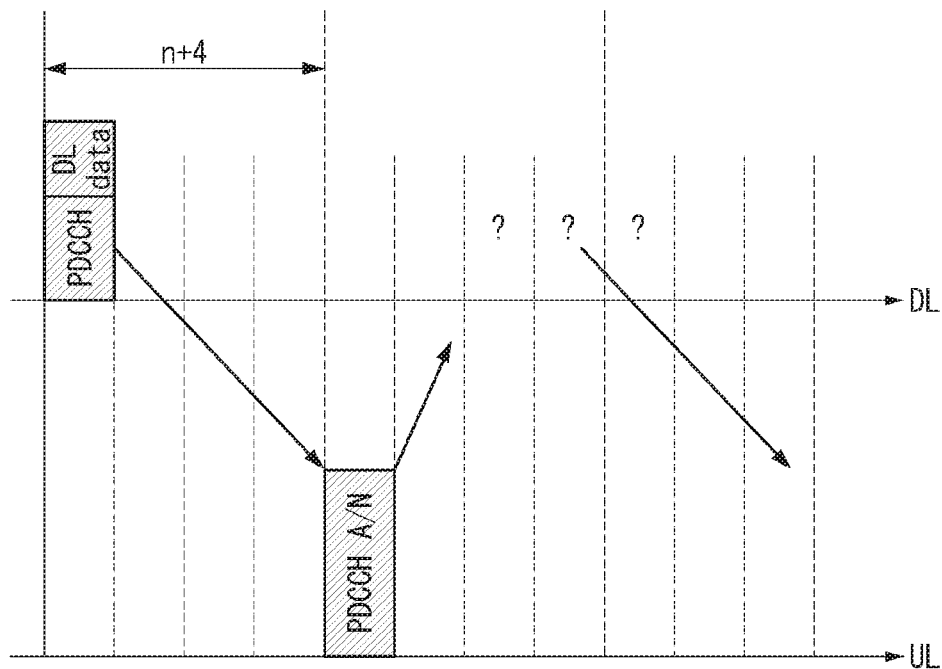
FIG. 16 illustrates an example of asynchronous HARQ operation in downlink.

FIG. 16 illustrates an example of asynchronous HARQ operation in downlink.

Referring to FIG. 16, when transmitting retransmission data, an eNB that receives NACK transmits the data by setting NDI in a DL grant (DCI format 1) as a bit that represents a retransmission. In this case, the NDI includes HARQ process ID, and represents which data is retransmitted.

Figure 17:
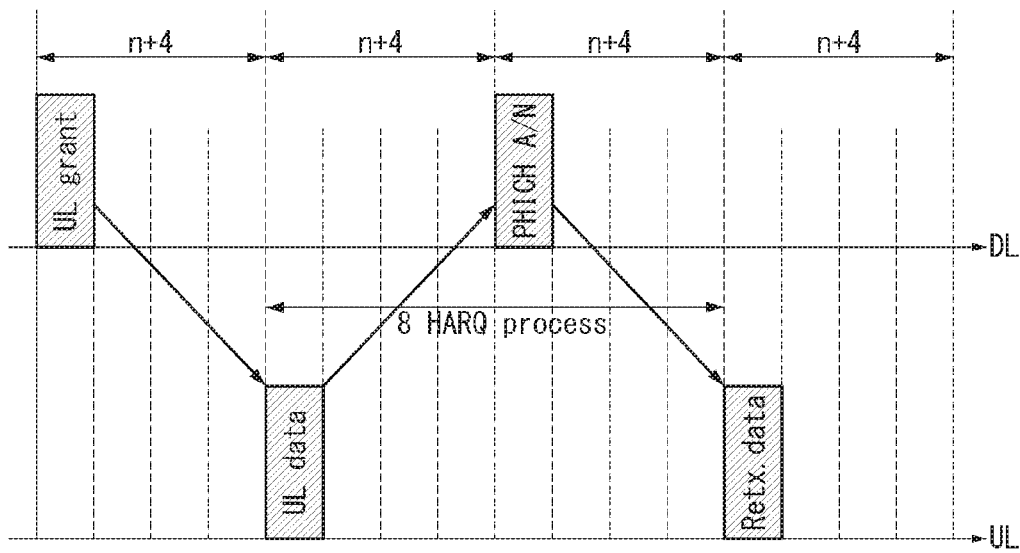
FIG. 17 illustrates an example of synchronous HARQ operation in downlink.

FIG. 17 illustrates an example of synchronous HARQ operation in downlink.

Referring to FIG. 17, an eNB that transmits NACK transmits retransmission data with the same resource as an initial data transmission by allocating data resource for retransmission to a new resource by setting NDI in a DL grant (DCI format 1) as a bit that represents a retransmission, or omitting a UL grant. In this case, the retransmission timing is always fixed at the subframe after 4 ms when receiving NACK.

The HARQ scheme tries to correct error for a received code basically, and determines whether to retransmit it by using simple error detection code such as Cyclic Redundancy Check (CRC). For a retransmission, the HARQ scheme is divided into three types as follows, and LTE performs the HARQ scheme through CC (second technique) or IR (third technique).

1) Type-I HARQ Scheme: A receiver discards a packet having an error and requests for retransmission, and a transmitter transmits the packet which is the same as that of an initial transmission. By discarding a packet having an error, an increase in reliability of a system and a performance increase through FEC are obtained.

2) Type-I HARQ Scheme with Chase Combining: This is a technique, instead of discarding a packet having an error, of using the packet by combining it with a retransmitted packet. By combining several packets, an effect of increasing signal power may be obtained, consequently.

3) Type-II HARQ Scheme (Incremental redundancy Scheme): This is a technique of using a code of high code rate in an initial transmission and transmitting an additional redundancy when a retransmission occurs in order to prevent the case of transmitting a code of high redundancy in an initial transmission unnecessarily in the case of Type-I.

PHICH (Physical HARQ Indication Channel)

A PHICH is described below.

In the LTE system, since SU-MIMO is not supported in uplink, one PHICH transmits only the PUSCH of one UE, that is, 1-bit ACK/NACK for a single stream.

The 1-bit ACK/NACK is coded into three bits using a repetition code whose code rate is ⅓. Three modulation symbols are generated by modulating the coded ACK/NACK according to a binary phase key-shifting (BPSK)

method. The modulation symbol is spread using a spreading factor (SF)=4 in a normal CP structure and using SF=2 in an extended CP structure.

When the modulation symbols are spread, an orthogonal sequence is used. The number of orthogonal sequences used becomes SF*2 in order to apply I/Q multiplexing.

PHICHs spread using the SF*2 orthogonal sequence may be defined as one PHICH group. Layer mapping is performed on the spread symbols. The layer-mapped symbols are subjected to resource mapping and transmitted.

A PHICH transmits HARQ ACK/NACK according to PUSCH transmission. A plurality of PHICHs mapped to the resource elements of the same set forms a PHICH group. The PHICHs within the PHICH group are distinguished by different orthogonal sequences. In the FDD system, $n_{PHICH}^{group}$ that is the number of PHICH groups is constant in all of subframes, and may be determined by Equation 1.

$$N_{PHICH}^{group} = \begin{cases} \lceil N_g(N_{RE}^{DL}/8) \rceil, & \text{for normal cyclic prefix} \\ 2 \times \lceil N_g(N_{RE}^{DL}/8) \rceil, & \text{for extended cyclic prefix} \end{cases} \quad [\text{Equation 1}]$$

In Equation 1, Ng is transmitted in a higher layer through a physical broadcast channel (PBCH), and Ng∈{⅙, ½, 1, 2}. The PBCH carries system information that is essential for a UE to communicate with an eNB. System information transmitted through the PBCH is called a master information block (MIB).

In contrast, system information transmitted through a physical downlink control channel (PDCCH) is called a system information block (SIB). $N_{RB}^{DL}$ is a downlink bandwidth configuration expressed by a multiplication of $N_{SC}^{RB}$, that is, the size of a resource block in the frequency domain. A PHICH group index $n_{PHICH}^{group}$ is any one integer of 0 to $n_{PHICH-1}^{group}$.

Resources used for a PHICH may be determined based on the smallest PRB index when the resources of a PUSCH are allocated and the cyclic shift value of a demodulation reference signal (DMRS) transmitted in an uplink (UL) grant.

Resources to which a PHICH is mapped (hereinafter referred to as "PHICH resources") may be expressed as $(n_{PHICH}^{group}, n_{PHICH}^{seq})$, that is, an index pair. $n_{PHICH}^{group}$ indicates a PHICH group index, and $n_{PHICH}^{seq}$ indicates an orthogonal sequence index within the PHICH group. The $(n_{PHICH}^{group}, n_{PHICH}^{seq})$ may be determined by Equation 2 below.

$$n_{PHICH}^{group} = (I_{PRB_{RA}} + n_{DMRS}) \bmod N_{PHICH}^{group} + I_{PHICH} N_{PHICH}^{group}, \quad [\text{Equation 2}]$$

$$n_{PHICH}^{seq} = (\lfloor I_{PRB\_RA}/N_{PHICH}^{group} \rfloor + n_{DMRS}) \bmod 2N_{SF}^{PHICH} \quad [\text{Equation 3}]$$

In Equation 2, the nDMRS is mapped from a cyclic shift for a demodulation reference signal (DMRS) field in the most recent PDCCH having an uplink DCI format for a transport block, which is related to the transmission of a corresponding PUSCH.

In contrast, if a PDCCH having an uplink DCI format for the same transport block is not present, an initial PUSCH for the same transport block is scheduled semi-persistently or when the initial PUSCH is scheduled by a random access response approval signal, the nDMRS is set to 0.

$N_{SF}^{PHICH}$ indicates a spreading factor size used for PHICH modulation.

$I_{PRB\_RA}$ is the same as $I_{PRB\_RA}^{lowest\_index}$ if it is the first transport block of a PUSCH related to a PDCCH or if the number of transport blocks manually recognized when a related PDCCH is not present is not the same as the number of transport blocks indicated in the most recent PDCCH related to the corresponding PUSCH.

In contrast, if it is the second transport block of a PUSCH related to the PDCCH, it is the same as $I_{PRB\_RA}^{lowest\_index}+1$. In this case, $I_{PRB\_RA}^{lowest\_index}$ corresponds to the lowest PRB index of the first slot of the transmission of the corresponding PUSCH.

$n_{PHICH}^{group}$ indicates the number of PHICH groups configured by a higher layer.

$I_{PHICH}$ has "1" if a PUSCH is transmitted in a subframe index 4 or 9 and "0" if not in the uplink-downlink configuration 0 of a TDD system.

Table 5 shows a mapping relation between a cyclic shift for a DMRS field used to determine PHICH resources in a PDCCH having an uplink DCI format and an nDMRS.

TABLE 5

| Cyclic Shift for DMRS Field in PDCCH with uplink DCI format | nDMRS |
|---|---|
| 000 | 0 |
| 001 | 1 |
| 010 | 2 |
| 011 | 3 |
| 100 | 4 |
| 101 | 5 |
| 110 | 6 |
| 111 | 7 |

DCI Format 0 (UL Grant) in LTE/LTE-A System

Figures 18, 19:
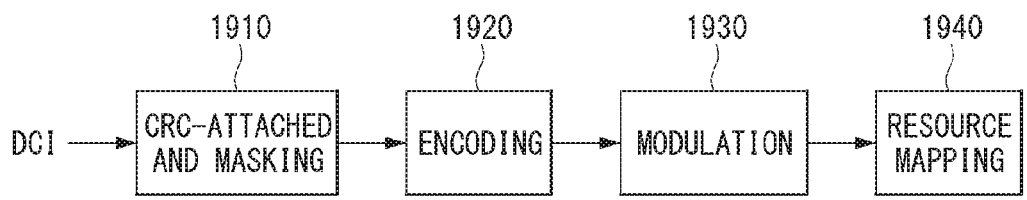
FIG. 18 is a diagram illustrating an example of DCI format 0.
FIG. 19 is a block diagram illustrating a structure of a PDCCH.

FIG. 18 is a diagram illustrating an example of DCI format 0.

In LTE a PUSCH resource is allocated through a UL grant of an eNB.

By transmitting DCI format 0 CRC masked by C-RNTI of a UE through a PDCCH, the LTE UL grant makes a UE to generate uplink data and transmit it according to an instruction of an eNB through receiving the corresponding information.

That is, FIG. 18 and Table 6 represent parameters of DCI format 0.

TABLE 6

| Format 0(release 8) | Format 0(release 8) |
|---|---|
|  | Carrier Indicator |
| Flag for format 1A differentiation | Flag for format 0/format 1A differentiation |
| Hopping flag | Hopping flag |
| Resource block assignment(RIV) | Resource block assignment(RIV) |
| MCS and RV | MCS and RV |
| NDI(New Data Indicator) | NDI(New Data Indicator) |
| TPC for PUSCH | TPC for PUSCH |
| Cyclic Shift for DM RS | Cyclic Shift for DM RS |
| UL index(TDD only) | UL index(TDD only) |
| Downlink Assignment Index(DAI) | Downlink Assignment Index(DAI) |
| CQI request(1 bit) | CSI request(1 or 2 bits: 2 bits are multi carrier) |
|  | SRS request |
|  | Resource allocation type |

Herein, the lengths of Hopping flag and RIV may have different lengths according to a system bandwidth as follows.

Hopping Flag
: 1 (1.4/3/5 Mhz) or 2 (10/15/20 Mhz) bits
Resource Block Assignment
: 5 (1.4 Mhz), 7 (⅗ Mhz), 11 (10 Mhz), 12 (15 Mhz), 13 (20 Mhz) bits A UL data transmission method in LTE (-A) or 802.16m is briefly described.

The cellular system such as LTE (-A) or 802.16m uses a resource allocation scheme based on an eNB scheduling.

In the system that uses the resource allocation scheme based on an eNB scheduling as such, a UE that has data to transmit (i.e., UL data) requests a resource for transmitting the corresponding data to an eNB before transmitting the data.

The scheduling request of a UE may be performed through a Scheduling Request (SR) transmission to a PUCCH or a Buffer Status Report (BSR) transmission to a PUSCH.

In addition, in the case that a resource for transmitting the SR or the BSR is not allocated to a UE, the UE may request an uplink resource to an eNB through the RACH procedure.

As such, an eNB that receives the scheduling request from a UE allocates the uplink resource that the corresponding UE is going to use to the UE through a downlink control channel (i.e., UL grant message, DCI in the case of LTE (-A)).

In this case, the UL grant transmitted to the UE may indicate which subframe the resource that is allocated to the UE corresponds to by explicit signaling, but may also define an appointed time between the UE and the eNB using the resource allocation for the subframe after a specific time (e.g., 4 ms in the case of LTE).

As such, the case that an eNB allocates a resource after X ms (e.g., 4 ms in the case of LTE) to a UE means that the eNB allocates the resource of UE by considering all of the times for receiving and decoding a UL grant and for preparing and encoding the data to transmit.

DCI Format 3/3A in LTE/LTE-A System

In the case of LTE(-A), DCI format 3/3A may be used for a power control of a PUCCH or a PUSCH.

DCI format 3/3A may be constructed by N TPC commands as represented in Table 7 or Table 8 below.

Here, N may be preconfigured to a UE through an RRC message. Such DCI format 3/3A may transmit information of 2N/N bits length, and is transmitted through a common search space by being CRC masked with TPC-RNTI.

A UE performs a power control for transmitting data to a PUCCH or a PUSCH by receiving a TPC command that corresponds to its own location.

TABLE 7

Format 3(release 8) - TPC-RNTI

| Field Name | Length(Bits) | Comment |
|---|---|---|
| TPC command number 1 | 2 | |
| TPC command number 2 | 2 | |
| TPC command number 3 | 2 | |
| ... | | |
| TPC command number N | 2 | The size of N is dependent on the payload size of DCI format 0 for the system BW |

TABLE 8

Format 3A(release 8) - TPC-RNTI

| Field Name | Length(Bits) | Comment |
|---|---|---|
| TPC command number 1 | 1 | |
| TPC command number 2 | 1 | |
| TPC command number 3 | 1 | |
| ... | | |
| TPC command number N | 1 | The size of N is dependent on the payload size of DCI format 0 for the system BW |

Hereinafter, a procedure for an eNB to send down a PDCCH to a UE will be described.

FIG. 19 is a block diagram illustrating a structure of a PDCCH.

A BS determines a PDCCH format according to DCI to be transmitted to a UE, attaches a CRC to control information, and masks a unique identifier (referred to as a radio network temporary identifier (RNTI)) to the CRC according to an owner or usage of the PDCCH (block 1910).

In the case that the PDCCH is for a specific wireless device, a unique identifier (e.g., cell-RNTI (C-RNTI)) of the UE may be masked to the CRC.

Alternatively, in the case that the PDCCH is for a paging message, a paging indication identifier (e.g., paging-RNTI (P-RNTI)) may be masked to the CRC.

In the case that the PDCCH is for system information, a system information identifier (e.g., system information-RNTI (SI-RNTI)) may be masked to the CRC. In order to indicate a random access response that is a response for transmission of a random access preamble of the UE, a random access-RNTI (RA-RNTI) may be masked to the CRC. In order to indicate a transmit power control (TPC) command for a plurality of wireless devices, a TPC-RNTI may be masked to the CRC.

When the C-RNTI is used, the PDCCH carries control information for a specific wireless device (such information is called UE-specific control information), and when other RNTIs are used, the PDCCH carries common control information received by all or a plurality of wireless devices in a cell.

The CRC-attached DCI is encoded to generate coded data (block 1920).

Encoding includes channel encoding and rate matching.

The encoded data is modulated to generate modulation symbols (block 1930).

The modulation symbols are mapped to physical resource elements (REs) (block 1940). The modulation symbols are respectively mapped to the REs.

Figure 20:
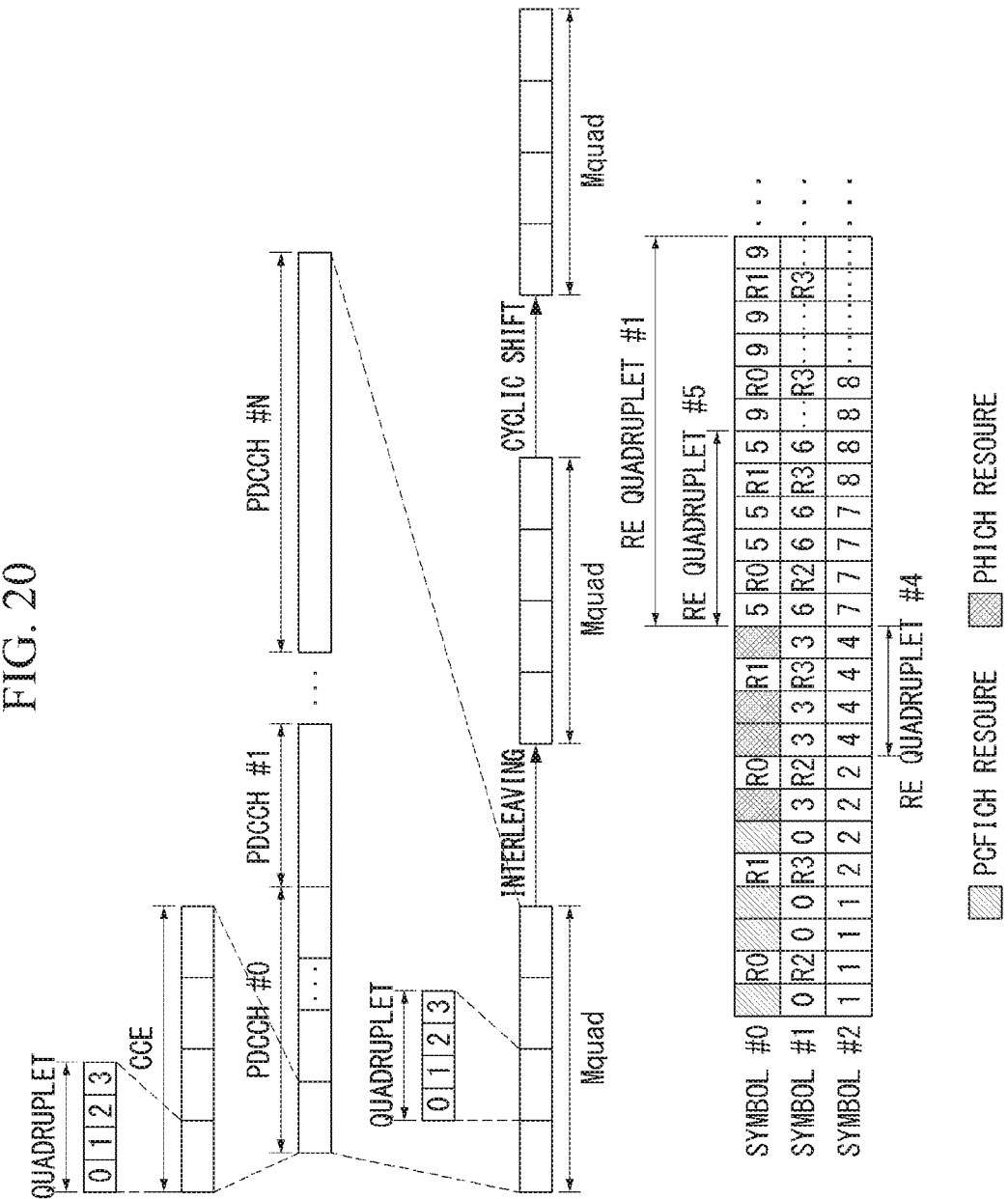
FIG. 20 illustrates an example of resource mapping of a PDCCH.

FIG. 20 illustrates an example of resource mapping of a PDCCH.

Referring to FIG. 20, R0 denotes a reference signal of a 1st antenna, R1 denotes a reference signal of a 2nd antenna, R2 denotes a reference signal of a 3rd antenna, and R3 denotes a reference signal of a 4th antenna.

A control region in a subframe includes a plurality of control channel elements (CCEs). The CCE is a logical allocation unit used to provide the PDCCH with a coding rate depending on a state of a radio channel, and corresponds to a plurality of resource element groups (REGs). The REG includes a plurality of resource elements (REs). According to the relationship between the number of CCEs and the coding rate provided by the CCEs, a PDCCH format and a possible PDCCH bit number are determined.

One REG (indicated by a quadruplet in the drawing) includes 4 REs. One CCE includes 9 REGs.

The number of CCEs used to configure one PDCCH may be selected from {1, 2, 4, 8}. Each element of {1, 2, 4, 8} is referred to as a CCE aggregation level.

A control channel including one or more CCEs performs interleaving in unit of REG, and is mapped to a physical resource after performing cyclic shift based on a cell identifier (ID).

Figure 21:
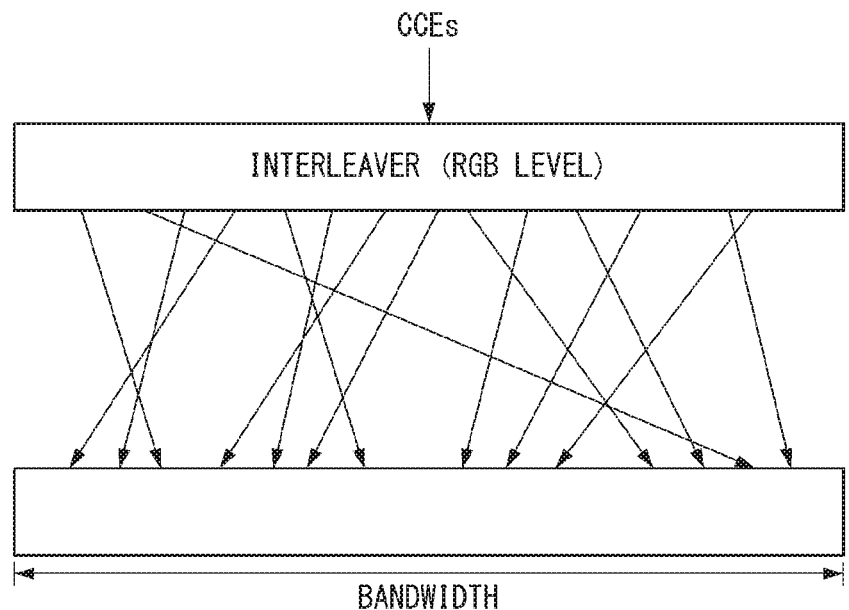
FIG. 21 illustrates an example of distributing CCEs across a system band.

FIG. 21 illustrates an example of distributing CCEs across a system band.

Referring to FIG. 21, a plurality of logically contiguous CCEs is input to an interleaver. The interleaver permutes the sequence of the plurality of input CCEs on an REG basis.

Accordingly, the time/frequency resources of one CCE are physically distributed to a total time/frequency area in the control region of a subframe. As a consequence, while the control channel is configured on a CCE basis, it is interleaved on an REG basis, thereby maximizing frequency diversity and an interference randomization gain.

Figure 22:
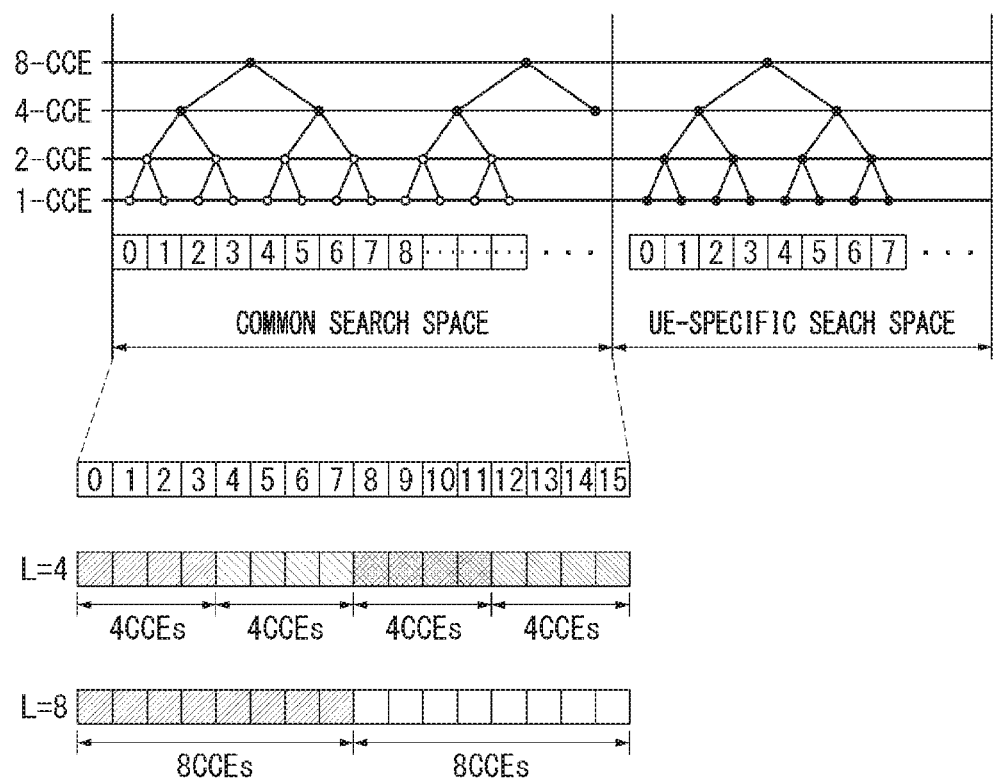
FIG. 22 illustrates an example of PDCCH monitoring.

FIG. 22 illustrates an example of PDCCH monitoring.

In 3GPP LTE, blind decoding is used to detect a PDCCH. Blind decoding is a process of de-masking a cyclic redundancy check (CRC) of a received PDCCH (PDCCH candidate) with a desired identifier to check a CRC error, thereby allowing a UE to identify whether the PDCCH is a control channel of the UE. A UE does not recognize a position in which a PDCCH thereof is transmitted in a control region and a CCE aggregation level or DCI format used to transmit the PDCCH.

A plurality of PDCCHs may be transmitted in one subframe. A UE monitors a plurality of PDCCHs in each subframe.

Here, the monitoring refers to an attempt of a UE to decode a PDCCH according to a monitored PDCCH format.

In 3GPP LTE, a search space is used to reduce load caused by blind decoding. A search space may denote a monitoring set of CCEs for a PDCCH. A UE monitors a PDCCH in a corresponding search space.

A search space is divided into a common search space and a UE-specific search space. The common search space is a space for searching for a PDCCH having common control information, which includes 16 CCEs with CCE indexes of 0 to 15 and supports a PDCCH having a CCE aggregation level of {4, 8}. However, a PDCCH (DCI format 0 and 1A) carrying UE-specific information may also be transmitted to the common search space. The UE-specific search space supports a PDCCH having a CCE aggregation level of {1, 2, 4, 8}.

TABLE 9

| Search Space Type | Aggregation Level(L) | Size (in CCEs) | Number of PDCCH candidates | DCI formats |
|---|---|---|---|---|
| UE-Specific | 1 | 6 | 6 | 0, 1, 1A, 1B, 1C, 2, 2A |
|  | 2 | 12 | 6 |  |
|  | 4 | 8 | 2 |  |
|  | 8 | 16 | 2 |  |
| Common | 4 | 16 | 4 | 0, 1A, 1C, 3/3A |
|  | 8 | 16 | 2 |  |

A size of a search space is determined by Table 9 above, and a different start point of a search space is defined for a common search space and a UE-specific search space. A start point of a common search space is fixed regardless of subframes, while a start point of a UE-specific search space may change by subframe according to an UE ID (e.g., C-RNTI), a CCE aggregation level and/or a slot number in a radio frame. When the start point of the UE-specific search space is in the common search space, the UE-specific search space and the common search space may overlap.

In an aggregation level of L∈{1, 2, 4, 8}, a search space $S^{(L)}_k$ is defined as an aggregation of PDCCH candidates. A CCE that corresponds to PDCCH candidate m of a search space $S^{(L)}_k$ is given as below.

$$L \cdot \left\{ (Y_k + m) \bmod \left\lfloor \frac{N_{CCE,k}}{L} \right\rfloor \right\} + i \quad \text{[Equation 4]}$$

Here, i=0, 1, ..., L−1, m=0, ..., $M^{(L)}$−1, $N_{CCE,k}$ are total number of a CCE that may be used for a transmission of a PDCCH in a control region of subframe k.

A control region includes an aggregation of CCEs numbered from 0 to $N_{CCE,k}$−1. $M^{(L)}$ is the number of PDCCH candidates in CCE aggregation level L in a given search space. In a common search space, $Y_k$ is set to 0 with respect to two aggregation levels, L=4 and L=8. In a UE-specific search space of aggregation level L, variable $Y_k$ is defined as below.

$$Y_k = (A \cdot Y_{k-1}) \bmod D \quad \text{[Equation 5]}$$

Here, $Y_{-1} = n_{RNTI} \neq 0$, A=39827, D=65537, k=floor($n_s/2$) and $n_s$ are slot number in a radio frame.

Figure 23:
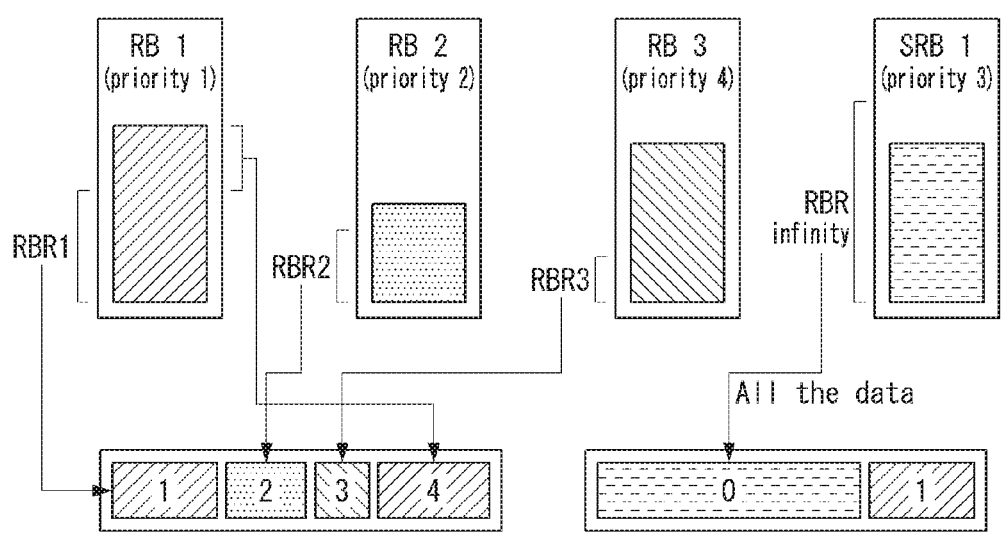
FIG. 23 is a diagram illustrating an example of a logical channel prioritization in the LTE system.

FIG. 23 is a diagram illustrating an example of a logical channel prioritization in the LTE system.

First, data transmitted and received between a UE and an eNB may generate different Data Radio Bearer (DRB) with each other according to a service property, and each DRB may be mapped to a specific Dedicated Traffic Channel (DTCH).

Here, the DRB of LTE may be generated up to maximum 32, and accordingly, DRB IDs may be allocated with values from 1 to 32.

In addition, the DRB transmitted to a DTCH may be mapped to logical channel IDs (LCIDs) from 3 to 10, and a DRB ID may be mapped to an LCID for a DTCH.

Furthermore, maximum 8 DTCHs that may be generated in LTE may be mapped to a logical channel group (LCG) depending on a service type of a DRB, and this means that an LCID for one or more DTCHs may be mapped to an LCG ID.

Here, an LCG ID is a unit that a UE reports a Buffer Status to an eNB.

The data transmitted to a DTCH logical channel is mapped to a downlink share channel (DL-SCH) or an uplink share channel (UL-SCH) of a MAC layer, and this is transmitted by being mapped to a PDSCH or a PUSCH of a PHY layer, respectively.

In this case, a MAC layer may transmit the data generated from different DTCH logical channel that may be transmitted and received to a specific UE by multiplexing it with a single physical resource.

According to it, multiplexed data are constructed as a single transport block and transmitted in the same resource, and the same HARQ process is performed.

LTE provides the logical channel prioritization function that a UE may transmit data having high priority more quickly by providing a priority for a logical channel with respect to an UL data of the UE.

This set a Prioritized Bit Rate (PBR) for each logical channel in order to prevent the starvation phenomenon of data transmitted from a logical channel of which priority is low, and accordingly, data of which priority is high can be transmitted using a resource of higher ratio.

As shown in FIG. 23, data of a specific DRB is mapped to a single logical channel, and has a PRB according to the priority. After data as much as the PRB which is set is allocated to a resource according to the priority, the data is transmitted by applying all of the allocated resources.

In this case, the data generated from an SRB may have a PRB infinity value, and this is designed for transmitting all of the data that are intended to be transmitted at a time by using the allocated resources.

CRC Calculation in LTE/LTE-A

Currently, in LTE(-A), as a method for detecting an error of data, CRC is attached to a transport block and transmitted.

It is defined that 16-bit CRC is used by using an RNTI identifier for error detection in a PDCCH and 24-bit CRC is used for a data transmission.

More specifically, it is defined that CRC of CRC24A type is used for TB CRC and CRC of CRC24B type is used for code block CRC.

Figure 24:
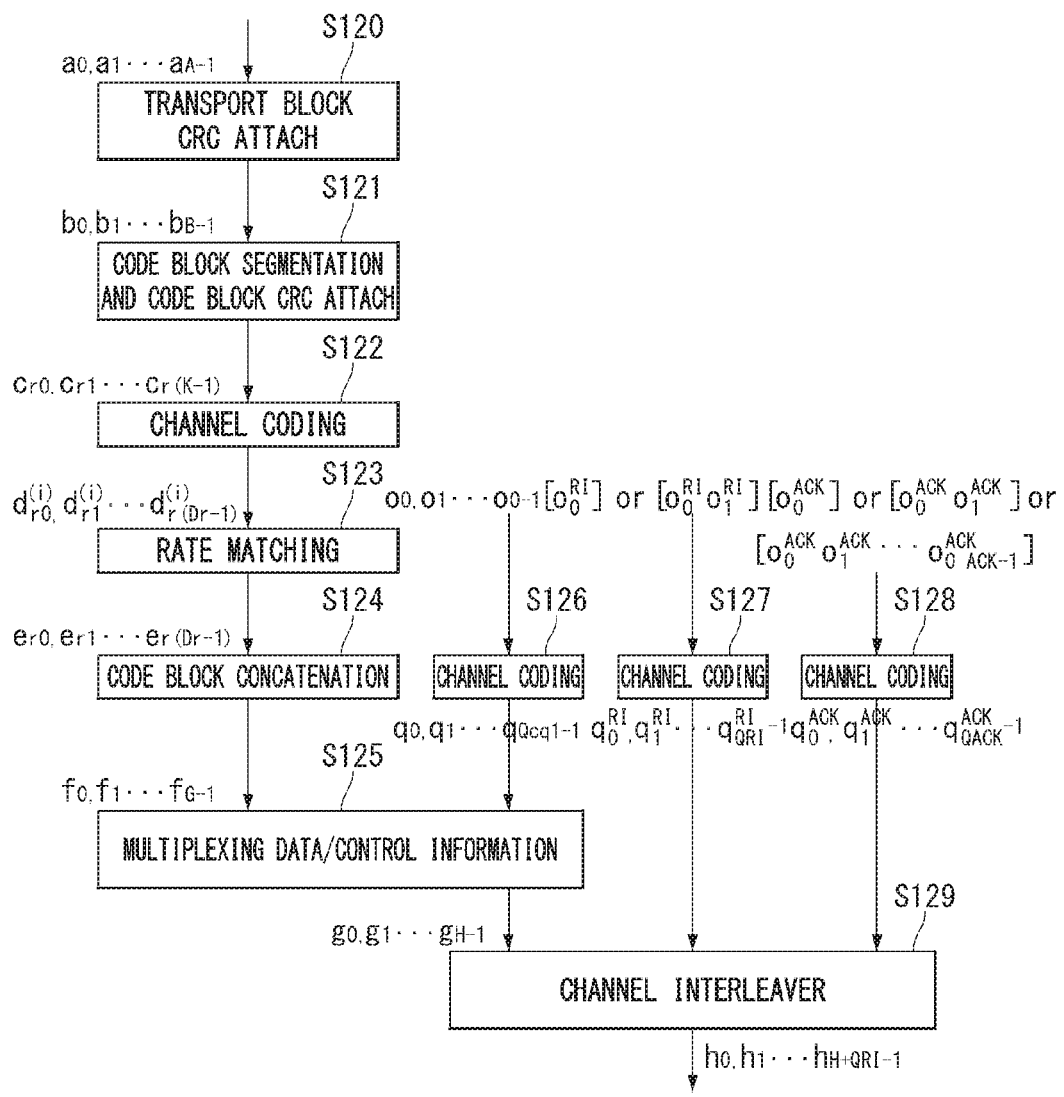
FIG. 24 illustrates an example of a signal processing procedure of a UL shared channel which is a transport channel in a wireless communication system to which the present invention may be applied.

FIG. 24 illustrates an example of a signal processing procedure of a UL shared channel which is a transport channel in a wireless communication system to which the present invention may be applied.

Hereinafter, the signal processing procedure of the UL shared channel (hereinafter, "UL-SCH") may be applied to one or more transport channels or control channel types.

Referring to FIG. 24, a UL-SCH forwards data to a coding unit in a form of Transport Block (TB) once in every transmission time interval (TTI).

CRC parity bits $p_0, p_1, p_2, p_3, \ldots, p_{L-1}$ are attached to bits $a_0, a_1, a_2, a_3, \ldots, a_{A-1}$ of a transport block forwarded from a higher layer (step, S120). In this case, A is the size of the transport block and L is the number of parity bits.

The parity bits are generated by one of the following cyclic generator polynomials.

gCRC24A(D)=[D24+D23+D18+D17+D14+D11+D10+ D7+D6+D5+D4+D3+D+1] and;

gCRC24B(D)=[D24+D23+D6+D5+D+1] for a CRC length L=24 and;

gCRC16(D)=[D16+D12+D5+1] for a CRC length L=16.

gCRC8(D)=[D8+D7+D4+D3+D+1] for a CRC length of L=8.

The input bit to which CRC is attached is as represented as $b_0, b_1, b_2, b_3, \ldots, b_{B-1}$. In this case, B represents a bit number of a transport block including CRC.

$b_0, b_1, b_2, b_3, \ldots, b_{B-1}$ is segmented into several code blocks (CB) depending on a TB size, and CRC is attached to the segmented several CBs (step, S121).

After the code block segmentation and CRC attachment, a bit is as represented as $c_{r0}, c_{r1}, c_{r2}, c_{r3}, \ldots, c_{r(K_r-1)}$. Herein, r is the number (r=0, ..., C−1) of a code block, and Kr is a bit number according to r.

Subsequently, channel coding is performed (step, S122) A output bit after the channel coding is as represented as $d_{r0}^{(i)}, d_{r1}^{(i)}, d_{r2}^{(i)}, d_{r3}^{(i)}, \ldots, d_{r(D_r-1)}^{(i)}$. In this case, i is a stream index which is coded, and may have a value of 0, 1 or 2. Dr represents a bit number of ith coded stream for code block r. r is the number (r=0, ..., C−1) of a code block, and C represents total number of code blocks. Each code block may be coded by turbo coding, respectively.

Subsequently, rate matching is performed (step, S123). After going through the rate matching, the bit is as represented as $e_{r0}, e_{r1}, e_{r2}, e_{r3}, \ldots, e_{r(E_r-1)}$ In this case, r is the number (r=0, ..., C−1) of a code block, and C represents total number of code blocks. Er represents the number of bits which are rate matching of rth code block.

Subsequently, a concatenation between code blocks is performed again (step, S124). After the concatenation of performed, the bit is as represented as $f_0, f_1, f_2, f_3, \ldots, f_{G-1}$. In this case, G represents total number of coded bits for a transmission. When control information is multiplexed with a UL-SCH transmission, the bit number used for control information transmission is not included.

Meanwhile, when control information is transmitted in a PUSCH, channel coding is independently performed for each of CQI/PMI, RI, ACK/NACK that are control information (steps, S126, S127 and S128). Since different coded symbols are allocated for each type of the control information, each of the types of the control information has different coding rates.

In Time Division Duplex (TDD), two types of modes, ACK/NACK bundling and ACK/NACK multiplexing, are supported by higher layer configuration as ACK/NACK feedback mode. For the ACK/NACK bundling, ACK/NACK information bit is configured by 1 bit or 2 bits, and for the ACK/NACK multiplexing, ACK/NACK information bit is configured by 1 bit to 4 bits.

In step S124, after the step of concatenation between code blocks, multiplexing of the coded bits $f_0, f_1, f_2, f_3, \ldots, f_{G-1}$ of UL-SCH data and the coded bits $q_0, q_1, q_2, q_3, \ldots, q_{N_L \cdot Q_{CQI}-1}$ of CQI/PMI is performed (step, S125). A result of multiplexing of data and CQI/PMI is as represented as $g_0, g_1, g_2, g_3, \ldots, g_{H'-1}$. In this case, $g_i$ (i=0, ..., H'−1) represents a column vector having a length of $(Q_m \cdot N_L)$. Herein, $H=(G+N_L \cdot Q_{CQI})$ and $H'=H/(Q_m \cdot N_L)$. NL represent the number of layer in which a UL-SCH transport block is mapped, and H represents the number of total coded bits which is allocated for UL-SCH data and the CQI/PMI information to NL transport layers to which a transport block is mapped.

Subsequently, the multiplexed data, CQI/PIM, separately channel coded RI and ACK/NACK are channel-interleaved, and an output signal is generated (step, S129).

As shown in FIG. 24, TB of a predetermined length or longer may be segmented, and the segmented block is called a code block. That is, TB of a predetermined length or shorter is transmitted in which only TB CRC (CRC24A) is attached, but in the TB of a predetermined length or longer, TB to which TB CRC (CRC24B) is attached is segmented again, and transmitted by attaching code block CRC (CRC24B) to each code block.

Reference Signal (RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using an distortion degree when the signal is transmitted through the channel are primarily used. The aforementioned signal is referred to as a pilot signal or a reference signal (RS).

Recently, when packets are transmitted in most of mobile communication systems, multiple transmitting antennas and multiple receiving antennas are adopted to increase transceiving efficiency rather than a single transmitting antenna and a single receiving antenna. When the data is transmitted and received by using the MIMO antenna, a channel state between the transmitting antenna and the receiving antenna need to be detected in order to accurately receive the signal. Therefore, the respective transmitting antennas need to have individual reference signals.

Reference signal in a wireless communication system may be mainly categorized into two types. In particular, there are a reference signal for the purpose of channel information acquisition and a reference signal used for data demodulation. Since the object of the former reference signal is to enable a UE to acquire channel information in DL, the former reference signal should be transmitted on broadband. And, even in the case that the UE does not receive DL data in a specific subframe, it should perform a channel measurement by receiving the corresponding reference signal. Moreover, the corresponding reference signal is used for a measurement for mobility management of a handover or the like. The latter reference signal is the reference signal transmitted together when a base station transmits downlink data, and the UE may perform channel estimation by receiving the corresponding reference signal, thereby demodulating data. The corresponding reference signal should be transmitted in a data transmitted region.

The DL reference signals are categorized into a common reference signal (CRS) shared by all UEs for an acquisition of information on a channel state and a measurement associated with a handover or the like and a dedicated reference signal (DRS) used for a data demodulation for a specific UE. Information for demodulation and channel measurement may be provided by using the reference signals. That is, the DRS is used only for data demodulation only, while the CRS is used for two kinds of purposes including channel information acquisition and data demodulation.

The receiver side (that is, UE) measures the channel state from the CRS and feeds back the indicators associated with the channel quality, such as the channel quality indicator (CQI), the precoding matrix index (PMI), and/or the rank indicator (RI) to the transmitting side (that is, base station). The CRS is also referred to as a cell-specific RS. On the contrary, a reference signal associated with a feedback of channel state information (CSI) may be defined as CSI-RS.

The DRS may be transmitted through resource elements when data demodulation on the PDSCH is required. The UE may receive whether the DRS is present through the upper layer and is valid only when the corresponding PDSCH is mapped. The DRS may be referred to as the UE-specific RS or the demodulation RS (DMRS).

FIG. 25 illustrates a reference signal pattern mapped to a downlink resource block pair in the wireless communication system to which the present invention may be applied.

Referring to FIG. 25, as a unit in which the reference signal is mapped, the downlink resource block pair may be expressed by one subframe in the time domain×12 subcarriers in the frequency domain. That is, one resource block pair has a length of 14 OFDM symbols in the case of a normal cyclic prefix (CP) (the case of FIG. 25(a)) and a length of 12 OFDM symbols in the case of an extended cyclic prefix (CP) (the case of FIG. 25(b)).

Resource elements (REs) represented as '0', '1', '2', and '3' in a resource block lattice mean the positions of the CRSs of antenna port indexes '0', '1', '2', and '3', respectively and resource elements represented as 'D' means the position of the DRS.

UE Capability Information.

A UE capability information transfer procedure in LTE(-A) may be performed upon a request from a base station.

The base station transmits a UECapabilityEnquiry message to a UE so as to request transfer of UEcapabilityInformation message from the UE.

Thus, the base station may be informed of a capability of the UE based on information included in the UECapabilityInformation message received from the UE.

Figure 26:
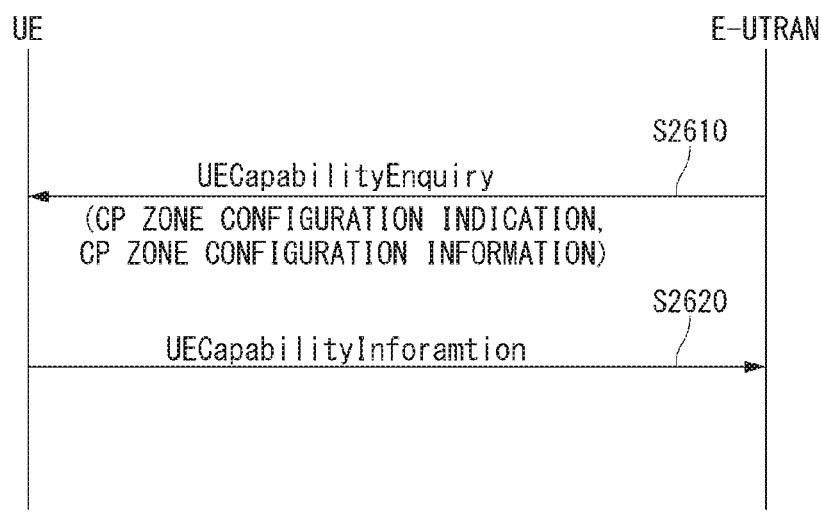
FIG. 26 is a diagram illustrating an example of a UE capability information transfer procedure.

FIG. 26 is a diagram illustrating an example of a UE capability information transfer procedure.

The purpose of the UE capability transfer procedure is to transfer UE radio access capability information from a UE to an E-UTRAN.

In the case where a UE changes its E UTRAN radio access capability, the UE may request an upper layer to initiate a necessary NAS procedure (See TS 23.401 [41]) as update of a UE radio access capability using new RRC connection would occur.

For reference, change of a UE's GERAN UE radio capability in an RRC_IDLE state is supported by use of a tracking region update When UE radio access capability information is (further) needed, a E-UTRAN initiates a UE capability transfer procedure with respect to the UE in an RRC_Connected state. That is, the E-UTRAN transmits a UECapabilityEnquiry message to the UE so as to request UE capability access capability information (S2610).

Next, the UE transmits a UECapabilityInformation message, including the UE's radio capability information, to the E-UTRAN (S2620).

Specifically, when receiving the UECapabilityEnquiry from the E-UTRAN, the UE performs the following operations.

As below, the UECapabilityInformation message is set as below:
  if a ue-CapabilityRequest includes the EUTRA:
    include UE-EUTRA-Capability within a ue-CapabilityRAT container with a rat-Type which is set to eutra;
    if the UE supports FDD and TDD:
      set every field of the UECapabilityInformation to include values applicable to both FDD and TDD (functionally supported in the two modes), except for fdd-Add-UE-EUTRA-Capabilities and tdd-Add-UE-EUTRA-Capabilities fields (including its subfields).
    if (some) UE capability fields have different values with respect to FDD and TDD:
      with respect to FDD, the UE supports an additional function, compared to what is indicated by previous fields of the UECapabilityInformation:
      set to include the fdd-Add-UE-EUTRA-Capabilities field and a field having an additional function for applying the corresponding fdd-Add-UE-EUTRA-Capabilities field to FDD;
      with respect toTDD, the UE supports an additional function, compared with what is indicated by previous fields of the UECapabilityInformation:
      set to include the tdd-Add-UE-EUTRA-Capabilities field and a field having an additional function for applying the corresponding tdd-Add-UE-EUTRA-Capabilities field to TDD.
  if the ue-CapabilityRequest includes GERAN-CS and the UE supports GERAN CS domain:
    include a UE radio access capability for GERAN-CS in a ue-CapabilityRAT container with a rat-Type which is set to geran-cs;
  if the ue-CapabilityREquest includes GERAN-PS and the UE supports GERAN PS domain:

including a UE radio access capability for GERAN-PS within a ue-CapabilityRAT container with a rat-type which is set to geran-ps;

if the ue-CapabilityRequest includes utra and the UE supports UTRA:

including a UE radio access capability for UTRA within a ue-CapabilityRAT with a rat-type which is set to utra.

When the above procedures are terminated, the UE submits a UECapabilityInformation message to a lower layer for the purpose of transfer.

Figure 27:
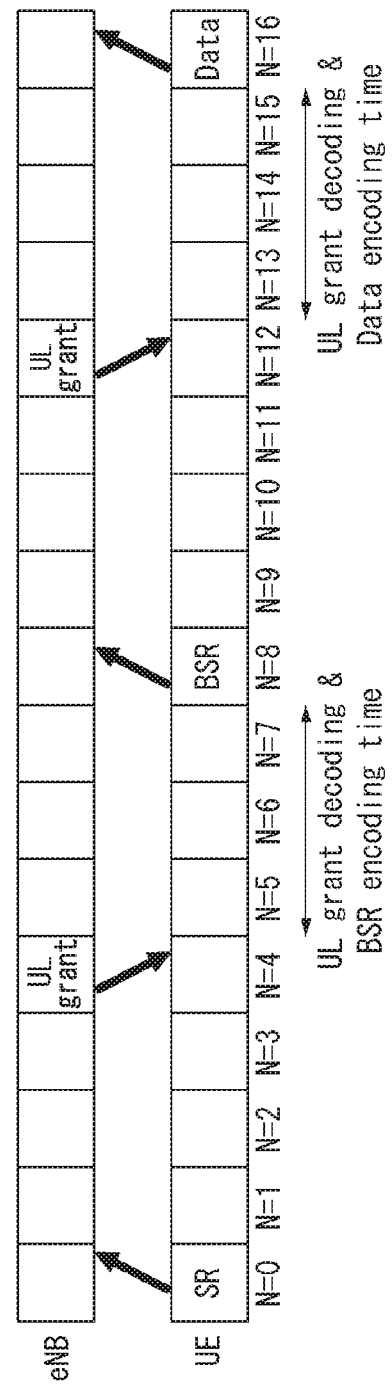
FIGS. 27 and 28 are diagrams illustrating an example of transmitting actual data through a scheduling request procedure and a Buffer Status Report (BSR) procedure.

FIG. 27 is a diagram illustrating a time period until a UE transmits actual data through a five-step scheduling request procedure using a PUCCH SR resource.

As illustrated in FIG. 27, a UE may transmit actual UL data approximately 17 ms after a time when an SR signal is transmitted.

In this case, the SR resources allocated to the UE may be allocated to a PUCCH at a specific cycle, and may be allocated in a cycle of a minimum of 1 ms~ a maximum of 80 ms.

Assuming that an SR of a 1 ms cycle has been allocated to the UE, an average time taken to wait for PUCCH resources for SR transmission is 0.5 ms, and delay time until data transmission through the SR is 9.5 ms.

If the UE has an UL resource pre-allocated by a base station, the UE may transmit a resource request for newly generated data using the pre-allocated resource.

Alternatively, the UE may request an additional resource from the base station by transmitting a BSR in addition to a data which is transmitted using previously allocated resources.

Figure 28:
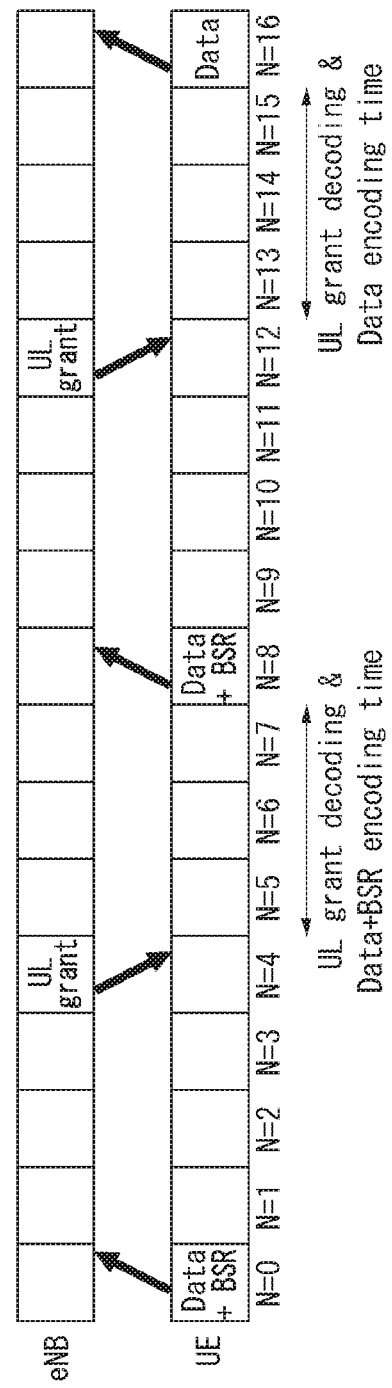

In this case, as illustrated in FIG. 28, transmission of UL data is delayed for 9 m after the UE transmits the BSR.

In the case where no PUCCH SR resource or is allocated by the base station to the UE, there is no PUSCH resource, or time synchronization of uplink has not been achieved, the UE may request a resource for the newly generated data using a RACH procedure.

Figure 29:
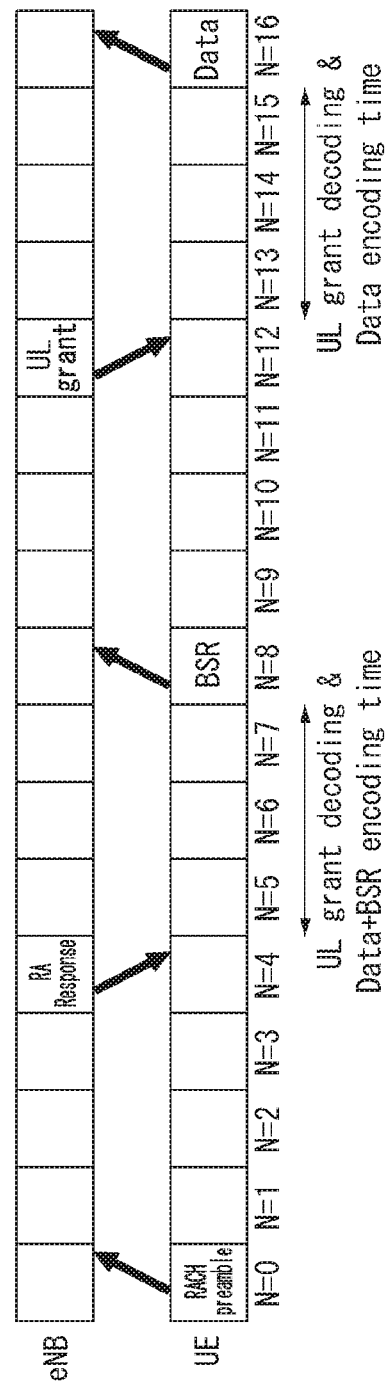
FIG. 29 is a diagram illustrating a method of transmitting actual data through a random access channel (RACH) procedure.

That is, as illustrated in FIG. 29, transmission of UL data is delayed 17 ms after the UE transmits a RACH preamble to the base station.

In this case, a PRACH resource capable of transmitting the RACH preamble may be set in each cell at a specific cycle, and, and when it is assumed that the PRACH resource has a cycle of 1 ms, an average data transfer delay may be 17.5 ms.

As described with reference to FIGS. 27 to 29, the UE may transmit actual data after experiencing a delay of a minimum of 9 ms and a maximum of 17.5 ms to transmit UL data.

Resource efficiency may be maximized by allocating a resource optimized for each UE's channel situation, but transmission is delayed.

Regarding 5G, there are increasing demands for supporting various real-time application services, such as health care, traffic safety, disaster safety, and a remote medical control.

Thus, 5G aims to an ultra low-letancy system (target letancy: E2E or Radio 1 ms) having an extremely short response time so that a user cannot feel awkward even when information related to tactile sense, which is the most sensitive sense among five senses when it comes to latency, is provided on the Internet.

In addition, the service requiring the ultra-low latency considers not just latency, but also a scenario requiring highly reliable data transmission.

Thus, the need of a technology (ultra-reliable and low latency communication) for enabling data transmission with high reliability (approximately 99.999%) is increasing.

However, the conventional wireless communication technologies such as LTE(-A) allows resource allocation, by taking into consideration an approximately 10% of errors in data transmission.

In this case, a method is applied, in which, regarding 10% of data where an error possibly occurs, a transmitter is informed of occurrence of the error through a feedback from a receiver, and, when the error occurs, a data transmission reliability is increased through a retransmission procedure.

To this end, LTE(-A) defines to use ARQ or HARQ scheme depending on a layer.

The HARQ scheme is one of error correction schemes essential for data transmission in LTE.

As such, the HARQ scheme efficiently utilizes a data resource and allows retransmission of data where an error occurs, thereby increasing data transmission reliability.

However, data transmission using the HARQ scheme may result in latency of data transmission.

In addition, the conventional UL HARQ scheme employs synchronous HARQ.

Figure 30:
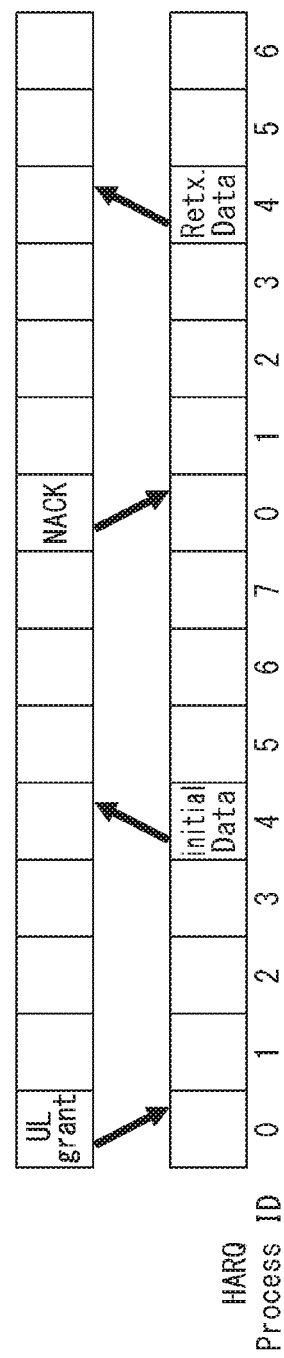
FIG. 30 is a diagram illustrating an example of an uplink synchronous HARQ scheme.

FIG. 30 is a diagram illustrating a UL synchronous HARQ scheme.

Referring to FIG. 30, the UL HARQ scheme is defined such that a HARQ process is set for each specific time region.

That is, the UL HARQ scheme synchronizes a timing of transmitting initial data and a timing of transmitting retransmission data (SF after 8 ms), so that initial data and retransmission data on the same HARQ data are combined at the same time interval even without specific signaling, thereby enhancing a reception rate In the conventional LTE, such synchronous HAQR is defined to be used only in an uplink, and allowed to transmit a single Transport Block (TB) data for a specific HARQ process at a specific time.

In addition, the synchronous HARQ is defined such that a single transport block is generated in a specific SF and generated transmitted, and that 8 HARQ soft buffer is set for each UE in the case where MIMO is not used.

In this case, when retransmission is performed because an error occurs in data of a specific HARQ process ID (PID), a different initial data is not allowed to be transmitted at a time when the different initial data is mapped to the corresponding HARQ process.

That is, transmission of additionally newly generated initial data is allowed only when a new resource for a specific process ID of which (re)transmission is completed is allocated.

Thus, in the case where every HARQ process ID resource is pre-allocated at a time of occurrence of emergency data due to retransmission data, transmission of the emergency data may not be performed until the corresponding retransmission data is all completely transmitted, thereby resulting in latency.

In this situation, it is necessary to define a method for transmitting both retransmission data and emergency data without latency.

In addition, in order to support both data transmission with reliability as high as a conventional level and data transmission with high reliability, it is necessary to define a new method for properly transmitting/receiving data that does not supports HARQ.

Hereinafter, there is described a method for transmitting data using a Non-HARQ scheme proposed in this specification, the Non-HARQ scheme which that enables transmission of emergency data or the like with high reliability and without latency.

The Non-HARQ scheme proposed in this specification is a method which does not apply HARQ to tranceive specific data, such as emergency data or the like, unlike the conventional scheme which applies HARQ to transceive every data.

That is, this specification provides a method for quickly transceiving emergency data without latency by newly setting (or defining) a Non-HARQ indicator and a Non-HARQ soft buffer so that a transmitter or a receiver (e.g.: a base station or a UE) processes HARQ data and Non-HARQ data distinguishably.

Hereinafter, the receiver used in this specification may indicate a UE with respect to DL data, and a base station with respect to UL data.

In addition, a transceiver may indicate a base station with respect to DL data, and a UE with respect to UL data.

Specifically, a resource for data (or a transport block (TB)) transmitted along with the Non-HARQ indicator does not require any HARQ ACK/NACK.

That is, the resource for a TB transmitted along with the Non-HARQ indicator is completely transceived at one transmission.

In addition, the data transmitted along with the Non-HARQ indicator is processed by the receiver in a soft buffer for Non-HARQ (where a HARQ process is not performed), rather than in an additionally set (or newly set) soft buffer which is mapped for the HARQ process.

Thus, this specification aims not to affect a conventional HARQ process by processing HARQ data and Non-HARQ data to in different soft buffers.

The Non-HARQ indicator (NHI) may be an indicator which indicates whether HARQ is applied to DL data or UL data, or an indicator which indicates whether specific data is HARQ data or Non-HARQ data.

In addition, the Non-HARQ soft buffer is a soft buffer used to process Non-HARQ data, and the Non-HARQ data is transmitted directly to an upper layer through a decoding procedure in the Non-HARQ soft buffer.

Figure 31:
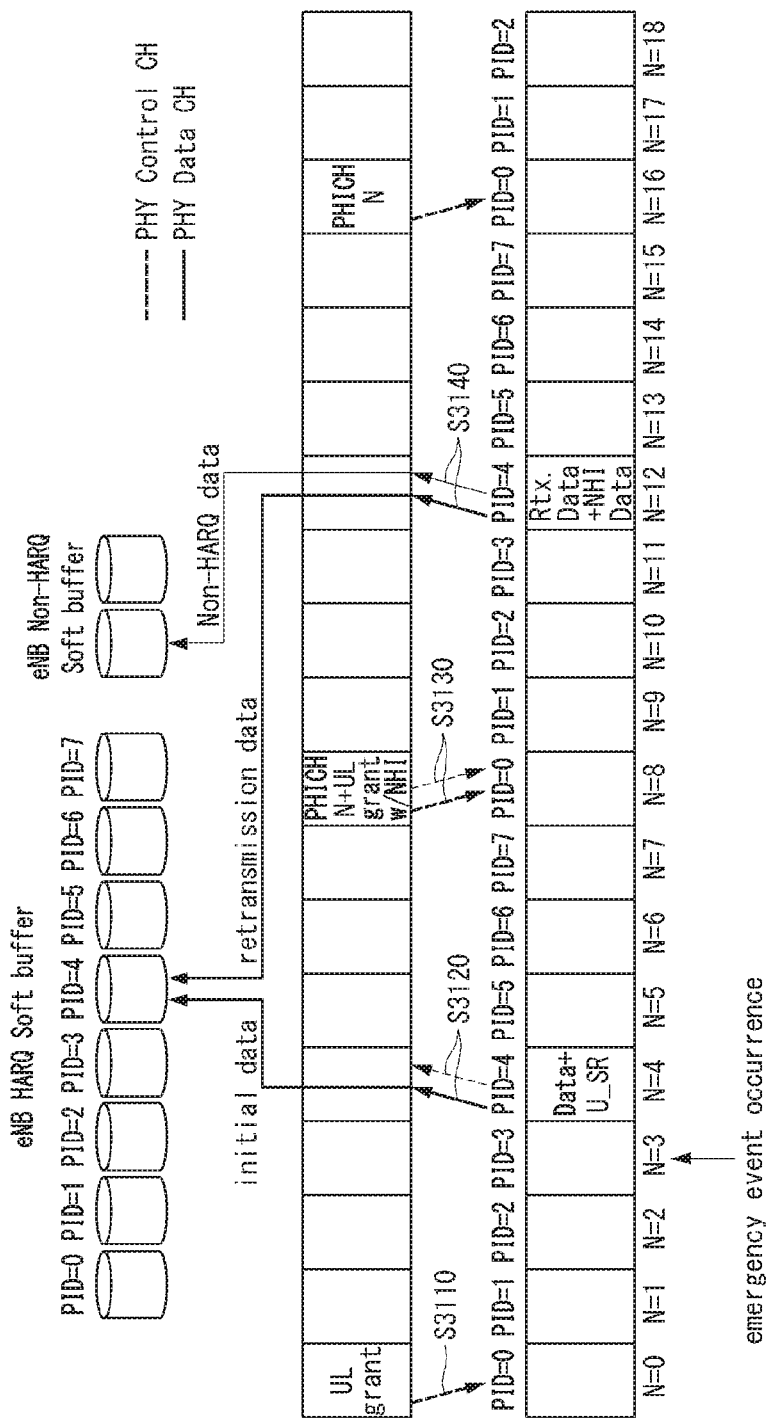
FIG. 31 is a diagram illustrating an example of an uplink data transmission method using a Non-HARQ scheme proposed in this specification.

FIG. 31 is a diagram illustrating an example of a method of transmitting UL data using a Non-HARQ scheme proposed in this specification.

Referring to FIG. 31, a base station transmits a UL grant required to transmit initial data to a UE (S3110).

Then, when an emergency event occurs in the UE, the UE informs the base station of occurrence of the emergency event.

Specifically, the UE transmits a Urgent Scheduling Request (U_SR) along with the initial data to the base station (S3120).

The Urgent Scheduling Request(U_SR) is a signal or information for notifying the occurrence of the emergency event.

Next, when not receiving the initial data, the base station transmits a UL grant including a PHICH NACK and a Non-HARQ Indicator (NHI) to the UE (S3130).

In this case, the UL grant including the NHI may include resource allocation information for transmitting Non-HARQ data and/or resource allocation information for transmitting HARQ data.

In this case, the Non-HARQ data may be emergency data (or an emergency message) on which HARQ is not performed.

Based on the step S3130, the UE transmits retransmission data (or HARQ data) and Non-HARQ data (e.g. emergency data) to the base station through an allocated resource (S3140).

In this case, using the resource through which the UL data is transmitted, the base station may be informed of whether the UL data transmitted by the UE is HARQ data or Non-HARQ data.

Alternatively, even using a Non-HARQ indicator or the like transmitted along with the UL data, the base station may be informed of whether the UL data is HARQ data or Non-HARQ data.

Detailed methods thereof will be described later.

That is, when the HARQ data and the Non-HARQ data are simultaneously transmitted from the UE, the base station processes the HARQ data in a HARQ soft buffer and the Non-HARQ data in a Non-HARQ soft buffer.

1. Method of Transmitting Non-HARQ Indicator (NHI)

Following is detailed description about various methods of transmitting the aforementioned Non-HARQ indicator (NHI).

The methods of transmitting the aforementioned Non-HARQ indicator (NHI) may be classified largely into (1) explicit signaling of the NHI (Method 1) and (2) implicit signaling of the NHI (Method 2).

In addition, explicit signaling of the NHI (Method 1) may use (1) defining a Non-HARQ indicator field in a conventional DL/UL grant (Method 1-1) or (2) transmitting a Non-HARQ indicator about a No grant-based (using contention resource or pre-emptible resource) data (Method 1-2).

In addition, implicit signaling of the NHI may use (1) defining a field for Non-HARQ data in a new DL/UL grant (Method 2-1) or (2) applying Non-HARQ to a No grant-based (contention resource or pre-emptible resource) (Method 2-2).

In addition, procedures required for a receiver to set an additional Non-HARQ soft buffer to process Non-HARQ data will be further described.

That is, a method of setting a Non-HARQ soft buffer to process Non-HARQ data by transmitting Non-HARQ capability information between a transmitter and a receiver will be defined.

As described above, a method for transmitting emergency with high reliability and without latency, this specification proposes a method of transmitting emergency data without applying HARQ, a.

The emergency data may be data for a mission-critical service or data for a ultra-low latency service.

In this case, transmission of the emergency data without applying HARQ may mean that any feedback (HARQ ACK/NACK) on the emergency data is not transmitted and received, and that a receiver sets an additional Non-HARQ soft buffer for receiving and processing the emergency data, in addition to a HARQ soft buffer mapped to a conventional HARQ process.

In this case, it is assumed that data received in the Non-HARQ soft buffer is transmitted directly to an upper layer through a decoding procedure and a resource for the corresponding data is allocated with a very low error rate according to characteristics of the corresponding data.

For example, in the case of data which needs to be transmitted with reliability of 99.999% or more, it is assumed that resources are allocated to achieve high reliability so that the data is transmitted and HARQ is not performed.

As such, because Non-HARQ data needs to go through a processing procedure different from a processing procedure required for HARQ, a method in which a transmitter/receiver recognizes whether data is HARQ data or Non-HARQ data is necessary.

To this end, a Non-HARQ indicator is defined so that the transmitter/receiver is able to recognize whether specific data is HARQ data or Non-HARQ data.

The Non-HARQ indicator indicating whether the specific data is HARQ data or Non-HARQ data may be transmitted through a specific control channel to which a data resource is allocated.

The specific control channel may be a PDCCH or PUSCH/PUCCH channel

The Non-HARQ indicator (field) may have a size of 1 bit.

Depending on whether the value of the Non-HARQ indicator is 0 or 1, a procedure to be performed may be defined differently.

For example, in the case where the value of the Non-HARQ indicator is 0, it means that data, to which HARQ scheme is applied, is transmitted, and a receiver having received the corresponding data has to inform a transmitter of whether an error occurs on the corresponding data, through a feedback channel (e.g.: PHICH).

That is, when NACK is received, the transmitter performs a retransmission procedure on the corresponding data.

If the value of the Non-HARQ indicator is set to 1, it may indicate that the data is transmitted without application of HARQ.

Thus, it means that the corresponding data is transmitted once, and that there is no feedback on the corresponding data.

In addition, having received data transmitted through control information in which the Non-HARQ indicator is set (or included), the receiver performs a decoding procedure by storing the received data in a Non-HARQ soft buffer rather than in a HARQ soft buffer.

To describe in more detail with reference to FIG. 31, a UE to which transmission of Non-HARQ data is triggered due to a specific event transmits, to a base station, resource request information for requesting resource allocation.

In this case, a method for requesting resource allocation for Non-HARQ data to transmit emergency data or the like may be defined variously.

For example, the resource request information may be an Urgent Scheduling Request, a Non-HARQ Scheduling Request, a Buffer Status Report (BSR) transmitted to a PUSCH, or a specific signal transmitted to a PUCCH.

In addition, it is assumed that the resource request information is a signal having a low error rate and high reliability.

Next, when the base station receives the resource request information for emergency or Non-HARQ data from the UE, the base station transmits a UL grant, in which a Non-HARQ indicator is set, to the UE.

Next, the UE transmits Non-HARQ data to the UE based on the UL grant in which the Non-HARQ indicator is set.

Next, the base station performs a decoding procedure by receiving the Non-HARQ data through a Non-HARQ soft buffer.

In this case, the UE having transmitted the Non-HARQ data does not expect reception of any feedback for the Non-HARQ data from the base station.

That is, retransmission of the Non-HARQ data is not performed.

FIG. 31 illustrates an example in which Non-HARQ UL data is transmitted.

However, a method for transmitting Non-HARQ data, proposed in this specification, may be applied identically even to DL data (DL data).

That is, by setting a Non-HARQ indicator in a DL grant and transmitting the DL to the UE, the base station may allow the UE to recognize that data transmitted based on the DL grant is HARQ data.

Similarly to the DL data, the UE processes Non-HARQ data in a Non-HARQ soft buffer and does not transmit any feedback on the Non-HARQ data to the base station.

Method 1: Explicit Signaling of Non-HARQ Indicator

A Non-HARQ indicator may be transmitting through explicit signaling or implicit signaling.

Method 1, that is, the explicit signaling method of a Non-HARQ indicator may be performed by (1) defining a Non-HARQ indicator field in a conventional DL/UL grant (Method 1-1) or (1) transmitting a Non-HARQ indicator about No grant-based data (Method 1-2).

For a start, Method 1-1 will be described.

Method 1-1: Defining Non-HARQ Indicator in DL Grant/UL Grant

Method 1-1 may be used when Non-HARQ data is transmitted by scheduling of a base station.

That is, Method 1-1 defines a DL grant and a UL grant including a Non-HARQ indicator field (as shown in FIGS. 32 and 33) which indicates whether specific data is HARQ data, in which HARQ is applied, or Non-HARQ data.

FIG. 32 illustrates an example of a DL grant format including a Non-HARQ indicator proposed in this specification, and FIG. 33 illustrates an example of a UL grant format including a Non-HARQ indicator proposed in this specification.

That is, the Non-HARQ indicator may be included in each of DCI format 1 and DCI format 0.

For example, when HARQ is applied to DL data, the base station transmits, to the UE, a DL grant 3200 including a NHI field 3210 which is set to 0.

In contrary, when HARQ is not applied to DL DATA (with respect to Non-HARQ data), the base station transmits, to the UE, a DL grant including a NHI field set to 1. In this case, the DL grant may not include a NDI field, a HARQ field, and a RV field.

In addition, when HARQ is applied to UL data, the base station may transmit, to the UE, a UL grant 3300 including a NHI field 3310 which is set to 0.

On contrary, in the case of Non-HARQ data, the base station may transmit, to the UE, a UL grant including a NHI field which is set to 1. In this case, the UL grant may not include NDI information.

In Method 1-1, a receiver may receive n number of DL grants and/or UL grants transmitted through a PDCCH.

The expression "A and/or B" may be construed as "at least one of A or B."

This may beam that the receiver is able to receive two different transport blocks at a specific time region. That is, this means that the receiver is able to receive n number of data in total.

Thus, when it is assumed that one HARQ data is transmitted/received at a specific time region, the number of Non-HARQ data capable of being transmitted/received at the corresponding time region may be set to n−1.

That is, this means that a transmitter is capable of transmitting n number of different data (TB) at a specific time region.

This means that the UE needs to perform a blind decoding procedure until n number of DL grants and/or UL grants are received by the UE.

Next, Method 1-2 will be described.

Method 1-2: Transmission Method of Non-HARQ Indicator about No Grant-Based Data

Method 1-2 is a method that is capable of being applied to data that is transmitted using a contention resource or a pre-emptible resource without a base station's scheduling.

That is, UL data transmitted by a UE using a contention resource or a pre-emptible resource may be HARQ data or Non-HARQ data, so Method 1-2 provides a method in which a Non-HARQ indicator indicating whether the UL data is HARQ data or Non-HARQ data is transmitted along with the UL data.

In Method 1-2, the Non-HARQ indicator may be transmitted on a PUSCH resource or a PUCCH resource. This will be described in more detail with reference to examples (first to fourth examples).

1. Non-HARQ Indicator(NHI) on the PUSCH (First Example) Method for Transmitting a NHI by Multiplexing UL-SCH Data and NHI Signaling on a PUSCH Resource A first example is herein described, in which NHI information is transmitted by multiplexing of UL-SCH data and NHI signaling (or information) on a PUSCH resource.

The first example shows a method in which, while transmitting UL-SCH data, a UE transmits a Non-HARQ indicator by multiplexing the Non-HARQ indicator using a PUSCH resource allocated by a base station.

LTE(-A) defines CQI/PMI, HARQ ACK/NACK or RI information to be transmitted by multiplexing the same with UL-SCH data before Discrete Fourier Transform (DFT)-spreading is performed.

In a similar way to this, the first example provides a method of transmitting a NHI by multiplexing the NHI together with UL-SCH data.

Figure 34:
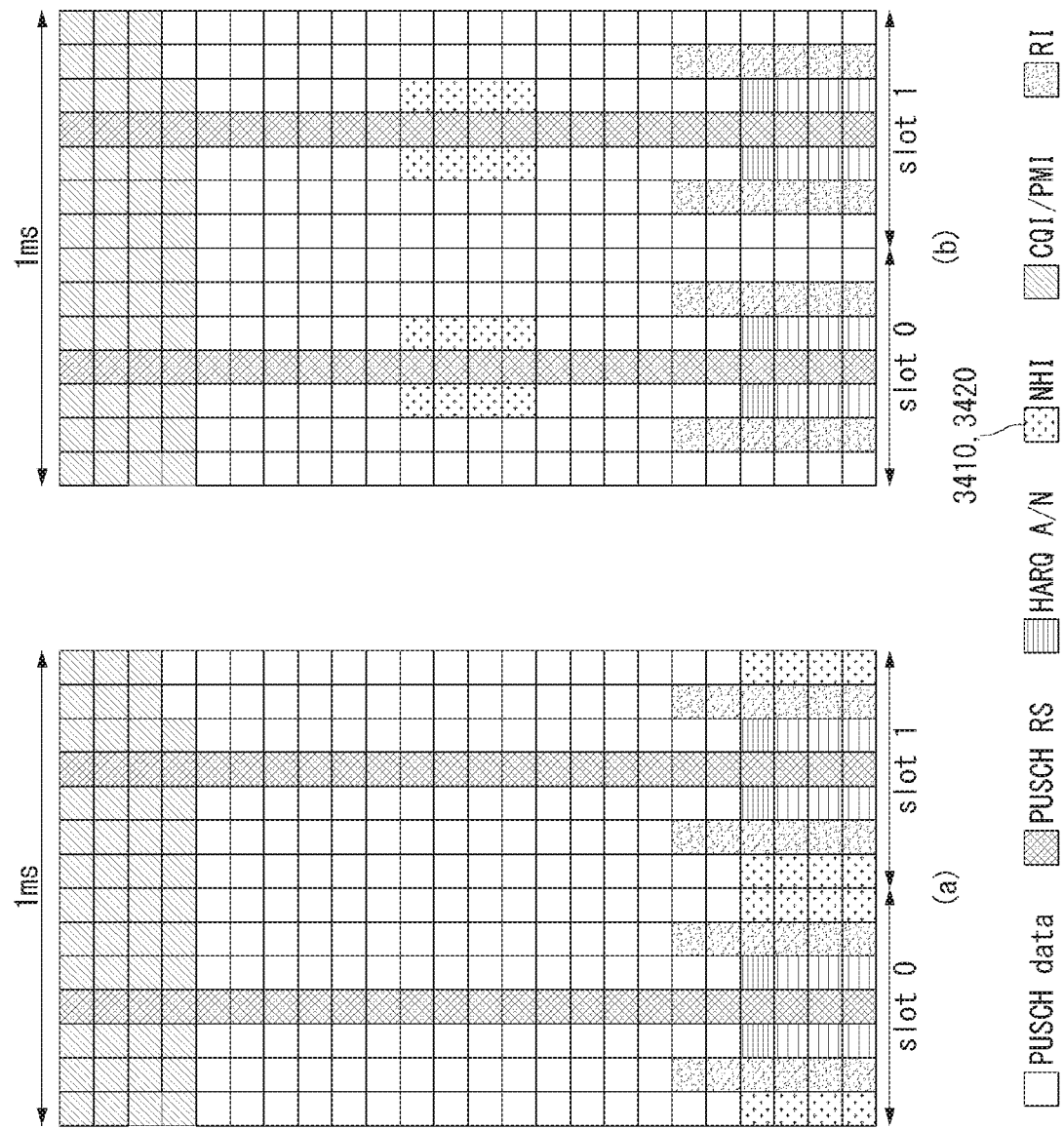
FIG. 34 is a diagram illustrating an example of a method for mapping a resource element for a NHI, the method proposed in this specification.

As illustrated in FIG. 34 (FIGS. 34A and 34B), for the NHI, a base station may allocate a specific RE that is within a PUSCH resource allocated to the UE.

The UE does not transmit the UL-SCH data to the RE allocated for the NHL

In addition, the UE may receive a resource region, to which the NHI is allocated, through semi-static upper layer signaling (e.g., RRC/MAC), or may be dynamically allocated with the resource region through a UL grant.

FIG. 34 is a diagram illustrating an example of a method for mapping a resource element for a NHI, the method proposed in this specification.

That is, FIG. 34 illustrates an example of a method for multiplexing NHI and UL-SCH data.

Specifically, FIG. 34A illustrates an example in which four REs of a 1-bit NHI are respectively allocated to $0^{th}$, $6^{th}$, 7th, and $13^{rd}$ symbols (3410) in the lowest subcarrier index of a PUSCH resource.

FIG. 34B shows illustrates an example in which four REs are allocated to $2^{nd}$, $4^{th}$, $9^{th}$, and $11^{th}$ symbols (3420) of the center subcarrier index of the PUSCH resource.

As illustrated in FIG. 34, a RE resource allocated for CQI/PMI, HARQ A/N, RI, and a RE resource allocated for an NHI should not overlap with each other.

In a third example, a NHI may be allocated to every resource region which is capable of being multiplexed with UL-SCH data.

In addition, in the third example, the NHI may be transmitted after being multiplexed with a HARQ ACK/NACK transmitted from a conventional PUSCH region.

The following Table 10 is a table which defines a method for distinguishing HARQ A/N and a NHI using an orthogonal sequence when the NHI is transmitted after being multiplexed with the HARQ A/N.

TABLE 10

| Index | Sequence Index | Orthogonal Sequence |
| --- | --- | --- |
| HARQ A/N | 0 | [+1, +1, +1, +1] |
| NHI | 1 | [+1, −1, +1, −1] |

2. Non-HARQ Indicator(NHI) on the PUCCH

Next, a method for transmitting a NHI on a PUCCH will be described.

This method may be classified into three examples (second to fourth examples) including: (1) a method of transmitting a NHI using a PUCCH mapped to a UL grant, (2) a method of transmitting a NHI using a PUCCH scheduling request (SR) resource (when the PUCCH SR resource is allocated to the UE), and (3) a method of transmitting a NHI by allocating a resource for the NHI to a PUSCCH.

(Second Example) Transmitting a NHI Using a PUCCH Resource Mapped to a UL Grant

The second example provides a method of transmitting a Non-HARQ Indicator (NHI) using a PUCCH resource that is implicitly mapped from the lowest CCE index of a PDCCH through which UL is transmitted.

That is, a resource mapping rule identical to a method of transmitting HARQ ACK/NACK information using a PUCCH resource implicitly mapped from the lowest CCE index of a PDCCH through which a conventional DL grant is transmitted may be applied to the second example.

In this case, a DL grant and a UL grant are both transmitted from a base station to a UE through a PDCCH, and the DL grant and the UL grant is transmitted through different resource regions of the PDCCH.

Thus, the UE may receive the DL grant and the UL grant using C-RNTI through blind detection.

In this case, the fact that the DL grant and the UL grant are transmitted through different resource regions of a PDCCH means that the DL grant and the UL grant have different CCE indexes.

Thus, the UE may transmit a NHI to the base station using a PUCCH resource mapped with respect to the lowest CCE index of the UL grant.

(Third Example) Transmitting NHI Using a PUCCH SR (Scheduling Request) Resource

Next, a third example of transmitting NHI information using a PUCCH SR resource will be described.

It is desirable that the third example is applied to the case where a PUCCH SR resource is allocated to a UE.

That is, the third example provides a method of transmitting a NHI using a PUCCH SR resource allocated to a specific UE.

In this case, it may be assumed that a SR resource available for the UE is allocated to each subframe or that a PUCCH SR resource in a subframe to which the SR is allocated is used to transmit a NHI.

Figure 35:
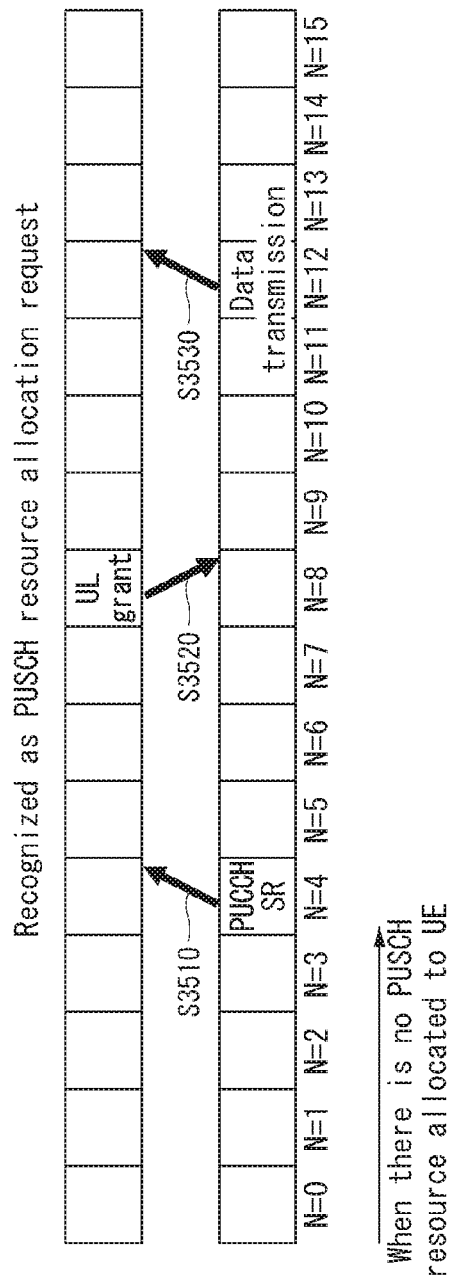
FIG. 35 illustrates a method of using a PUCCH SR in LTE(-A).
Figure 36:
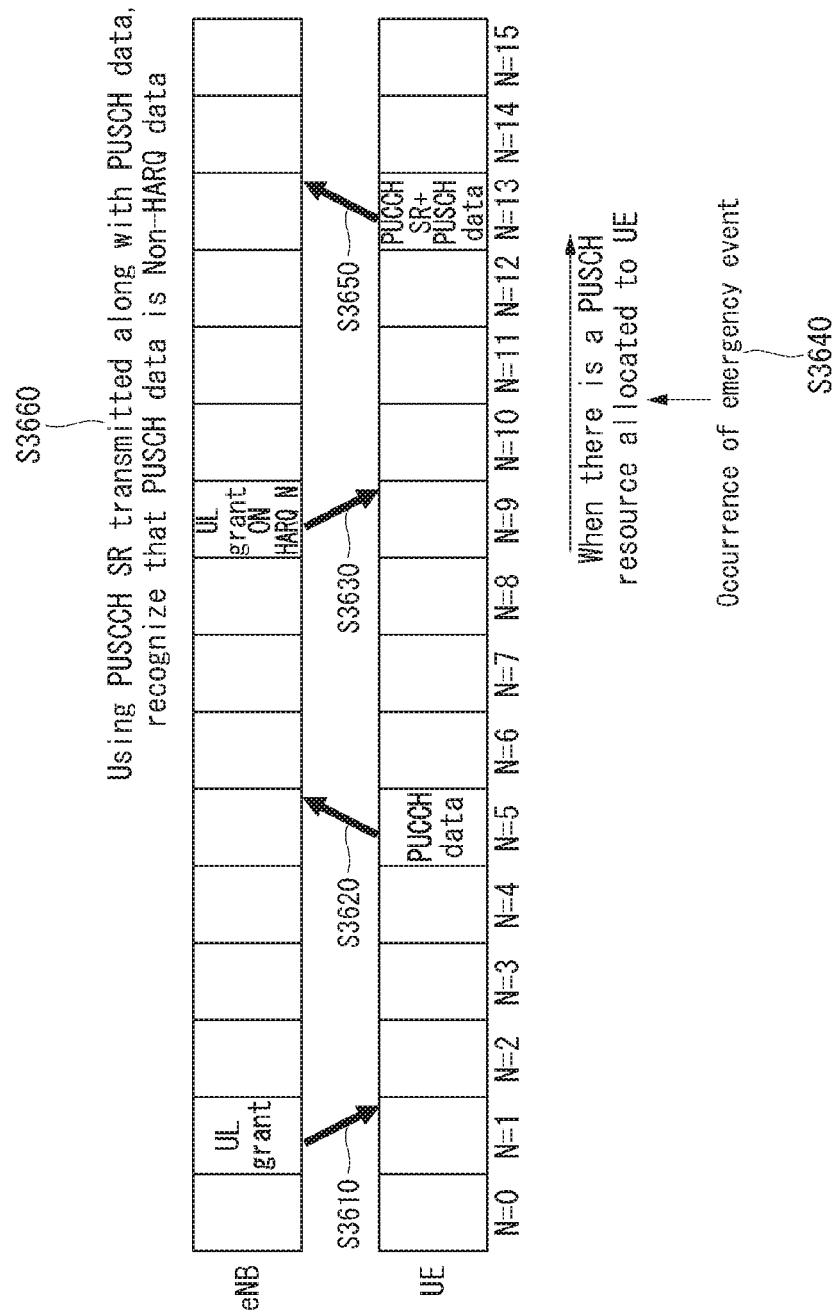
FIG. 36 is a diagram illustrating an example of a method of transmitting a NHI using a PUCCH SR, the method which is proposed in this specification.

FIG. 35 illustrates a method of using a PUCCH SR in LTE(-A), and FIG. 36 is a diagram illustrating an example of a method of transmitting a NHI using a PUCCH SR, the method which is proposed in this specification.

Hereinafter, detailed description will be provided with reference to FIGS. 35 and 36.

Referring to FIG. 35, a conventional PUCCH SR indicates a PUCCH resource which is allocated dedicately to a UE, which is not allocated with a PUSCH resource from a base station, so that the UE uses the PUCCH resource to request a PUSCCH resource from the base station.

The conventional PUCCH SR is transmitted in an ON/OFF keying scheme, or transmitted after being multiplexed together with DL HARQ ACK/NACK.

That is, when the base station receives the PUCCH SR from the UE (S3510), the base station recognizes the PUCCH SR as a request for allocation of a PUSCH and transmits a UL grant to the UE (S3520).

Next, the UE transmits UL data to the base station based on a received UL grant (S3530).

FIG. 36 is a diagram illustrating a method in which a UE having a PUSCH resource allocated by the base station uses a previously PUCCH SR resource to transmit a NHI.

That is, the UE having the PUSCH resource allocated by the base station does not need to additionally transmit a PUCCH SR, so the UE may use the PUCCH SR to transmit NHI information.

In this case, the PUCCH SR proposed in the third example may be used to indicate that UL data transmitted using a PUSCH resource is Non-HARQ data.

That is, in the case where UL data transmitted by the UE using the PUSCH resource allocated by the base station is transmission of Non-HARQ data, the UE transmits the PUSCCH SR resource along with the UL data to the base station.

At this point, in the case where, even though the base station allocates a PUSCH resource to the n−4$^{th}$ SF for the sake of the UE, the base station receives UL-SCH data using the PUSCH resource and at the same time receives a PUSCCH SR signal, the base station may recognize that the received UL-SCH data indicates Non-HARQ data.

As illustrated in FIG. 36, the UE may receive a UL grant (in N=1 subframe) from the base station (S3610), and transmit initial data (in N=4 subframe) to the base station based on the UL grant (S3620).

Next, the UE may receive a HARQ NACK on the initial data (in N=9 subframe) from the base station (S3630), and may be allocated with a new retransmission resource by the base station (a new UL grant) in order to re-transmit the initial data 4 ms after receiving the HARQ NACK (S3630).

Next, in the case where the UE needs to transmit emergency data due to occurrence of the emergency event (in N=10 subframe) (S3640), the UE transmits the emergency data using a resource (in N=13 subframe) allocated for the retransmission and transmit an allocated PUCCH SR signal so as to indicate that the corresponding data is Non-HARQ data (S3650).

In this case, despite of a PUSCH resource allocated in the n−4$^{th}$ SF, the base station having received the PUCCH SR from the UE may recognize that the data received through the PUSCH resource is Non-HARQ data (S3660).

(Fourth Example) Transmitting NHI Through PUCCH NHI Resource Allocation

Next, a fourth example will be described, in which a NHI is transmitted through a PUCCH by allocating a resource for the NHI in a PUCCH for each UE.

Transmission of a NHI through PUCCH NHI resource allocation may be performed together with an SR, or may be performed through PUCCH NHI resource allocation separately from the SR.

In this case, the fact that transmission of a NHI through PUCCH NHI resource allocation is performed together with an SR (when it is assumed 1-bit information is transmitted using a SR resource) indicates that, when 1-bit information transmitted through a PUCCH is set to "0", the information indicates an SR request, and, when the 1-bit information is set to "1", the information is used an NHI which indicates data transmitted through a retransmission resource.

In addition, a PUCCH SR may be transmitted with multi-bits.

In the case where the PUCCH SR is configured with multi-bits, a specific bit value of the PUCCH SR may be defined to indicate a NHI.

The following Table 11 is a table showing an example of 2 bits PUCCH SR.

TABLE 11

| 2 bits PUCCH SR Value | Description |
| --- | --- |
| 0b00 | 5-step SR |
| 0b01 | 3-step SR |
| 0b10 | 1-step SR |
| 0b11 | NHI |

Alternatively, NHI transmission proposed in the fourth example may be defined as an ON/OFF keying method or a 1 bit information transmission method through allocation of a new PUCCH NHI resource.

For a starter, in the case where the On/Off keying method is used, when Non-HARQ data is transmitted, a power load signal may be transmitted to a new PUCCH NHI resource region: otherwise, any power may not be loaded to the PUCCH NHI resource region.

In addition, in the case where a 1-bit information transmitting method is used, when a 1-bit information value transmitted through a PUCCH NHI resource region is set to "0b0", the 1-bit information may indicate HARQ data, and, when the 1-bit information value is set to "0b1", the 1-bit information may indicate Non-HARQ data.

However, in the fourth example, a PUCCH NHI resource needs to be allocated to each UE and thus PUCCH resource overhead may occur additionally.

As described above, a NHI may be applied to any data that is transmitted using a No grant-based resource, such as a contention resource, a pre-emptible resource for initial data, and a pre-emptible resource for retransmission data.

If a Non-HARQ indicator is transmitted using a pre-emptible resource for retransmission data, data transmitted using the pre-emptible resource is not retransmission data but new data and enables recognition as to whether or not the data is Non-HARQ data.

That is, the Non-HARQ indicator may be defined to indicate that the data transmitted using the pre-emptible resource is new data, regardless of which value is set for the Non-HARQ indicator; the Non-HARQ indicator may indicates HARQ data when the value of the Non-HARQ indicator is set to "0"; and the Non-HARQ indicator may indicate Non-HARQ data when the value of the Non-HARQ indicator is set to "1".

Method 2: Implicitly Transmitting a Non-HARQ Indicator

Next, Method 2 for implicitly transmitting a NHI will be described in more detail.

Method 2 may be performed by (1) defining a Non-HARQ data field in a new DL grant/UL grant (Method 2-1) or (2) applying Non-HARQ to No grant-based (competition resource or pre-emptible resource) data (Method 2-2).

For a starter, Method 2-1 will be described.

Method 2-1: Defining a Field for Non-HARQ Data in a New DL Grant/UL Grant

Method 2-1 is a method of transmitting/receiving Non-HARQ data by defining a new DL grant/UL grant including n number of resource information in order to allocate a resource for data capable of being transmitted/received at the same time.

That is, unlike Method 1-1 in which a UE (or a receiver) performs a blinding decoding until n number of DL grants and/or UL grants is all received through a PDCCH, Method 2-1 is a method in which a UE completes a blinding decoding when the UE finds one PDCCH related to itself in a specific time region.

In this case, a new DCI format may be defined to define a new DL grant/UL grant proposed in Method 2-1.

For example, the new DL grant and the UL grant may be defined as DCI format 1E and DCI format 0A, respectively.

In addition, depending on a position of resource information included in each DCI format, the UE may recognize whether or not the resource information is resource information for Non-HARQ data or HARQ data.

FIG. 37 illustrates an example of a new DL grant format proposed in this specification, and FIG. 38 illustrates an example of a new UL grant format proposed in this specification.

As illustrated in FIGS. 37 and 38, transmission of the new DL grant or the UL grant may mean that n−1 number of Non-HARQ data and single HARQ data are simultaneously transmitted to a corresponding UE at a specific time.

That is, each of the DL grant and the UL grant may include resource information for transmission of n number of data.

In this case, a first part (3710, 3810) of the DL grant and the UL grant may indicate resource information about HARQ data, and n−1 number of parts, including second to N-th parts (3720, 3820), may indicate resource information about Non-HARQ data.

In addition, n−1 number of parts of the DL grants and the UL grant, including the first to (n−1)th parts, may indicate resource information about Non-HARQ data, and the n-th parts thereof may indicate resource information about HARQ data.

Thus, the UE having received the new format DL grant/UL grant from the base station may implicitly recognize that resource information in other parts, except for resource information in the first parts, corresponds to resource information about Non-HARQ data.

That is, as illustrated in FIGS. 37 and 38, the new DL/UL grant may include a total n number of resource information related to data transmission.

As described above, the first resource information (3710, 3810) is resource information about HARQ, and n−1 number of resource information (3720, 3820), except for the first resource information, may be defined as resource information about different Non-HARQ data.

Thus, in the case where resource is allocated to the UE using the DCI format (0A, 1E) newly defined in Method 2-1, the UE complete a blinding decoding procedure by receiving a DCI format once.

Next, Method 2-1 will be described.

Method 2-2: Applying Non-HARQ to No Grant-Based (Contention or Pre-Emptible Data) Data Method 2-2 is a method in which data transmitted based on No grant is implicitly set or defined to indicate Non-HARQ data.

In this case, transmission of data based on No grant means that the data is transmitted through a pre-defined contention resource or pre-emptible resource.

That is, the UE transmits the data through a pre-defined resource without a resource allocated by the base station for data transmission.

Thus, in the case where data is transmitted using a specific resource such as a contention resource or a pre-emptible resource without explicit scheduling resource information from the base station, data is all regarded as Non-HARQ data and the base station processes the corresponding Non-HARQ data immediately in a Non-HARQ buffer without transmitting any feedback on the Non-HARQ data.

2. Method of Setting a Non-HARQ Soft Buffer to Process Non-HARQ Data

A method of setting a Non-HARQ soft buffer to process Non-HARQ data and HARQ data at a receiver distinguishably will be described.

A HARQ soft buffer indicates a soft buffer for processing HARQ data, and a Non-HARQ soft buffer indicates a soft buffer for processing Non-HARQ data in which HARQ ACK/NACK is not accompanied, such as emergency data.

The Non-HARQ soft buffer is a term used to be distinguished from e the HARQ soft buffer for convenience of explanation, and the term may be replaced by a different term having the same function.

As described above, the Non-HARQ data needs to be processed through a buffer which is different from the HARQ buffer for processing the HARQ data at a receiver, so that a HARQ process is prevented from being performed.

To this end, a transmitter transmitting the Non-HARQ needs to recognize whether or not the receiver supports the Non-HARQ data.

To this end, this specification newly defines a procedure which allows the transmitter to know whether or not the receiver supports processing of Non-HARQ data, so that the transmitter transmits the Non-HARQ data only to a receiver supporting the Non-HARQ data.

That is, this specification provides a method in which the transmitter and the receiver exchanges Non-HARQ capability information so as to know whether each other's opponent supports Non-HARQ data.

The Non-HARQ data may be applied both DL data and UL data.

For a starter, a method in which a base station transmits its Non-HARQ capability information to a UE will be described.

Through system information or a PDCCH, the base station may inform every UE of whether the base station supports Non-HARQ.

The system information may be MIB or SIB.

If the base station informs, through the PDCCH, whether the base station Non-HARQ data support, it may be desirable that the PDCCH is transmitted through a common search space so that every UE receives the PDCCH.

Next, a method in which a UE transmits its Non-HARQ capability information to a base station will be described.

Through a UE capability transfer procedure, the UE may inform the base station whether or not the UE supports Non-HARQ data.

That is, the UE may transmit, to the base station, a UECapabilityInformation message including information indicating whether or not the UE supports Non-HARQ data.

Non-HARQ data support information indicating whether or not the UE supports Non-HARQ data may be included in the Non-HARQ capability information and may further include Non-HARQ related parameters which will be described later.

The Non-HARQ Capability information may be expressed as a Non-HARQ related parameter.

The Non-HARQ Capability information (or the Non-HARQ related parameter) may include at least one of the following: (1) a Non-HARQ capability (or Non-HARQ support) field; (2) a simultaneous Non-HARQ data number field which indicates the number of simultaneous Non-HARQ data capable of being supported simultaneously; and (3) a Non-HARQ buffer number field.

For a starter, the Non-HARQ capability (or Non-HARQ support) field is a field indicating whether receiving Non-HARQ data is supported, and may be set to a value of true (e.g.: "1") or false (e.g.: "0").

Next, the simultaneous Non-HARQ data number field is a field indicating the number of simultaneous Non-HARQ data capable of being simultaneously supported in a specific TTI, and the simultaneous Non-HARQ data number field has a value of n−1.

The number and size of soft buffers of the receiver may be set differently according to a value for the simultaneous Non-HARQ data number field.

In addition, it is desirable that the simultaneous Non-HARQ data number field is transmitted when a Non-HARQ capability is supported (when it is set to be supported).

Next, the Non-HARQ buffer number field (the number of Non-HARQ buffers, m) may be a field indicating the number of Non-HARQ buffers required when one Non-HARQ data is transmitted from a specific TTI, and the number and size of soft buffers of the receiver may be set differently according to a value of the field.

It is desirable that the field about the number of Non-HARQ soft buffers is transmitted when a Non-HARQ capability is set to be supported.

In LTE(-A), the size and number of HARQ buffers of the UE may be determined according to the number of HARQ processes.

That is, the number of HARQ soft buffers is 8 when DL MIMO is not used (because 8 HARQ processes are set), and the number of HARQ soft buffers is 16 when 2 layer MIMO is used (because 16 HARQ processes are set).

In addition, HARQ capability information related to the size and number of HARQ soft buffers is set by a MIMO-CapabilityDL parameter in a UECapabilityInformation message.

Thus, when allocating a HARQ data-related resource to the UE, the base station allocates a resource based on the HARQ capability information.

That is, the base station first recognizes how many HARQ soft buffers the UE supports, and then allocates a resource to the UE based on the result.

Similarly, when the UE supports Non-HARQ, the base station needs to first how many Non-HARQ soft buffers the UE is able to set for Non-HARQ.

The UE's setting of Non-HARQ soft buffers may be changed depending on whether or not the UE supports Non-HARQ and the number of simultaneous Non-HARQ data capable of being transmitted from the same TTI.

In addition, the UE's setting of Non-HARQ soft buffers may be changed depending on a processing time for processing Non-HARQ data.

It is because an additional soft buffer (the number of Non-HARQ buffers) may be required depending on a processing time for processing the Non-HARQ data.

Figure 39:
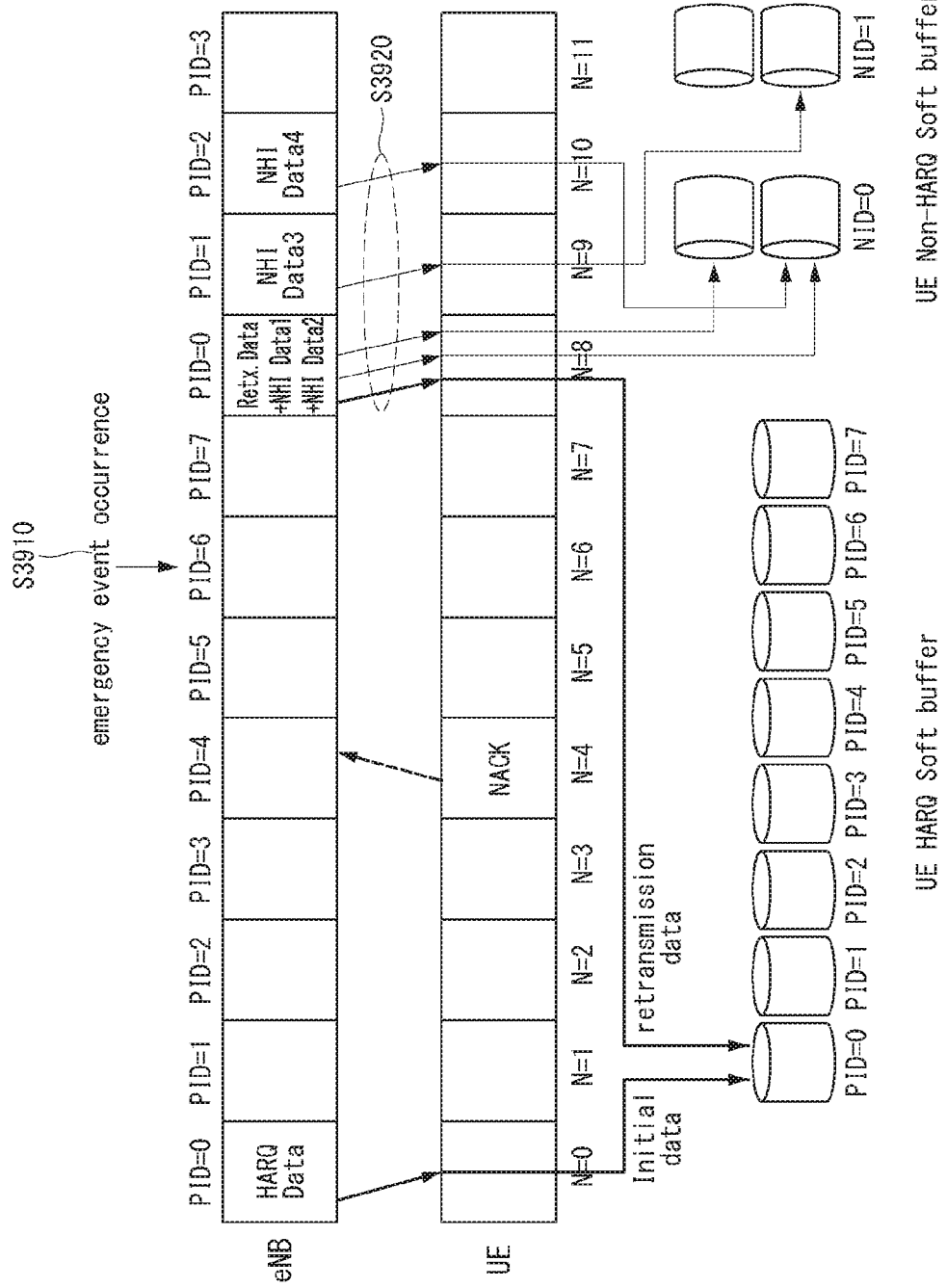
FIG. 39 is a diagram illustrating an example of a method of setting soft buffers based on Non-HARQ capability information proposed in this specification.

FIG. 39 is a diagram illustrating an example of a method of setting soft buffers based on Non-HARQ capability information proposed in this specification.

In a processing time for processing Non-HARQ data, it is assumed that Non-HARQ data is received and that the processing is completed in a TTI.

In addition, it is assumed that two Non-HARQ buffers (the number of Non-HARQ buffers (m)=2) is required to sequentially process one or more Non HARQ data received in continuous time resources.

In addition, it is assumed that the number of simultaneous Non-HARQ data capable of being transmitted in the same SF is 2 (e.g., the number of simultaneous Non-HARQ data (n−1)=2).

As illustrated in FIG. 39, the UE is a UE capable of supporting Non-HARQ data, and, using the Non-HARQ capability information, the UE is able to inform the base station of whether four soft buffers in total are additionally set for Non-HARQ data, in addition to HARQ soft buffers.

Referring to FIG. 39, the UE sets eight HARQ soft buffers and four Non-HARQ soft buffers, that is, twelve soft buffers in total.

When an emergency event occurs in an initial DL data retransmission procedure (S3910), the base station may transmit HARQ data (retransmission data) and Non-HARQ data to the UE in a specific time region (S3920).

In addition, the base station may transmit HARQ data and Non-HARQ data by combining the HARQ data and the Non-HARQ data into one data (or by reconfiguring them into one data). In this case, the base station may transmit an additional indicator, such as a data indicator, so that the UE distinguishes each data.

The UE processes the HARQ data, which is received from the base station, in a HARQ soft buffer, and the Non-HARQ data in a Non-HARQ soft buffer.

In FIG. 39, the UE sets four Non-HARQ soft buffer, and (because it is assumed that a processing time of Non-HARQ data is 1 TTI), the UE processes two Non-HARQ data, received from N=8 subframe, in a Non-HARQ soft buffer of NID=0, and the third Non-HARQ data, which is received from N=9 subframe, in a Non-HARQ soft buffer.

In addition, when the UE receives Non-HARQ data from N=10 subframe from the base station, the UE processes the fourth Non-HARQ data in a Non-HARQ soft buffer of NID=0.

Because Non-HARQ data received from N=8 subframe is all processed in a next subframe (N=9 SF), Non-HARQ data received from N=10 subframe is first processed in a Non-HARQ softbuffer of NID=0.

Figure 40:
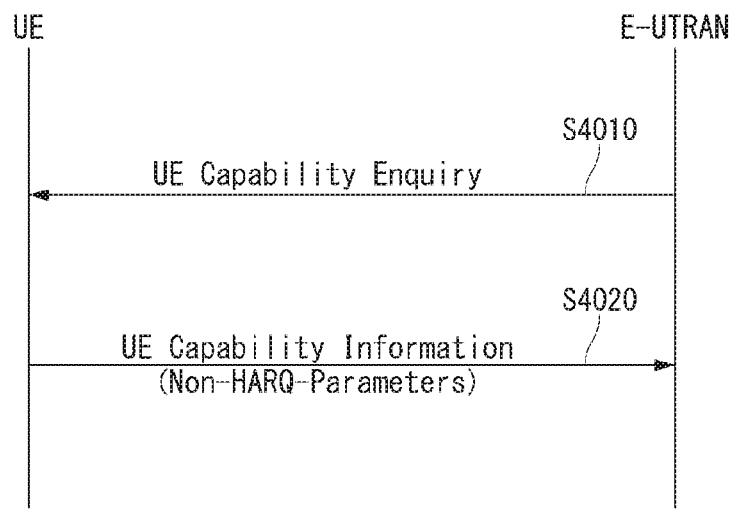
FIGS. 40 and 41 are diagrams illustrating an example of a method of transmitting and receiving Non-HARQ capability information proposed in this specification.
Figure 41:
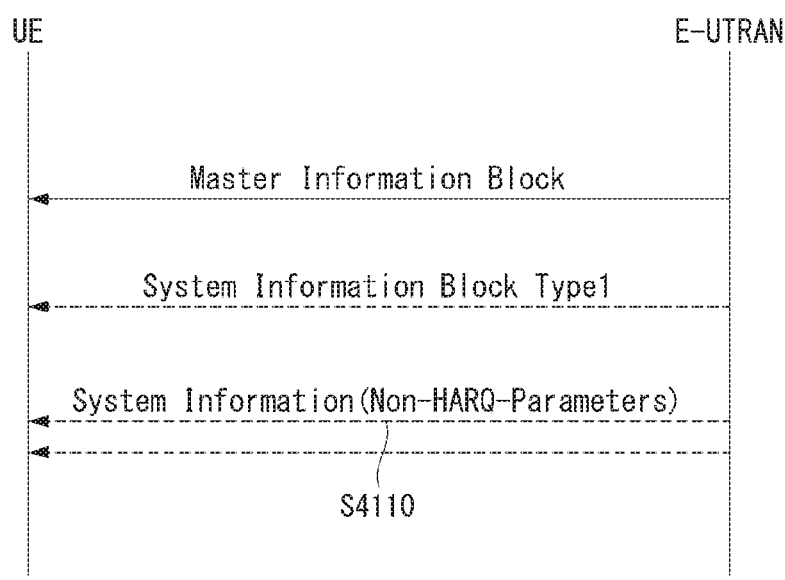

FIGS. 40 and 41 are diagrams illustrating an example of a method of transmitting and receiving Non-HARQ capability information proposed in this specification.

As described above, the base station and the UE may transmit/receive Non-HARQ capability information (or a Non-HARQ related parameter) by exchanging system information or UE capability information.

FIG. 40 illustrates a procedure in which a UE transmits Non-HARQ capability information to a base station through UECapabilityInformation.

As illustrated in FIG. 40, when a base station (or E-UTRAN) transmits a UECapabilityEnquiry message (S4010), the UE transmits a UECapabilityInformation message to the base station (S4020).

The UECapabilityInformation message may include Non-HARQ capability information, and the Non-HARQ capability information may be defined by a UE-EUTRA-Capability information element in the UECapabilityInformation message.

FIG. 41 illustrates a method in which a base station transmits Non-HARQ capability information to a UE through system information (MasterInformationBlock or SystemInformationBlock).

Referring to FIG. 41, the base station (or E-UTRAN) transmits system information including Non-HARQ capability information to the UE (S4110).

The Non-HARQ capability information may be included in MasterInformationBlock or SystemInformationBlock-Type1 to be transmitted to the UE.

The Non-HARQ capability information may include the aforementioned (1) a Non-HARQ capability (or support) field, (2) a simultaneous Non-HARQ data number field, and (4) a Non-HARQ soft buffer number field.

General Apparatus to which the Present Invention can be Applied

Figure 42:
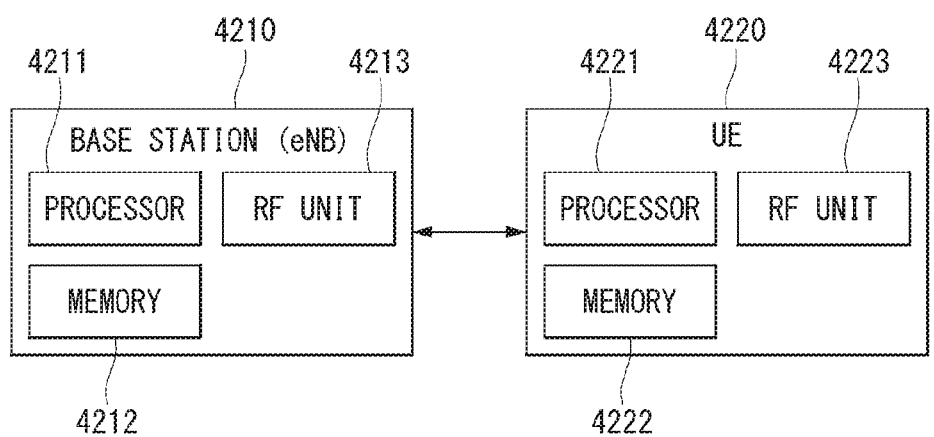
FIG. 42 illustrates an example of block configuration of a wireless communication apparatus to which methods proposed in this specification is capable of being applied.

FIG. 42 illustrates an example of block configuration of a wireless communication apparatus to which methods proposed in this specification is capble of being applied.

Referring to FIG. 42, the wireless communication system includes a base station 4210, and a plurality of UEs 4220 located in a region of the base station 4210.

The base station 4210 includes a processor 4211, a memory 4212, and a radio frequency (RF) unit 4213. The processor 4211 implements functions, procedures, and/or methods proposed in FIGS. 1 to 41. Layers of a radio interface protocol may be implemented by the processor 4211. The memory 4212 is connected to the processor 4211 to store various types of information required to drive the processor 4211. The RF unit 4213 is connected to the processor 4211 to transmit and/or receive a radio signal.

The UE 4220 includes a processor 4221, a memory 4222, and a RF unit 4223. The processor 4221 implements functions, procedures, and/or methods proposed in FIGS. 1 to 41. The memory 4222 is connected to the processor 4221 to store various types of information required to drive the processor 4221. The RF unit 4223 is connected to the processor 4221 to transmit and/or receive a radio signal.

The memory 4212 and 4222 may be located inside or outside the processors 4211 and 4221, and may be connected to the processors 4211 and 4221 using various well-known means.

In addition, the base station 4210 and/or the UE 4220 may have a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

Embodiments of the present invention may be implemented by various means such as, for example, hardware, firmware, software, or combinations thereof. When implemented by hardware, one embodiment of the present invention may be implemented by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, and the like.

When embodied in firmware or software, one embodiment of the present invention may be implemented in the form of a module, a procedure, a function, or the like which perform the functions and or operations described above. A software code may be stored in the memory and actuated by the processor. The memory is disposed inside or outside the processor and may tranceive data with the processor through various well known means.

It will be apparent to those skilled in the art that various modifications and variations can be made in the present invention without departing from the essential features of the present invention. Thus, the descriptions given should not be construed as being limited but considered as being illustrative. The scope of the present invention should be determined through reasonable interpretation of the appended claims. The present invention is intended to cover the modifications and variations of this invention provided they come within the scope of the appended claims and their equivalents.

INDUSTRIAL APPLICABILITY

Various embodiments of the present invention have been described through examples in which a method for transmitting and receiving data in a wireless communication system is applied to a 3GPP LTE/LTE-A system, but the method may also be equally applied to various wireless communication system other than the 3GPP LTE/LTE-A system.

What is claimed is:

1. A method for receiving, by a wireless device, a downlink data in a wireless communication system, the method comprising:

receiving, from a base station, control information indicating whether or not an uplink hybrid automatic repeat and request (HARQ) feedback for the downlink data is enable, wherein whether or not the uplink HARQ feedback for the downlink data is enabled is determined based on whether a type of the downlink data is a specific type of data, wherein based on the type of the downlink data being the specific type of data, the uplink HARQ feedback for the downlink data is disabled, wherein based on the type of the downlink data not being the specific type of data, the uplink HARQ feedback for the downlink data is enabled, and wherein the specific type of data is a data related to low-latency and high-reliability;

receiving, from the base station, the downlink data; and determining whether to transmit the uplink HARQ feedback for the downlink data based on the control information, wherein when the control information represents that the uplink HARQ feedback of the downlink data is disabled, the uplink HARQ feedback for the downlink data is determined not to be transmitted, wherein when the control information represents that the uplink HARQ feedback of the downlink data is enabled, the uplink HARQ feedback for the downlink data is determined to be transmitted, and wherein (i) a non-HARQ buffer for processing the specific type of data and (ii) a HARQ buffer for processing data other than the specific type of data are separately configured.

2. The method of claim 1, wherein the uplink HARQ feedback includes an acknowledgement (ACK) and a non-acknowledgement (NACK).

3. The method of claim 1, wherein an HARQ process of the DL data is configured regardless of the control information.

4. The method of claim 3, wherein the HARQ process of the DL data that the uplink HARQ feedback is disabled is configured separately from an HARQ process of a downlink data that an uplink HARQ feedback is enabled.

5. The method of claim 1, further comprising;
receiving, from the base station, a downlink grant,
wherein the control information is included in the DL grant.

6. The method of claim 1, further comprising:
receiving, from the base station, information on a number of the specific type of data being simultaneously transmitted in a specific TTI (transmission time interval); and
transmitting, to the base station, information on a number of the non-HARQ buffer required when the specific type of data is transmitted in the specific TTI.

7. A wireless device for receiving a downlink data in a wireless communication system, the wireless device comprising:
a transmitter configured for transmitting radio signals;
a receiver configured for receiving radio signals; and
a processor functionally connected with the transmitter and the receiver, the processor configured to:
receive, from a base station, control information indicating whether or not an uplink hybrid automatic repeat and request (HARQ) feedback for the downlink data is enable,
wherein whether or not the uplink HARQ feedback for the downlink data is enabled is determined based on whether a type of the downlink data is a specific type of data,
wherein based on the type of the downlink data being the specific type of data, the uplink HARQ feedback for the downlink data is disabled,
wherein based on the type of the downlink data not being the specific type of data, the uplink HARQ feedback for the downlink data is enabled, and
wherein the specific type of data is a data related to low-latency and high-reliability;
receive, from the base station, the downlink data; and
determine whether to transmit the uplink HARQ feedback for the downlink data based on the control information,
wherein when the control information represents that the uplink HARQ feedback of the downlink data is disabled, the uplink HARQ feedback for the downlink data is determined not to be transmitted,
wherein when the control information represents that the uplink HARQ feedback of the downlink data is enabled, the uplink HARQ feedback for the downlink data is determined to be transmitted, and
wherein (i) a non-HARQ buffer for processing the specific type of data and (ii) a HARQ buffer for processing data other than the specific type of data are separately configured.

8. The wireless device of claim 7, wherein the uplink HARQ feedback includes an acknowledgement (ACK) and a non-acknowledgement (NACK).

9. The wireless device of claim 7, wherein an HARQ process of the DL data is configured regardless of the control information.

10. The wireless device of claim 9, wherein the HARQ process of the DL data that the uplink HARQ feedback is disabled is configured separately from an HARQ process of a downlink data that an uplink HARQ feedback is enabled.

11. The wireless device of claim 7, wherein the processor is further configured to:
receive, from the base station, a downlink grant,
wherein the control information is included in the DL grant.

* * * * *